US012596238B2

(12) United States Patent
Aoi

(10) Patent No.: US 12,596,238 B2
(45) Date of Patent: Apr. 7, 2026

(54) IMAGING LENS AND IMAGING DEVICE

(71) Applicant: FUJIFILM Corporation, Tokyo (JP)

(72) Inventor: Toshihiro Aoi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 474 days.

(21) Appl. No.: 18/320,018

(22) Filed: May 18, 2023

(65) Prior Publication Data

US 2023/0288671 A1 Sep. 14, 2023

Related U.S. Application Data

(63) Continuation of application No. PCT/JP2021/043021, filed on Nov. 24, 2021.

(30) Foreign Application Priority Data

Nov. 25, 2020 (JP) ................................. 2020-195483

(51) Int. Cl.
*G02B 9/64* (2006.01)
*G02B 9/08* (2006.01)
(Continued)

(52) U.S. Cl.
CPC ................. *G02B 9/64* (2013.01); *G02B 9/08* (2013.01); *G02B 13/0045* (2013.01); *G02B 13/14* (2013.01)

(58) Field of Classification Search
CPC ... G02B 9/06; G02B 9/08; G02B 9/64; G02B 13/0045; G02B 13/008; G02B 13/14; G02B 13/18; G02B 15/1421
See application file for complete search history.

(56) References Cited

U.S. PATENT DOCUMENTS

2015/0185437 A1 7/2015 Suzuki
2016/0139384 A1 5/2016 Sun
(Continued)

FOREIGN PATENT DOCUMENTS

CN 108333727 A 7/2018
GB 1531525 A 11/1978
(Continued)

OTHER PUBLICATIONS

OHARA Glass Catalog, OHARA Corp, https://oharacorp.com/glass-catalog/, 2025 (Year: 2025).*
(Continued)

*Primary Examiner* — Bumsuk Won
*Assistant Examiner* — Alex Park Rickel
(74) *Attorney, Agent, or Firm* — Studebaker Brackett PLLC

(57) ABSTRACT

An imaging lens consisting of, in order from an object side to an image side: a first lens group; a stop; and a second lens group having a positive refractive power, in which the first lens group includes three or more Ln lenses that are consecutively disposed, the Ln lens is a negative lens in which a surface on the image side is a concave surface, and in a case in which, among the three or more Ln lenses that are consecutively disposed and included in the first lens group, for two Ln lenses selected in descending order of refractive power, an average of Abbe numbers and an average of partial dispersion ratios are included within a predetermined region in a Cartesian coordinate system with a horizontal axis representing Abbe number and a vertical axis representing partial dispersion ratio.

18 Claims, 30 Drawing Sheets

(51) Int. Cl.
    *G02B 13/00*     (2006.01)
    *G02B 13/14*     (2006.01)

(56)           References Cited

U.S. PATENT DOCUMENTS

| | | | |
|---|---|---|---|
| 2016/0291296 A1 | 10/2016 | Okada et al. | |
| 2017/0108679 A1 | 4/2017 | Eguchi | |
| 2018/0210178 A1 | 7/2018 | Saito et al. | |
| 2018/0348491 A1* | 12/2018 | Lee | G02B 9/64 |
| 2020/0103634 A1 | 4/2020 | Okada et al. | |
| 2021/0011256 A1* | 1/2021 | Muratani | G02B 27/0025 |

FOREIGN PATENT DOCUMENTS

| | | | | |
|---|---|---|---|---|
| JP | S52-34726 | A | | 3/1977 |
| JP | 2016-021011 | A | | 2/2016 |
| JP | 2016-095461 | A | | 5/2016 |
| JP | 2016224362 | A | * | 12/2016 |
| JP | 2017-076040 | A | | 4/2017 |
| JP | 2017-102353 | A | | 6/2017 |
| JP | 6309478 | B2 | | 4/2018 |
| JP | 2020-030249 | A | | 2/2020 |
| JP | 2020-052349 | A | | 4/2020 |
| JP | 2020-204635 | A | | 12/2020 |
| WO | 2014/041775 | A1 | | 3/2014 |

OTHER PUBLICATIONS

International Search Report issued in PCT/JP2021/043021; mailed Feb. 1, 2022.
International Preliminary Report on Patentability (Chapter I) and Written Opinion of the International Searching Authority issued in PCT/JP2021/043021; issued May 30, 2023.
An Office Action; mailed by the China National Intellectual Property Administration of the People's Republic of China on Jul. 29, 2025, which corresponds to Chinese Patent Application No. 202180078828.7 and is related to U.S. Appl. No. 18/320,018.
An Office Action; "Notice of Reasons for Refusal," mailed by the Japanese Patent Office on Aug. 19, 2025, which corresponds to Japanese Patent Application No. 2022-565378 and is related to U.S. Appl. No. 18/320,018; with English language translation.
"Notice of Reasons for Refusal" Office Action issued in JP 2022-565378; mailed by the Japanese Patent Office on Jan. 6, 2026.

\* cited by examiner

IMAGING LENS AND IMAGING DEVICE

CROSS REFERENCE TO RELATED APPLICATIONS

This application is a continuation of International Application No. PCT/JP2021/043021, filed on Nov. 24, 2021, which claims priority from Japanese Patent Application No. 2020-195483, filed on Nov. 25, 2020. The entire disclosure of each of the above applications is incorporated herein by reference.

BACKGROUND

Technical Field

The present disclosure relates to an imaging lens and an imaging device.

Related Art

Conventionally, near-infrared light has been used for imaging of a factory automation (FA) camera, a machine vision (MV) camera, a surveillance camera, an in-vehicle camera, or the like. For example, near-infrared light is used for identification and inspection of objects in FA applications and MV applications, and near-infrared light is used for nighttime imaging and imaging in poor visual field conditions, such as fog or smoke, in surveillance applications. Near-infrared as used herein refers to a wavelength range of 700 nm to 2500 nm.

As an imaging lens in which near-infrared light is taken into account, for example, a lens system described in JP6309478B is known.

Among near-infrared light, short wave infra-red (SWIR) light, which can be classified as a wavelength range of 1000 nm to 2500 nm, is highly useful. In recent years, there has been a demand for an imaging lens capable of covering a wavelength range from a visible range to a near-infrared range, particularly a SWIR range, while suppressing an increase in size of a lens system, and of achieving high performance.

SUMMARY

The present disclosure provides an imaging lens capable of covering a wavelength range from a visible range to a SWIR range while suppressing an increase in size of a lens system and of achieving high performance, and an imaging device provided with the imaging lens.

According to a first aspect of the present disclosure, there is provided an imaging lens consisting of, in order from an object side to an image side: a first lens group; a stop; and a second lens group having a positive refractive power, in which the first lens group includes three or more Ln lenses that are consecutively disposed, the Ln lens is a negative lens in which a surface on the image side is a concave surface, and in a case in which, for each lens of the first lens group and the second lens group, a refractive index at a wavelength of 435.83 nm is denoted by ng, a refractive index at a wavelength of 1529.58 nm is denoted by na, and a refractive index at a wavelength of 2325.42 nm is denoted by nb, an Abbe number v and a partial dispersion ratio $\theta$ are defined as $$v = (na-1)/(ng-nb) \text{ and}$$

$$\theta = (na-nb)/(ng-nb), \text{ respectively, and,}$$

among the three or more Ln lenses that are consecutively disposed and included in the first lens group, for two Ln lenses selected in descending order of refractive power, an average of the Abbe numbers v is denoted by vave, and an average of the partial dispersion ratios $\theta$ is denoted by $\theta$ave, in a Cartesian coordinate system with a horizontal axis representing the Abbe number v and a vertical axis representing the partial dispersion ratio $\theta$, vave and $\theta$ave are included in a common region of four regions,
a first region represented by $\theta > 0.0250 \times v - 0.1300$,
a second region represented by $\theta < 0.0250 \times v - 0.0075$,
a third region represented by $\theta > 0.0225$, and
a fourth region represented by $\theta < 0.1650$.

In the imaging lens according to the first aspect, in the Cartesian coordinate system,
it is preferable that vave and $\theta$ave are included in a common region of four regions,
a fifth region represented by $\theta > 0.0250 \times v - 0.1000$,
a sixth region represented by $\theta < 0.0250 \times v - 0.0375$,
a seventh region represented by $\theta > 0.0500$, and
an eighth region represented by $\theta < 0.1500$.

According to a second aspect of the present disclosure, in the above-described aspect, it is preferable that, in a case in which an average of the Abbe numbers v of all positive lenses of the imaging lens is denoted by vPave, an average of the Abbe numbers v of all negative lenses of the imaging lens is denoted by vNave, an average of the partial dispersion ratios $\theta$ of all the positive lenses of the imaging lens is denoted by $\theta$Pave, and an average of the partial dispersion ratios $\theta$ of all the negative lenses of the imaging lens is denoted by $\theta$Nave, Conditional Expressions (1) and (2) are satisfied. In addition, it is more preferable that Conditional Expressions (1) and (2) are satisfied and then at least one of Conditional Expression (1-1) or (2-1) is satisfied.

$$6 < vPave - vNave < 12 \tag{1}$$

$$0.01 < \theta Pave - \theta Nave < 0.1 \tag{2}$$

$$6.5 < vPave - vNave < 11.5 \tag{1-1}$$

$$0.015 < \theta Pave - \theta Nave < 0.095 \tag{2-1}$$

According to a third aspect of the present disclosure, in the above-described aspect, it is preferable that, in a case in which an angle formed between a chief ray incident on a maximum image height on an image plane and an axis parallel to an optical axis is denoted by CRA and a unit of CRA is degrees, Conditional Expression (3) is satisfied, and it is more preferable that Conditional Expression (3-1) is satisfied.

$$0 \le |CRA| < 10 \tag{3}$$

$$0 \le |CRA| < 9 \tag{3-1}$$

According to a fourth aspect of the present disclosure, in the above-described aspect, it is preferable that, in a case in which a sum of a distance on an optical axis from a lens surface closest to the object side of the imaging lens to a lens surface closest to the image side of the imaging lens and a back focus in terms of an air conversion distance of the imaging lens at a wavelength of 1529.58 nm is denoted by TL and a focal length of the imaging lens at a wavelength of 1529.58 nm is denoted by f, Conditional Expression (4) is satisfied, and it is more preferable that Conditional Expression (4-1) is satisfied.

$$29 < TL/f < 38 \tag{4}$$

$$29.5 < TL/f < 37.6 \tag{4-1}$$

3

According to a fifth aspect of the present disclosure, in the above-described aspect, it is preferable that the first lens group has a positive refractive power.

According to a sixth aspect of the present disclosure, in the above-described aspect, it is preferable that, in a case in which a focal length of the first lens group at a wavelength of 1529.58 nm is denoted by fG1 and a focal length of the second lens group at a wavelength of 1529.58 nm is denoted by fG2, Conditional Expression (5) is satisfied, and it is more preferable that Conditional Expression (5-1) is satisfied.

$$0.4 < fG2/fG1 < 2 \qquad (5)$$

$$0.5 < fG2/fG1 < 1.9 \qquad (5\text{-}1)$$

According to a seventh aspect of the present disclosure, in the above-described aspect, it is preferable that, in a case in which a focal length of the first lens group at a wavelength of 1529.58 nm is denoted by fG1 and a focal length of a lens disposed closest to the image side in the first lens group at a wavelength of 1529.58 nm is denoted by fLp, Conditional Expression (6) is satisfied.

$$1.3 < fLp/fG1 < 3.1 \qquad (6)$$

According to an eighth aspect of the present disclosure, in the above-described aspect, it is preferable that, in a case in which an effective diameter of a lens surface closest to the object side of the imaging lens is denoted by $\varphi t$ and an effective diameter of a lens surface closest to the image side of the imaging lens is denoted by $\varphi e$, Conditional Expression (7) is satisfied.

$$2.5 < \varphi t/\varphi e < 8 \qquad (7)$$

According to a ninth aspect of the present disclosure, in the above-described aspect, it is preferable that the first lens group includes four or fewer Ln lenses that are consecutively disposed.

According to a tenth aspect of the present disclosure, in the above-described aspect, it is preferable that, in a case in which the Abbe number v of a lens closest to the image side of the imaging lens is denoted by vE, Conditional Expression (8) is satisfied.

$$17 < vE \qquad (8)$$

According to an eleventh aspect of the present disclosure, in the above-described aspect, it is preferable that at least one of the three or more Ln lenses that are consecutively disposed and included in the first lens group is an aspherical lens.

According to a twelfth aspect of the present disclosure, in the above-described aspect, it is preferable that a lens closest to the image side of the imaging lens is an aspherical lens having a positive refractive power.

According to a thirteenth aspect of the present disclosure, in the above-described aspect, it is preferable that the number of lenses included in the first lens group is seven or fewer.

According to a fourteenth aspect of the present disclosure, in the above-described aspect, it is preferable that the number of lenses included in the second lens group is seven or fewer.

According to another aspect of the present disclosure, there is provided an imaging device comprising the imaging lens according to the above-described aspect.

It should be noted that "consist of" and "consisting of" in the present specification may be intended to include, in addition to the listed constituent element, a lens that does not substantially have refractive power, an optical element other than a lens, such as a stop, a filter, and a cover glass, a mechanism part, such as a lens flange, a lens barrel, an imaging element, and an image stabilization mechanism, and the like.

In the present specification, a " . . . group having a positive refractive power" means that the group as a whole has a positive refractive power. A "lens having a positive refractive power" and a "positive lens" have the same meaning. A "lens having a negative refractive power" and a "negative lens" have the same meaning. A " . . . lens group" is not limited to a configuration consisting of a plurality of lenses, and may have a configuration consisting of only one lens.

A composite aspherical lens (a lens in which a spherical lens and an aspherical film formed on the spherical lens are integrally formed to function as one aspherical lens as a whole) is not regarded as a cemented lens and is treated as a single lens. The sign of the refractive power and the surface shape regarding the lens including the aspherical surface will be considered in the paraxial region.

The "focal length" used in the conditional expression is a paraxial focal length. Unless otherwise specified, the values used in the conditional expression are values in a case of using on a wavelength of 1529.58 nm as a reference in a state in which the infinite distance object is in focus. The "higher order" related to the aberration means the fifth order or higher. In the present specification, "near-infrared" means a wavelength range of 700 nm to 2500 nm, and "SWIR" means a wavelength range of 1000 nm to 2500 nm. The "nm" used as a unit of the wavelength is nanometers.

According to the above-described aspect, the imaging lens of the present disclosure and the imaging device provided with the imaging lens are capable of covering a wavelength range from a visible range to a SWIR range while suppressing an increase in size of a lens system, and of achieving high performance.

DETAILED DESCRIPTION

Figure 1:
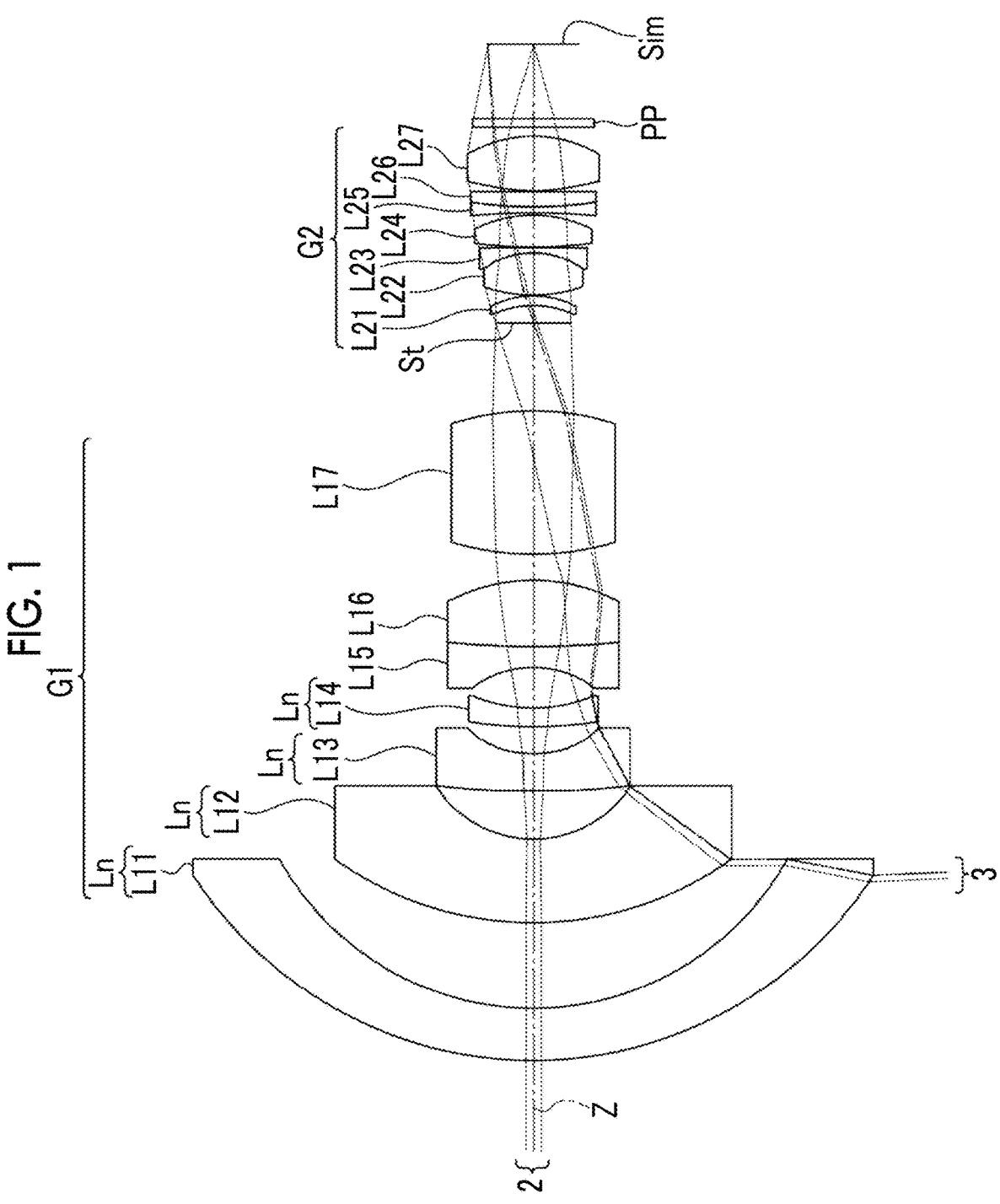
FIG. 1 is a cross-sectional view showing a configuration and a luminous flux of an imaging lens corresponding to an imaging lens of Example 1 and according to an exemplary embodiment.

Hereinafter, exemplary embodiments of the present disclosure will be described in detail with reference to the drawings. FIG. 1 shows a configuration of an imaging lens according to an exemplary embodiment of the present disclosure in a cross-section including an optical axis Z. The example shown in FIG. 1 corresponds to an imaging lens of Example 1, which will be described later. In FIG. 1, a left side is an object side and a right side is an image side, and a state in which an infinite distance object is in focus is shown. In addition, FIG. 1 also shows an on-axis luminous flux 2 and a luminous flux 3 having a maximum image height, as luminous fluxes.

FIG. 1 shows an example in which an optical member PP having a parallel plate shape is disposed on the image side of the imaging lens on the assumption that the imaging lens is applied to the imaging device. The optical member PP is a member that is assumed to include, for example, various filters and/or a cover glass. The various filters include, for example, a low-pass filter, an infrared cut filter, a filter that cuts a specific wavelength range, and the like. The optical member PP is a member that does not have refractive power, and a configuration in which the optical member PP is omitted is also possible.

The imaging lens of the present disclosure consists of a first lens group G1, an aperture stop St, and a second lens group G2 having a positive refractive power, in order from the object side to the image side. As an example, in the example shown in FIG. 1, the first lens group G1 consists of seven lenses, that is, lenses L11 to L17, in order from the object side to the image side, and the second lens group G2 consists of seven lenses, that is, lenses L21 to L27, in order from the object side to the image side. It should be noted that the aperture stop St shown in FIG. 1 does not show the shape but shows the position on the optical axis.

The first lens group G1 preferably has a positive refractive power. Short-distance imaging is emphasized in FA applications and MV applications. By making the refractive power of the first lens group G1 positive, the spread of a luminous flux emitted from the first lens group G1 during short-distance imaging can be reduced as compared with a case in which the refractive power of the first lens group G1 is made negative, so that it is possible to suppress an increase in diameter and an increase in weight of the second lens group G2. In addition, since the spread of the luminous flux from the first lens group G1 can be reduced, the refractive power of the lens of the second lens group G2 need not be increased in order to converge the spread luminous flux, and as a result, the amount of various aberrations can be reduced.

The first lens group G1 includes three or more Ln lenses Ln that are consecutively disposed. The Ln lens Ln is a negative lens in which a surface on the image side is a concave surface. In the example shown in FIG. 1, the lenses L11 to L14 each correspond to the Ln lens Ln. With such a configuration, since the negative refractive power can be dispersed among the three or more Ln lenses Ln, the absolute value of the incidence angle of the ray with respect to each lens surface can be made small, and an increase in astigmatism can be suppressed. In addition, the absolute value of the curvature radius of each Ln lens Ln can be made large, and it is advantageous for the processability of the lens. In a case in which two or more Ln lenses Ln are meniscus lenses among the three or more Ln lenses Ln that are consecutively disposed as described above, an increase in astigmatism can be further suppressed.

It is preferable that the first lens group G1 includes four or fewer Ln lenses Ln that are consecutively disposed. By setting the number of Ln lenses Ln to four or fewer, it is possible to suppress an increase in size and an increase in weight of the lens system, and it is advantageous for cost reduction.

In the imaging lens of the present disclosure, the material of the lens is selected in consideration of the wavelength ranges of the visible range and the SWIR range, and in particular, the Abbe number and the partial dispersion ratio are set as described below. For each lens of the first lens group G1 and the second lens group G2, the refractive index at a wavelength of 435.83 nm (g-line) is denoted by ng, the refractive index at a wavelength of 1529.58 nm is denoted by na, and the refractive index at a wavelength of 2325.42 nm is denoted by nb. Then, for each lens, the Abbe number v and the partial dispersion ratio $\theta$ are defined as $$v=(na-1)/(ng-nb) \text{ and }$$

$$\theta=(na-nb)/(ng-nb), \text{ respectively.}$$

Among the three or more Ln lenses Ln that are consecutively disposed and included in the first lens group G1, for two Ln lenses Ln selected in descending order of refractive power, the average of the Abbe numbers v is denoted by vave, and the average of the partial dispersion ratios $\theta$ is denoted by $\theta$ave. The "two Ln lenses Ln selected in descending order of refractive power among the three or more Ln lenses Ln . . . " specifically means that, in a case in which only one Ln lens Ln with the strongest refractive power is provided, an Ln lens Ln with the strongest refractive power and an Ln lens Ln with the second strongest refractive power among the three or more Ln lenses Ln. In addition, the refractive powers of the "two Ln lenses Ln selected in descending order of refractive power . . . " may be the same.

In this case, in a Cartesian coordinate system with the horizontal axis representing the Abbe number ν and the vertical axis representing the partial dispersion ratio θ, the material of the two Ln lenses Ln selected in descending order of refractive power among the three or more Ln lenses Ln is selected such that νave and θave are included in a common region of four regions,
a first region represented by $θ>0.0250×ν−0.1300$,
a second region represented by $θ<0.0250×ν−0.0075$,
a third region represented by $θ>0.0225$, and
a fourth region represented by $θ<0.1650$.

Figure 2:
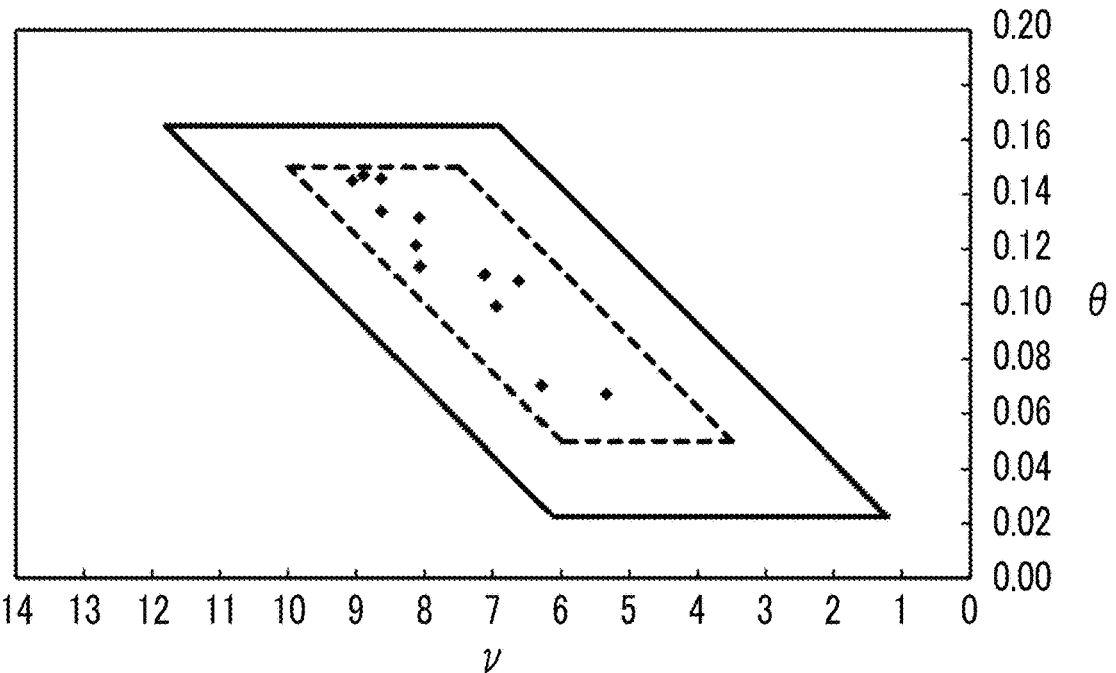
FIG. 2 is a diagram illustrating a material of a negative lens.

FIG. 2 shows an example of the above-described Cartesian coordinate system. A quadrangular region surrounded by a solid line in FIG. 2 corresponds to the common region of the four regions, that is, the first to fourth regions. The plot shown in FIG. 2 corresponds to νave and θave of Examples 1 to 14, which will be described later.

By selecting the material of the common region of the first to fourth regions, a first-order axial chromatic aberration, a second-order chromatic aberration, a lateral chromatic aberration, a spherical aberration, an astigmatism, and a distortion in a wide wavelength range from the visible range to the SWIR range are easily corrected in a well-balanced manner, and it is advantageous for achieving high performance. If a material that is not included in the common region of the first to fourth regions is selected, it becomes difficult to correct the chromatic aberration and the residual secondary spectrum, and in this case, attempting to correct these may increase the spherical aberration.

In addition, by selecting the material of the common region of the first to fourth regions, it is possible to favorably correct the chromatic aberration without increasing the number of lenses, and it is possible to suppress an increase in size of the lens system. If a material that is not included in the common region of the first to fourth regions is selected, attempting to correct the axial chromatic aberration in a wide wavelength range from the visible range to the SWIR range may increase the number of lenses and enlarge the lens system.

In order to obtain better characteristics, in the above-described Cartesian coordinate system, it is preferable that the material of the two Ln lenses Ln selected in descending order of refractive power among the three or more Ln lenses Ln is selected such that νave and θave are included in a common region of four regions,
a fifth region represented by $θ>0.0250×ν−0.1000$,
a sixth region represented by $θ<0.0250×ν−0.0375$,
a seventh region represented by $θ>0.0500$, and
an eighth region represented by $θ<0.1500$.

A quadrangular region surrounded by a dashed line in FIG. 2 corresponds to the common region of the four regions, that is, the fifth to eighth regions.

Further, it is preferable that the imaging lens of the present disclosure has at least one of the configurations to be described below. It is preferable that, in a case in which the average of the Abbe numbers ν of all the positive lenses of the imaging lens is denoted by νPave and the average of the Abbe numbers ν of all the negative lenses of the imaging lens is denoted by νNave, the imaging lens satisfies Conditional Expression (1). Satisfying Conditional Expression (1) is advantageous for correcting the first-order chromatic aberration with respect to the g-line and light having a wavelength of 2325.42 nm. Further, in a case in which a configuration in which Conditional Expression (1-1) is satisfied is employed, better characteristics can be obtained.

$$6<νPave−νNave<12 \qquad (1)$$

$$6.5<νPave−νNave<11.5 \qquad (1-1)$$

It is preferable that, in a case in which the average of the partial dispersion ratios θ of all the positive lenses of the imaging lens is denoted by θPave and the average of the partial dispersion ratios θ of all the negative lenses of the imaging lens is denoted by θNave, the imaging lens satisfies Conditional Expression (2). Satisfying Conditional Expression (2) is advantageous for correcting the residual secondary spectrum. Further, in a case in which a configuration in which Conditional Expression (2-1) is satisfied is employed, better characteristics can be obtained.

$$0.01<θPave−θNave<0.1 \qquad (2)$$

$$0.015<θPave−θNave<0.095 \qquad (2-1)$$

It is more preferable that the imaging lens satisfies Conditional Expressions (1) and (2) at the same time. It is still more preferable that Conditional Expressions (1) and (2) are satisfied at the same time and then at least one of Conditional Expression (1-1) or Conditional Expression (2-1) is satisfied.

Figure 3:
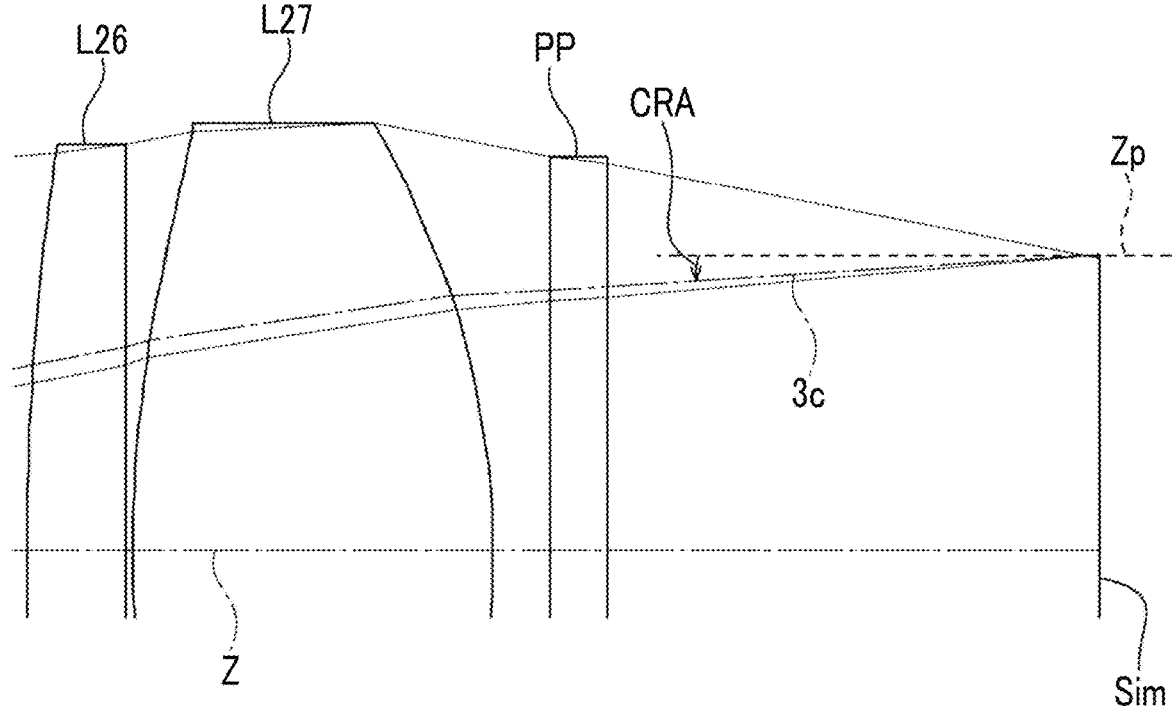
FIG. 3 is a diagram illustrating CRA.

It is preferable that, in a case in which the angle formed between the chief ray $3c$ incident on the maximum image height on an image plane Sim and an axis Zp parallel to the optical axis Z is denoted by CRA and the unit of CRA is degrees, the imaging lens satisfies Conditional Expression (3). As an example, FIG. 3 shows a partially enlarged view including the chief ray $3c$ of the maximum image height, the axis Zp parallel to the optical axis Z, and CRA. Conditional Expression (3) is an expression related to the telecentricity of the ray emitted from the lens system. By satisfying Conditional Expression (3), the absolute value of the incidence angle of a sensor disposed on the image plane Sim with respect to a light-receiving surface can be made small, and a decrease in peripheral light intensity ratio can be suppressed. Further, in a case in which a configuration in which Conditional Expression (3-1) is satisfied is employed, better characteristics can be obtained.

$$0≤|CRA|<10 \qquad (3)$$

$$0<|CRA|<9 \qquad (3-1)$$

It is preferable that, in a case in which the sum of a distance on the optical axis from a lens surface closest to the object side of the imaging lens to a lens surface closest to the image side of the imaging lens and a back focus in terms of an air conversion distance of the imaging lens at a wavelength of 1529.58 nm is denoted by TL and a focal length of the imaging lens at a wavelength of 1529.58 nm is denoted by f, the imaging lens satisfies Conditional Expression (4). By ensuring that the corresponding value of Conditional Expression (4) is not equal to or less than the lower limit, the total length of the lens system is not excessively shortened, so that it is possible to prevent the refractive power of each lens from being excessively strong. This makes it possible to suppress the occurrence of the higher-order spherical aberration for each wavelength and to easily correct the chromatic aberration in a wide wavelength range. By ensuring that the corresponding value of Conditional Expression (7) is not equal to or greater than the upper limit, it is possible to suppress an increase in the total length of the lens system.

Further, in a case in which a configuration in which Conditional Expression (4-1) is satisfied is employed, better characteristics can be obtained.

$$29 < TL/f < 38 \tag{4}$$

$$29.5 < TL/f < 37.6 \tag{4-1}$$

It is preferable that, in a case in which the focal length of the first lens group G1 at a wavelength of 1529.58 nm is denoted by fG1 and the focal length of the second lens group G2 at a wavelength of 1529.58 nm is denoted by fG2, the imaging lens satisfies Conditional Expression (5). By satisfying Conditional Expression (5), a good balance between the refractive powers of the first lens group G1 and the second lens group G2 can be maintained, so that the lateral chromatic aberration and the distortion are easily corrected. Further, in a case in which a configuration in which Conditional Expression (5-1) is satisfied is employed, better characteristics can be obtained.

$$0.4 < fG2/fG1 < 2 \tag{5}$$

$$0.5 < fG2/fG1 < 1.9 \tag{5-1}$$

It is preferable that, in a case in which the focal length of the first lens group G1 at a wavelength of 1529.58 nm is denoted by fG1 and the focal length of the lens disposed closest to the image side of the first lens group G1 at a wavelength of 1529.58 nm is denoted by fLp, the imaging lens satisfies Conditional Expression (6). By satisfying Conditional Expression (6), the axial chromatic aberration generated in the first lens group G1 can be suppressed in a wide wavelength range from the visible range to the SWIR range, and it is advantageous for achieving high performance. Further, in a case in which a configuration in which Conditional Expression (6-1) is satisfied is employed, better characteristics can be obtained.

$$1.3 < fLp/fG1 < 3.1 \tag{6}$$

$$1.4 < fLp/fG1 < 3.0 \tag{6-1}$$

It is preferable that, in a case in which the effective diameter of the lens surface closest to the object side of the imaging lens is denoted by $\varphi t$ and the effective diameter of the lens surface closest to the image side of the imaging lens is denoted by $\varphi e$, the imaging lens satisfies Conditional Expression (7). By ensuring that the corresponding value of Conditional Expression (7) is not equal to or less than the lower limit, the absolute value of the incidence angle of the sensor disposed on the image plane Sim with respect to the light-receiving surface can be made small, and a decrease in peripheral light intensity ratio can be suppressed. By ensuring that the corresponding value of Conditional Expression (7) is not equal to or greater than the upper limit, it is possible to suppress an increase in size and an increase in weight of the lens system, and it is advantageous for cost reduction. Further, in a case in which a configuration in which Conditional Expression (6-1) is satisfied is employed, better characteristics can be obtained. The "effective diameter" means the diameter of a circle consisting of a point farthest from the optical axis Z in the radial direction in a case of considering points where all the rays contributing to the image formation and the lens surface intersect.

$$2.5 < \varphi t/\varphi e < 8 \tag{7}$$

$$3.0 < \varphi t/\varphi e < 7.5 \tag{7-1}$$

It is preferable that, in a case in which the Abbe number v of the lens closest to the image side of the imaging lens is denoted by vE, the imaging lens satisfies Conditional Expression (8). By ensuring that the corresponding value of Conditional Expression (8) is not equal to or less than the lower limit, the lateral chromatic aberration can be suppressed in a wide wavelength range from the visible range to the SWIR range, and it is advantageous for achieving high performance. In addition, by ensuring that the corresponding value of Conditional Expression (8-1) is not equal to or greater than the upper limit, the axial chromatic aberration can be suppressed in a wide wavelength range from the visible range to the SWIR range, and it is advantageous for achieving high performance. Further, in a case in which a configuration in which Conditional Expression (8-2) is satisfied is employed, better characteristics can be obtained.

$$17 < vE \tag{8}$$

$$17 < vE < 28 \tag{8-1}$$

$$18.5 < vE < 26.5 \tag{8-2}$$

FIG. 1 shows an example in which the first lens group G1 consists of seven lenses and the second lens group G2 consists of seven lenses, but the number of lenses different from the example shown in FIG. 1 can also be employed as the number of lenses constituting each lens group. However, in a case in which the number of lenses included in the first lens group G1 is seven or fewer, it is possible to suppress an increase in size and an increase in weight of the lens system, and it is advantageous for cost reduction. Similarly, in a case in which the number of lenses included in the second lens group G2 is seven or fewer, it is possible to suppress an increase in size and an increase in weight of the lens system, and it is advantageous for cost reduction.

Any surface of the imaging lens may be made an aspherical surface in order to improve the degree of freedom in design and to favorably correct aberrations. The aspherical surface may be formed by grinding or molding. Alternatively, a composite aspherical lens may be used as the lens having the aspherical surface.

Specifically, it is preferable that at least one of the three or more Ln lenses Ln that are consecutively disposed and included in the first lens group G1 is an aspherical lens. In such a case, it is advantageous for favorably correcting the distortion and the astigmatism.

In addition, specifically, it is preferable that the lens closest to the image side of the imaging lens is an aspherical lens having a positive refractive power. In such a case, it is advantageous for favorably correcting the distortion and the astigmatism. In addition, CRA is easily adjusted so as to satisfy Conditional Expression (3).

In order to correct the chromatic aberration, any lens group of the imaging lens may be configured to have a refractive index distribution lens, such as a diffractive optical element and a gradient index lens (GRIN lens), or an organic optical material with anomalous dispersion.

The imaging lens preferably has a focusing function. When focusing, the entire imaging lens may be configured to integrally move, at least one lens group may be configured to move, or a part of the imaging lens consisting of at least one lens may be configured to move.

In order to maintain the light transmittance in a wide wavelength range from the visible range to the SWIR range, the imaging lens may be provided with an anti-reflection film. The anti-reflection film may be a film that suppresses reflection in the entire wavelength range to be used, or may be a film that suppresses reflection only in selected some wavelength ranges to be used. The anti-reflection film may be a film formed of a special coating obtained by forming a nano-level structure on the lens surface in a moth-eye shape to suppress reflection.

In a case of manufacturing the imaging lens, a mechanism that adjusts the flange back may be provided in order to align the image formation position. In addition, in a case of manufacturing the imaging lens, a part of the imaging lens consisting of at least one lens or a lens group may be moved to align the image formation position.

It is preferable that the above-described preferable configuration and possible configurations, including the configuration related to the conditional expression, allow for any combination, and are selectively employed as appropriate according to the required specifications.

Next, examples of the imaging lens of the present disclosure will be described.

EXAMPLE 1

Since a cross-sectional view of the configuration of the imaging lens of Example 1 is shown in FIG. 1 and the illustration method is as described above, some overlapping description will be omitted here. The imaging lens of Example 1 consists of the first lens group G1, the aperture stop St, and the second lens group G2 in order from the object side to the image side. The first lens group G1 consists of the lenses L11 to L17 in order from the object side to the image side. The second lens group G2 consists of the lenses L21 to L27 in order from the object side to the image side. The above is the outline of the imaging lens of Example 1.

Regarding the imaging lens of Example 1, the basic lens data is shown in Table 1, the specifications are shown in Table 2, and the aspherical coefficient is shown in Table 3. In Table 1, the column of Sn indicates a surface number in a case in which the surface closest to the object side is set as a first surface and the number is increased by one toward the image side. The column of R indicates the curvature radius of each surface. The column of D indicates a surface spacing on the optical axis between each surface and a surface adjacent to the image side. The column of na indicates the refractive index of each constituent element at a wavelength of 1529.58 nm. The columns of $v$, $\theta$, and material name indicate the Abbe number $v$, the partial dispersion ratio $\theta$, and the material name of each constituent element, respectively. The column of $\varphi$ indicates the effective diameter of each surface.

In Table 1, a sign of the curvature radius of a surface having a shape with a convex surface facing the object side is denoted by positive, and a sign of the curvature radius of a surface having a shape with a convex surface facing the image side is denoted by negative. In addition, Table 1 also shows the aperture stop St and the optical member PP, and the surface number and the phrase (St) are described in the column of the surface number of the surface corresponding to the aperture stop St. The value in the lowest column of D in Table 1 is a spacing between the surface closest to the image side in the table and the image plane Sim. In a case in which a manufacturing company is specified for each material shown in the column of the material name, the manufacturing company name is described after the material name with a period in between. The manufacturing company names are abbreviated as "OHARA" for OHARA INC., and "SCHOTT" for Schott N.Y.C. "CAF2" shown in the column of the material name is fluorite, "ZNSE" is zinc selenium, and "ZNS_MS" is zinc sulfide multispectral.

Table 2 shows the focal length f, the back focus Bf in terms of the air conversion distance, the F-number FNo., and the value of the maximum total angle of view 2 $\omega$. (°) in the column of 2 $\omega$ means that the unit is degrees. The values shown in Tables 1 and 2 are values in a case of using a wavelength of 1529.58 nm as a reference in a state in which the infinite distance object is in focus.

In Table 1, the surface number of the aspherical surface is marked with *, and the numerical value of the paraxial curvature radius is described in the column of the curvature radius of the aspherical surface. In Table 3, the surface number of the aspherical surface is shown in the column of Sn, and the numerical values of the aspherical coefficients for respective aspherical surfaces are shown in the columns of KA and Am (m=3, 4, 5, . . . , 20) are shown. "E±n" (n: integer) of the numerical value of the aspherical coefficient in Table 3 means "×10$^{\pm n}$". KA and Am are aspherical coefficients in the aspheric equation represented by the following equation.

$$Zd=C \times h^2/\{1+(1-KA \times C^2 \times h^2)^{1/2}\}+\Sigma Am \times h^m$$

where

Zd is the depth of the aspherical surface (the length of a perpendicular line drawn from a point on the aspherical surface having a height h to a plane perpendicular to the optical axis with which the aspherical surface apex is in contact), h is the height (the distance from the optical axis to the lens surface), C is the reciprocal of the paraxial curvature radius, and KA and Am are the aspherical coefficients, and $\Sigma$ of the aspheric equation means the sum with respect to m.

In the data in each table, degrees are used as the unit of the angle and millimeters (mm) are used as the unit of the length, but other suitable units can also be used because the optical system can be used with proportional enlargement or proportional reduction. In addition, in each table shown below, numerical values rounded with predetermined digits are described.

TABLE 1

| Example 1 (✗ Based on a wavelength of 1529.58 nm) | | | | | | | |
|---|---|---|---|---|---|---|---|
| Sn | R | D | na | v | θ | Material name | φ |
| 1 | 47.5347 | 6.0256 | 1.50050 | 13.45 | 0.30924 | S-BSL7.OHARA | 78.964 |
| 2 | 34.1495 | 9.9048 | | | | | 59.011 |
| 3 | 40.2366 | 9.6415 | 2.45627 | 3.72 | 0.03541 | ZNSE | 45.533 |
| 4 | 13.5205 | 5.5689 | | | | | 22.604 |
| *5 | −2873.7085 | 4.2716 | 1.82677 | 10.51 | 0.18589 | L-LAH94.OHARA | 22.551 |
| *6 | 13.2878 | 3.1733 | | | | | 16.086 |
| 7 | 49.6455 | 2.1549 | 1.61653 | 11.72 | 0.22300 | S-BAM12.OHARA | 16.074 |
| 8 | 18.3324 | 4.6587 | | | | | 15.605 |
| 9 | −11.7819 | 2.4059 | 1.43023 | 22.04 | 0.27203 | S-FPL55.OHARA | 15.592 |
| 10 | 99.6852 | 7.5326 | 1.86146 | 5.84 | 0.13091 | S-NPH2.OHARA | 20.025 |

TABLE 1-continued

| | | Example 1 (※ Based on a wavelength of 1529.58 nm) | | | | | |
|---|---|---|---|---|---|---|---|
| Sn | R | D | na | ν | θ | Material name | φ |
| 11 | −21.2721 | 3.0176 | | | | | 21.971 |
| 12 | 33.1067 | 16.5696 | 1.42625 | 24.99 | 0.22392 | CAF2 | 20.938 |
| 13 | −30.8958 | 10.1281 | | | | | 16.953 |
| 14 (St) | ∞ | 1.9897 | | | | | 8.681 |
| 15 | −11.4151 | 1.1226 | 1.43023 | 22.04 | 0.27203 | S-FPL55.OHARA | 9.274 |
| 16 | −10.5694 | 0.1000 | | | | | 9.872 |
| 17 | 17.3384 | 4.9117 | 1.42625 | 24.99 | 0.22392 | CAF2 | 11.037 |
| 18 | −9.5395 | 0.6000 | 1.80944 | 6.90 | 0.14470 | S-NPH5.OHARA | 11.330 |
| 19 | −786.7701 | 0.1000 | | | | | 12.359 |
| 20 | 56.6042 | 3.6572 | 1.43023 | 22.04 | 0.27203 | S-FPL55.OHARA | 12.753 |
| 21 | −14.9978 | 0.2547 | | | | | 13.527 |
| 22 | −82.8301 | 0.7106 | 1.78784 | 12.21 | 0.22293 | S-LAH59.OHARA | 13.894 |
| 23 | 49.9605 | 1.7485 | 1.64722 | 12.33 | 0.22400 | S-BAH10.OHARA | 14.202 |
| 24 | ∞ | 0.1000 | | | | | 14.510 |
| *25 | 21.1920 | 6.2892 | 1.48610 | 19.45 | 0.26331 | S-FPL51.OHARA | 14.998 |
| *26 | −14.5550 | 1.0000 | | | | | 15.312 |
| 27 | ∞ | 1.0000 | 1.50050 | 13.45 | 0.30924 | S-BSL7.OHARA | 14.115 |
| 28 | ∞ | 8.6062 | | | | | 13.862 |

TABLE 2

| Example 1 (※ Based on a wavelength of 1529.58 nm) | |
|---|---|
| f | 3.31 |
| Bf | 10.27 |
| FNo. | 1.87 |
| 2ω (°) | 185.0 |

TABLE 3

| | | Example 1 | | |
|---|---|---|---|---|
| Sn | 5 | 6 | 25 | 26 |
| KA | −2.8755174E+07 | 1.0765749E+00 | 2.8080957E+00 | −9.2735441E−01 |
| A3 | 1.7401167E−20 | 1.2710151E−19 | 0.0000000E+00 | 8.3895858E−20 |
| A4 | 7.5649900E−05 | 1.8011807E−05 | −1.0138242E−04 | −8.9886839E−05 |
| A5 | 6.1580237E−06 | 6.1002060E−05 | −2.2423559E−05 | 4.0220232E−06 |
| A6 | −1.1355890E−06 | −2.4283947E−06 | 1.7966218E−06 | −4.3560604E−06 |
| A7 | −7.4531430E−08 | −1.6607039E−06 | 1.1088467E−06 | 8.1751839E−07 |
| A8 | 1.2884520E−08 | 1.1818651E−07 | −1.5810378E−07 | 3.5343664E−07 |
| A9 | 4.4105423E−10 | 2.5047866E−08 | −2.8131309E−08 | −7.5589336E−08 |
| A10 | −1.0639649E−10 | −1.3806391E−09 | 6.0571973E−09 | −1.5042151E−08 |
| A11 | −1.4580721E−12 | −2.3893273E−10 | −6.8834244E−11 | 3.6058492E−09 |
| A12 | 5.3560201E−13 | −1.3552509E−12 | −1.1627145E−10 | 3.6215916E−10 |
| A13 | 3.0951975E−15 | 1.4717563E−12 | 3.0595706E−11 | −1.0218442E−10 |
| A14 | −1.6251540E−15 | 1.3883390E−13 | −1.6651147E−13 | −4.4231926E−12 |
| A15 | −4.0306851E−18 | −5.6433869E−15 | −9.3924311E−13 | 1.7156514E−12 |
| A16 | 2.8826393E−18 | −1.0918921E−15 | 5.6576435E−14 | 1.2861157E−14 |
| A17 | 3.0154150E−21 | 1.2162546E−17 | 1.2415904E−14 | −1.5708415E−14 |
| A18 | −2.7607130E−21 | 3.5503272E−18 | −1.0233798E−15 | 2.4826153E−16 |
| A19 | −1.0077390E−24 | −1.1153141E−20 | −6.3106078E−17 | 6.0246631E−17 |
| A20 | 1.1056526E−24 | −4.3075123E−21 | 6.0423144E−18 | −1.8763874E−18 |

Figure 4:
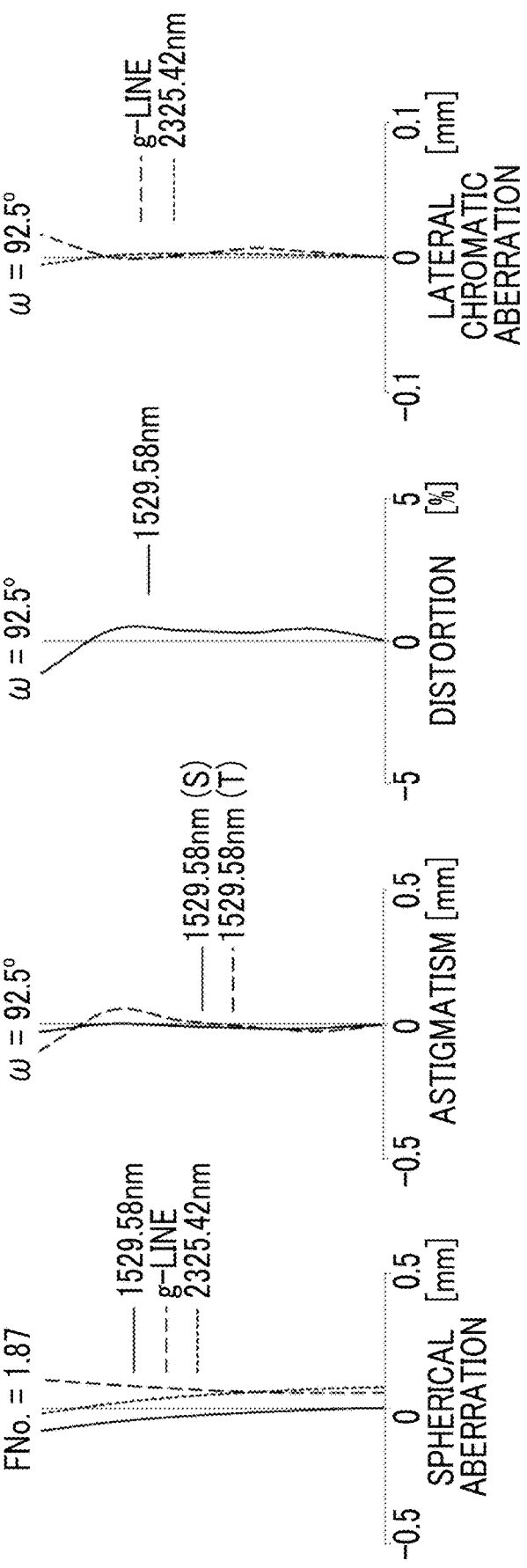
FIG. 4 is each aberration diagram of the imaging lens of Example 1.

FIG. 4 shows each aberration diagram in a state in which the infinite distance object of the imaging lens of Example 1 is in focus. In FIG. 4, the spherical aberration, the astigmatism, the distortion, and the lateral chromatic aberration are shown in order from the left. In the spherical aberration diagram, the aberrations at a wavelength of 1529.58 nm, a g-line, and a wavelength of 2325.42 nm are shown by a solid line, a long dashed line, and a short dashed line, respectively. In the astigmatism diagram, the aberration at a wavelength of 1529.58 nm in the sagittal direction is shown by a solid line, and the aberration at a wavelength of 1529.58 nm in the tangential direction is shown by a dashed line. In the distortion diagram, the aberration at a wave-length of 1529.58 nm based on the equidistant projection method is shown by a solid line. In the lateral chromatic aberration diagram, the aberrations at the g-line and a wavelength of 2325.42 nm are shown by a long dashed line and a short dashed line, respectively. The value of the maximum aperture is described next to "FNo.=" in the spherical aberration diagram, and the value of the maximum half angle of view is described next to "ω=" in the other aberration diagrams.

Unless otherwise specified, the sign, meaning, description method, and illustration method of each data related to Example 1 are the same in the following Examples. Therefore, overlapping descriptions will be omitted below.

EXAMPLE 2

Figure 5:
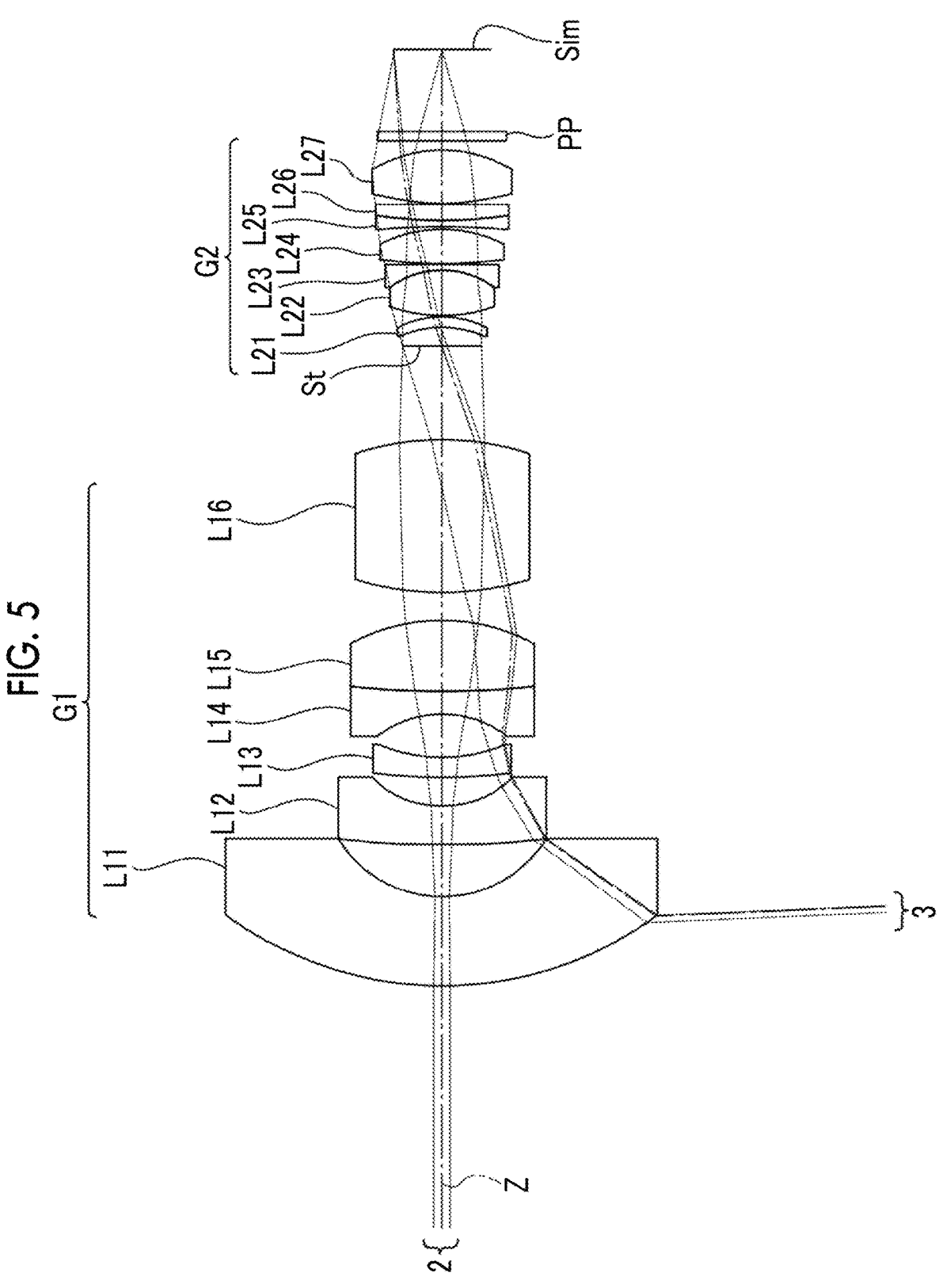
FIG. 5 is a cross-sectional view showing a configuration and a luminous flux of an imaging lens of Example 2.
Figure 6:
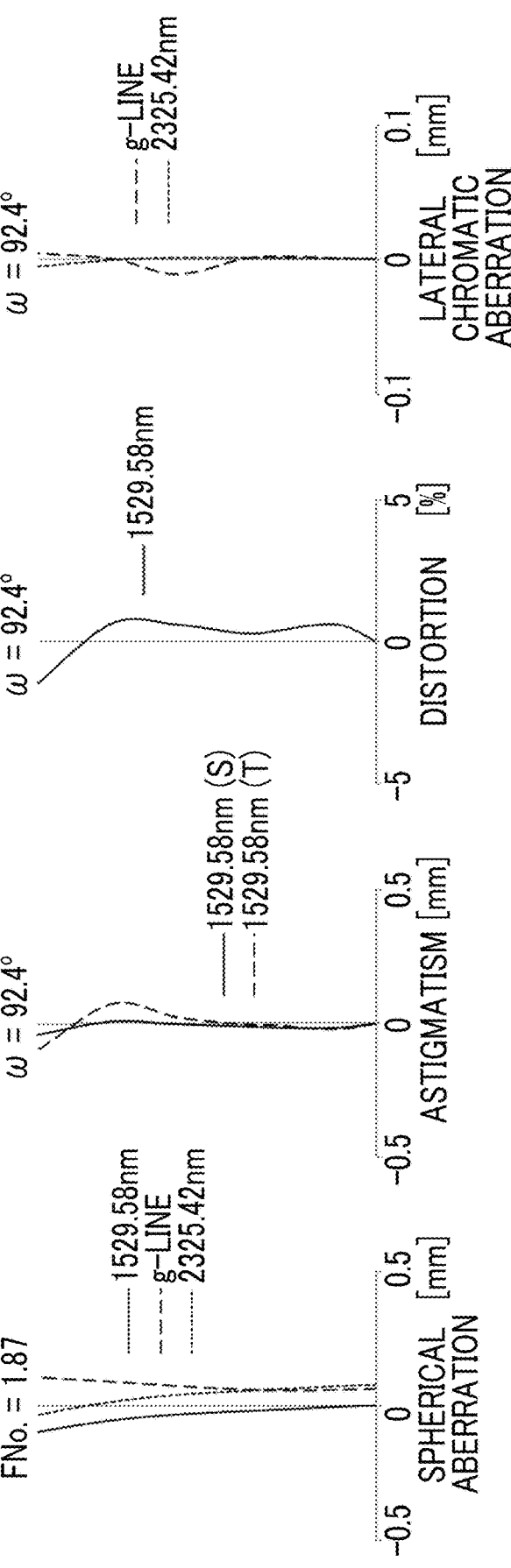
FIG. 6 is each aberration diagram of the imaging lens of Example 2.

FIG. 5 shows a cross-sectional view showing a configuration and a luminous flux of the imaging lens of Example 2. The imaging lens of Example 2 has the same configuration as the outline of the imaging lens of Example 1 except that the first lens group G1 consists of six lenses, that is, lenses L11 to L16, in order from the object side to the image side. Regarding the imaging lens of Example 2, the basic lens data is shown in Table 4, the specifications are shown in Table 5, the aspherical coefficient is shown in Table 6, and each aberration diagram is shown in FIG. 6.

TABLE 4

| Example 2 (✕ Based on a wavelength of 1529.58 nm) | | | | | | | |
|---|---|---|---|---|---|---|---|
| Sn | R | D | na | ν | θ | Material name | φ |
| 1 | 40.2250 | 9.6542 | 2.45627 | 3.72 | 0.03540 | ZNSE | 46.372 |
| 2 | 13.5015 | 5.6871 | | | | | 22.798 |
| *3 | −1034.1155 | 4.2485 | 1.82677 | 10.51 | 0.18590 | L-LAH94.OHARA | 22.776 |
| *4 | 13.0473 | 3.0764 | | | | | 16.035 |
| 5 | 62.1200 | 2.1534 | 1.61653 | 11.72 | 0.22300 | S-BAM12.OHARA | 16.025 |
| 6 | 17.9232 | 4.6593 | | | | | 15.522 |
| 7 | −11.7176 | 2.4644 | 1.43023 | 22.04 | 0.27200 | S-FPL55.OHARA | 15.506 |
| 8 | 94.3050 | 7.7166 | 1.86146 | 5.84 | 0.13090 | S-NPH2.OHARA | 20.030 |
| 9 | −21.2764 | 3.0326 | | | | | 22.043 |
| 10 | 33.5925 | 16.5794 | 1.42625 | 24.99 | 0.22390 | CAF2 | 20.981 |
| 11 | −30.6504 | 10.1733 | | | | | 16.996 |
| 12 (St) | ∞ | 1.9977 | | | | | 8.636 |
| 13 | −11.3179 | 1.1411 | 1.43023 | 22.04 | 0.27200 | S-FPL55.OHARA | 9.228 |
| 14 | −10.5974 | 0.1408 | | | | | 9.843 |
| 15 | 17.3128 | 4.9033 | 1.42625 | 24.99 | 0.22390 | CAF2 | 11.018 |
| 16 | −9.5861 | 0.6005 | 1.80944 | 6.90 | 0.14470 | S-NPH5.OHARA | 11.311 |
| 17 | −1396.7396 | 0.1135 | | | | | 12.328 |
| 18 | 56.0312 | 3.6952 | 1.43023 | 22.04 | 0.27200 | S-FPL55.OHARA | 12.725 |
| 19 | −14.9090 | 0.2764 | | | | | 13.512 |
| 20 | −81.7991 | 0.6780 | 1.78784 | 12.21 | 0.22290 | S-LAH59.OHARA | 13.879 |
| 21 | 48.1675 | 1.7581 | 1.64722 | 12.33 | 0.22400 | S-BAH10.OHARA | 14.183 |
| 22 | 2474.3619 | 0.1003 | | | | | 14.491 |
| *23 | 21.2544 | 5.8913 | 1.48610 | 19.45 | 0.26330 | S-FPL51.OHARA | 14.971 |
| *24 | −14.3506 | 1.0000 | | | | | 15.265 |
| 25 | ∞ | 1.0000 | 1.50050 | 13.45 | 0.30920 | S-BSL7.OHARA | 14.101 |
| 26 | ∞ | 8.8672 | | | | | 13.854 |

TABLE 5

| Example 2 (✕ Based on a wavelength of 1529.58 nm) | |
|---|---|
| f | 3.32 |
| Bf | 10.53 |
| FNo. | 1.87 |
| 2ω (°) | 184.8 |

TABLE 6

| Example 2 | | | | |
|---|---|---|---|---|
| Sn | 3 | 4 | 23 | 24 |
| KA | −2.8755174E+07 | 1.0764238E+00 | 2.8081002E+00 | −9.2737017E−01 |
| A3 | −2.0156959E−19 | −5.5788354E−20 | 6.5083726E−21 | −2.4285852E−20 |
| A4 | 7.5970297E−05 | 5.9831155E−05 | −1.1251149E−04 | −9.9248158E−05 |
| A5 | 6.5568028E−06 | 6.2775045E−05 | −2.6861944E−05 | 5.8121723E−06 |
| A6 | −1.1279572E−06 | −5.0603461E−06 | 2.3496926E−06 | −4.0267821E−06 |
| A7 | −7.9860001E−08 | −1.7380713E−06 | 1.5091190E−06 | 7.8367315E−07 |
| A8 | 1.2723587E−08 | 1.9995470E−07 | −1.5334551E−07 | 3.7036879E−07 |
| A9 | 4.8074217E−10 | 2.6572457E−08 | −4.9986201E−08 | −7.6193541E−08 |
| A10 | −1.0527884E−10 | −2.7726578E−09 | 4.1084186E−09 | −1.7220970E−08 |
| A11 | −1.6356132E−12 | −2.5705833E−10 | 7.3138164E−10 | 3.6773353E−09 |
| A12 | 5.3212245E−13 | 1.2121226E−11 | −4.2068150E−12 | 4.6284777E−10 |
| A13 | 3.5858941E−15 | 1.6070652E−12 | 1.0758434E−11 | −1.0449766E−10 |
| A14 | −1.6214551E−15 | 6.4655418E−14 | −3.4840186E−12 | −7.0245294E−12 |
| A15 | −4.8507235E−18 | −6.2590647E−15 | −6.2194781E−13 | 1.7511980E−12 |

TABLE 6-continued

| | | Example 2 | | |
|---|---|---|---|---|
| Sn | 3 | 4 | 23 | 24 |
| A16 | 2.8875056E−18 | −8.7411807E−16 | 1.1163007E−13 | 5.2343020E−14 |
| A17 | 3.7758063E−21 | 1.3709254E−17 | 9.4925337E−15 | −1.5965298E−14 |
| A18 | −2.7756021E−21 | 3.2744997E−18 | −1.5054467E−15 | −8.0194624E−17 |
| A19 | −1.3081686E−24 | −1.2780738E−20 | −5.1420720E−17 | 6.0896776E−17 |
| A20 | 1.1154710E−24 | −4.2626459E−21 | 7.7650985E−18 | −7.2171267E−19 |

EXAMPLE 3

Figure 7:
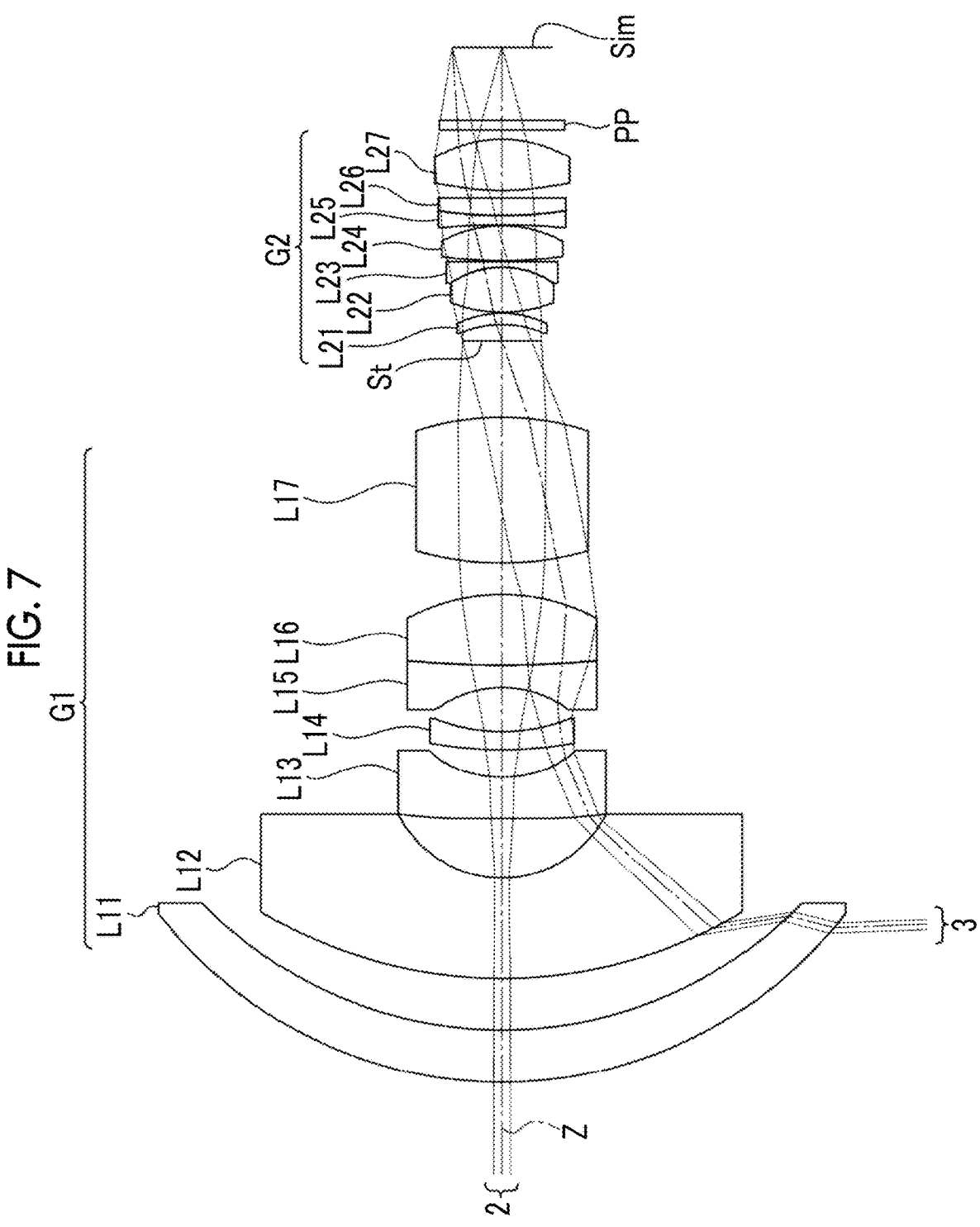
FIG. 7 is a cross-sectional view showing a configuration and a luminous flux of an imaging lens of Example 3.
Figure 8:
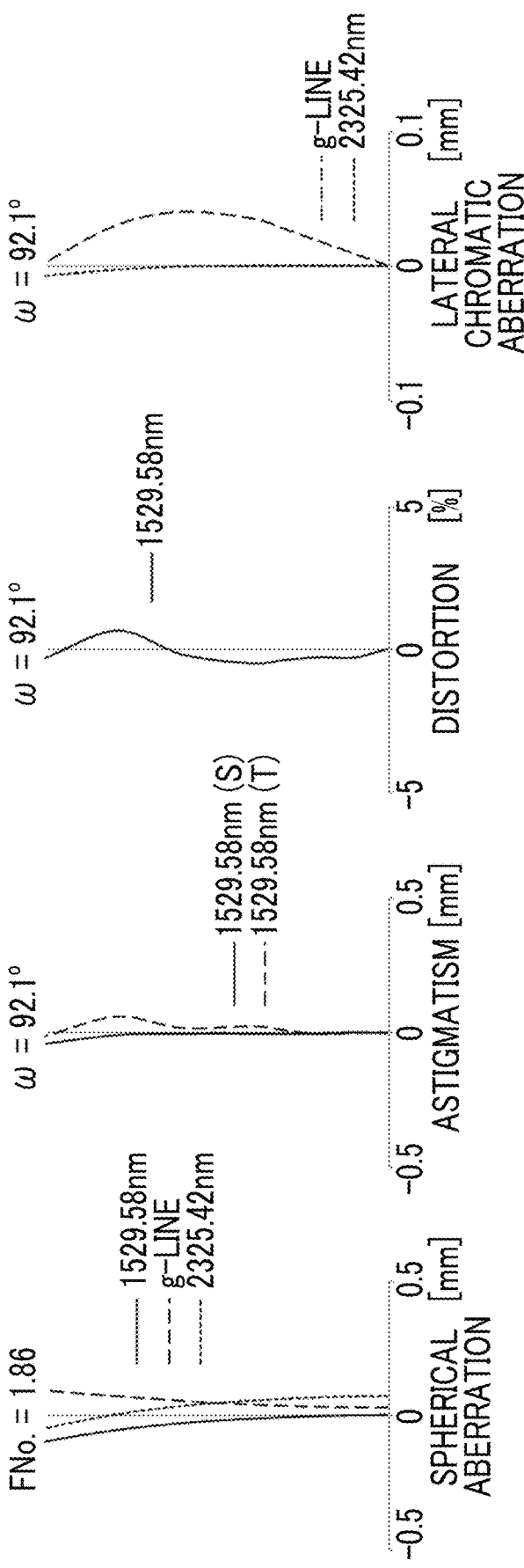
FIG. 8 is each aberration diagram of the imaging lens of Example 3.

FIG. 7 shows a cross-sectional view showing a configuration and a luminous flux of the imaging lens of Example 3. The imaging lens of Example 3 has the same configuration as the outline of the imaging lens of Example 1. Regarding the imaging lens of Example 3, the basic lens data is shown in Table 7, the specifications are shown in Table 8, the aspherical coefficient is shown in Table 9, and each aberration diagram is shown in FIG. 8.

TABLE 7

| | Example 3 (※ Based on a wavelength of 1529.58 nm) | | | | | | |
|---|---|---|---|---|---|---|---|
| Sn | R | D | na | ν | θ | Material name | φ |
| 1 | 46.3798 | 5.5550 | 1.50050 | 13.45 | 0.30920 | S-BSL7.OHARA | 72.950 |
| 2 | 44.7694 | 5.4471 | | | | | 63.566 |
| 3 | 50.4307 | 10.6319 | 2.27234 | 5.63 | 0.04160 | ZNS_MS | 50.569 |
| 4 | 12.4880 | 6.2874 | | | | | 22.178 |
| *5 | 1316.9708 | 4.4014 | 1.82677 | 10.51 | 0.18590 | L-LAH94.OHARA | 22.162 |
| *6 | 13.7368 | 2.9308 | | | | | 16.133 |
| 7 | 42.7446 | 1.9213 | 1.61653 | 11.72 | 0.22300 | S-BAM12.OHARA | 16.094 |
| 8 | 19.4421 | 4.6482 | | | | | 15.578 |
| 9 | −12.0079 | 2.3669 | 1.43023 | 22.04 | 0.27200 | S-FPL55.OHARA | 15.613 |
| 10 | 108.9530 | 7.5187 | 1.86146 | 5.84 | 0.13090 | S-NPH2.OHARA | 19.346 |
| 11 | −21.3533 | 3.3125 | | | | | 21.184 |
| 12 | 33.2584 | 15.4565 | 1.42625 | 24.99 | 0.22390 | CAF2 | 19.648 |
| 13 | −29.9216 | 8.1050 | | | | | 15.428 |
| 14 (St) | ∞ | 1.7211 | | | | | 8.419 |
| 15 | −11.5757 | 1.2078 | 1.43023 | 22.04 | 0.27200 | S-FPL55.OHARA | 8.900 |
| 16 | −10.8461 | 0.1000 | | | | | 9.547 |
| 17 | 15.3884 | 4.7524 | 1.42625 | 24.99 | 0.22390 | CAF2 | 10.666 |
| 18 | −9.6896 | 0.6000 | 1.80944 | 6.90 | 0.14470 | S-NPH5.OHARA | 10.903 |
| 19 | −1006.8482 | 0.1000 | | | | | 11.763 |
| 20 | 52.0709 | 3.6698 | 1.43023 | 22.04 | 0.27200 | S-FPL55.OHARA | 12.105 |
| 21 | −13.6447 | 0.1000 | | | | | 12.805 |
| 22 | −71.2204 | 0.9690 | 1.78784 | 12.21 | 0.22290 | S-LAH59.OHARA | 12.995 |
| 23 | 45.3208 | 1.8466 | 1.64722 | 12.33 | 0.22400 | S-BAH10.OHARA | 13.271 |
| 24 | 2136.8004 | 0.7878 | | | | | 13.542 |
| *25 | 23.0633 | 5.5554 | 1.48610 | 19.45 | 0.26330 | S-FPL51.OHARA | 14.057 |
| *26 | −13.8141 | 1.0000 | | | | | 14.370 |
| 27 | ∞ | 1.0000 | 1.50050 | 13.45 | 0.30920 | S-BSL7.OHARA | 13.371 |
| 28 | ∞ | 7.7079 | | | | | 13.146 |

TABLE 8

| Example 3 (※ Based on a wavelength of 1529.58 nm) | |
|---|---|
| f | 3.29 |
| Bf | 9.37 |
| FNo. | 1.86 |
| 2ω (°) | 184.2 |

TABLE 9

| | Example 3 | | | |
|---|---|---|---|---|
| Sn | 5 | 6 | 25 | 26 |
| KA | −2.8755174E+07 | 1.0314534E+00 | 3.0197047E+00 | −1.1166353E+00 |
| A3 | −3.3607172E−20 | 0.0000000E+00 | −2.6186421E−20 | −8.8739590E−20 |
| A4 | 2.1214892E−05 | −4.7660722E−05 | −1.3489821E−04 | −1.0049563E−04 |
| A5 | 5.7200489E−06 | 4.3130183E−05 | −3.2541825E−05 | 8.7575667E−06 |
| A6 | −5.6563351E−08 | 8.8927421E−07 | 3.3407593E−06 | −6.4225009E−06 |
| A7 | −6.3521817E−08 | −1.2037102E−06 | 1.9219167E−06 | 8.8818872E−07 |
| A8 | 1.3723808E−09 | 2.0974637E−08 | −3.5362006E−07 | 3.8814703E−07 |
| A9 | 3.6191450E−10 | 1.8765498E−08 | −7.3299271E−08 | −1.0079254E−07 |
| A10 | −2.6172301E−11 | −2.9316642E−10 | 2.0301493E−08 | −5.4169559E−09 |
| A11 | −1.2099047E−12 | −1.8486282E−10 | 1.4017634E−09 | 5.5869008E−09 |
| A12 | 1.6961070E−13 | −1.6041661E−12 | −7.9399803E−10 | −5.1288265E−10 |
| A13 | 2.6513047E−15 | 1.1524143E−12 | 1.2988300E−11 | −1.8366730E−10 |
| A14 | −5.5167094E−16 | 4.5615838E−14 | 1.9870185E−11 | 3.0891017E−11 |
| A15 | −3.6498362E−18 | −4.3628342E−15 | −1.2232680E−12 | 3.5832690E−12 |
| A16 | 9.6736687E−19 | −3.0031860E−16 | −2.8699483E−13 | −7.5064655E−13 |
| A17 | 2.9021583E−21 | 9.0960335E−18 | 2.2624512E−14 | −3.8125366E−14 |
| A18 | −8.7928482E−22 | 8.5066597E−19 | 2.0261948E−15 | 8.8352275E−15 |
| A19 | −1.0167063E−24 | −7.9706523E−21 | −1.4394885E−16 | 1.6965054E−16 |
| A20 | 3.2646250E−25 | −9.0395244E−22 | −4.2387432E−18 | −4.1319664E−17 |

EXAMPLE 4

Figure 9:
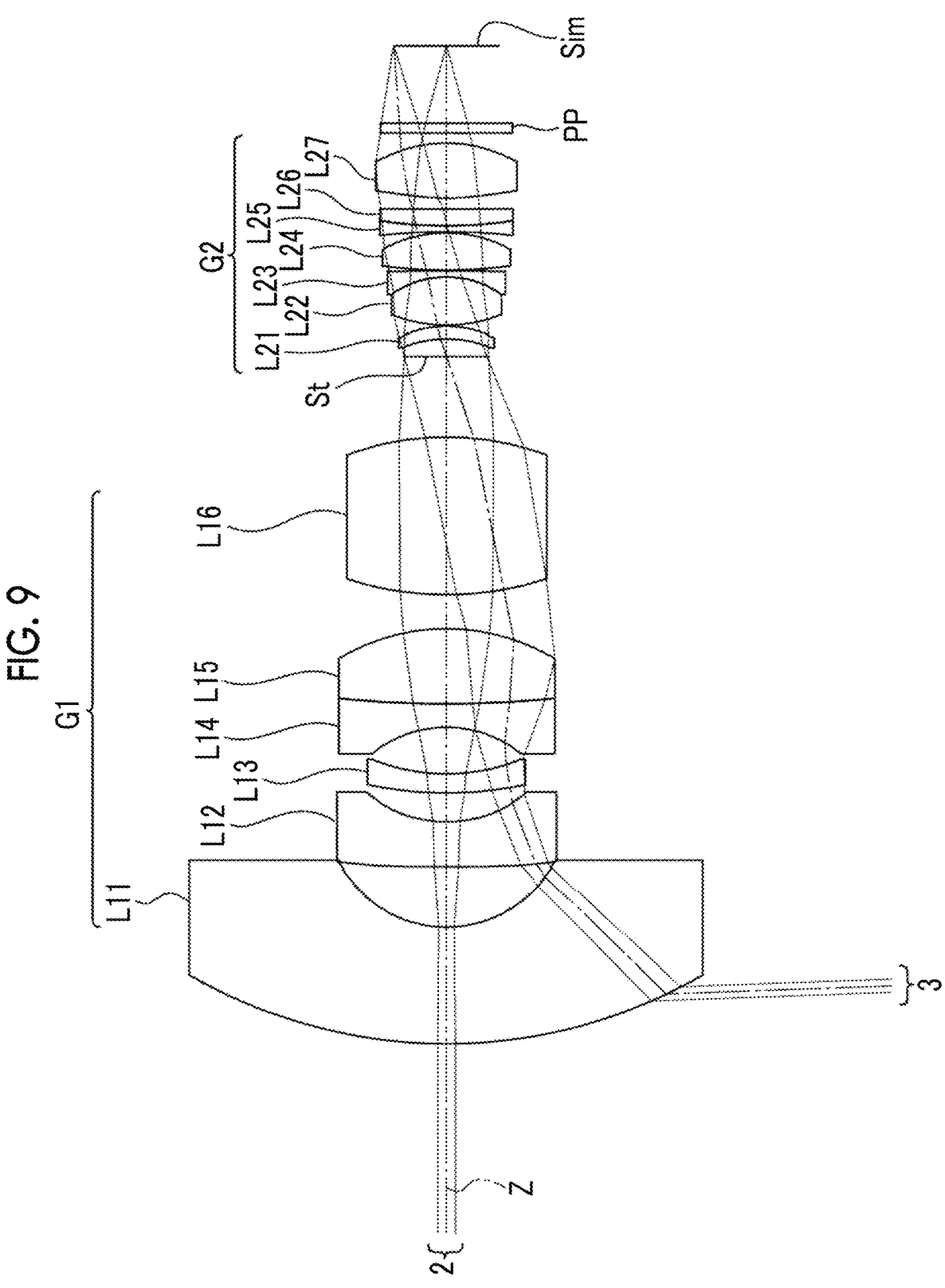
FIG. 9 is a cross-sectional view showing a configuration and a luminous flux of an imaging lens of Example 4.
Figure 10:
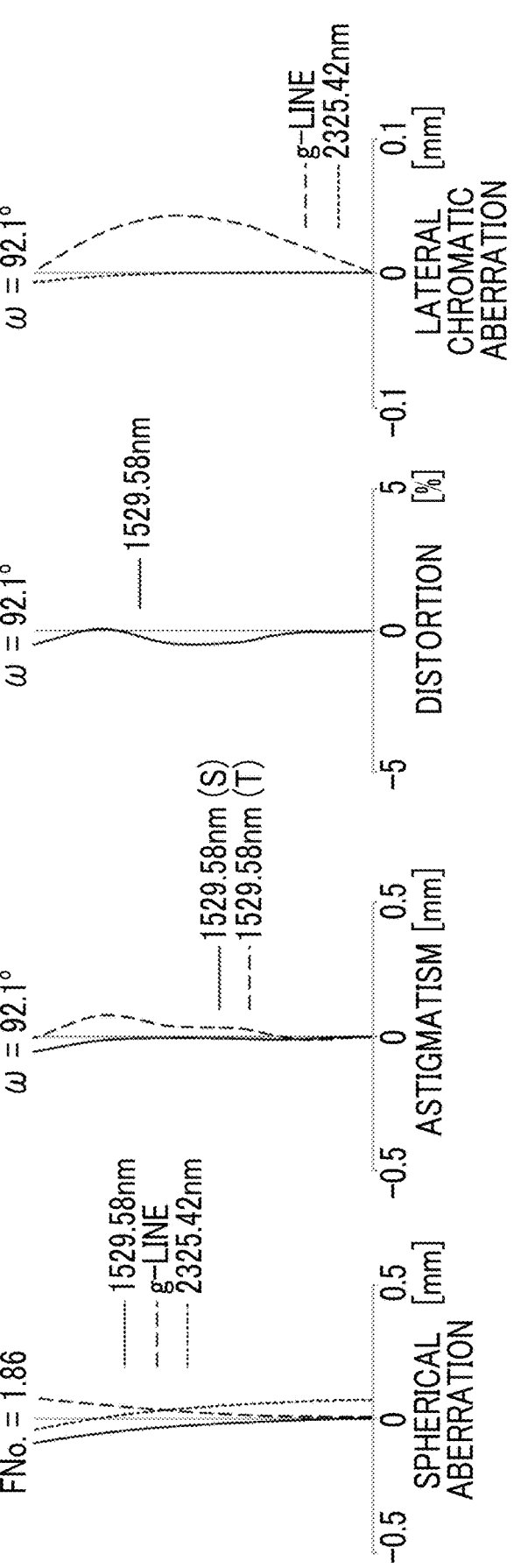
FIG. 10 is each aberration diagram of the imaging lens of Example 4.

FIG. 9 shows a cross-sectional view showing a configuration and a luminous flux of the imaging lens of Example 4. The imaging lens of Example 4 has the same configuration as the outline of the imaging lens of Example 1 except that the first lens group G1 consists of six lenses, that is, lenses L11 to L16, in order from the object side to the image side. Regarding the imaging lens of Example 4, the basic lens data is shown in Table 10, the specifications are shown in Table 11, the aspherical coefficient is shown in Table 12, and each aberration diagram is shown in FIG. 10.

TABLE 11

| Example 4 (※ Based on a wavelength of 1529.58 nm) | |
|---|---|
| f | 3.30 |
| Bf | 9.32 |
| FNo. | 1.86 |
| 2ω (°) | 184.2 |

TABLE 10

| | Example 4 (※ Based on a wavelength of 1529.58 nm) | | | | | | |
|---|---|---|---|---|---|---|---|
| Sn | R | D | na | ν | θ | Material name | φ |
| 1 | 52.1997 | 11.5256 | 2.27234 | 5.63 | 0.04160 | ZNS_MS | 50.835 |
| 2 | 12.3311 | 6.0564 | | | | | 21.893 |
| *3 | 2548.6716 | 4.4780 | 1.82677 | 10.51 | 0.18590 | L-LAH94.OHARA | 22.026 |
| *4 | 14.1237 | 2.8601 | | | | | 16.471 |
| 5 | 38.6724 | 1.8990 | 1.61653 | 11.72 | 0.22300 | S-BAM12.OHARA | 16.471 |
| 6 | 20.2996 | 4.6260 | | | | | 16.019 |
| 7 | −12.1002 | 2.3445 | 1.43023 | 22.04 | 0.27200 | S-FPL55.OHARA | 16.007 |
| 8 | 112.0519 | 7.5113 | 1.86146 | 5.84 | 0.13090 | S-NPH2.OHARA | 19.973 |
| 9 | −21.3744 | 3.4042 | | | | | 21.795 |
| 10 | 33.2222 | 15.6513 | 1.42625 | 24.99 | 0.22390 | CAF2 | 20.154 |
| 11 | −29.4548 | 8.0712 | | | | | 15.813 |
| 12 (St) | ∞ | 1.7426 | | | | | 8.493 |
| 13 | −11.5631 | 1.2003 | 1.43023 | 22.04 | 0.27200 | S-FPL55.OHARA | 8.965 |
| 14 | −10.8885 | 0.1015 | | | | | 9.603 |
| 15 | 14.9961 | 4.7825 | 1.42625 | 24.99 | 0.22390 | CAF2 | 10.722 |
| 16 | −9.7098 | 0.6000 | 1.80944 | 6.90 | 0.14470 | S-NPH5.OHARA | 10.924 |
| 17 | −763.4605 | 0.1000 | | | | | 11.756 |
| 18 | 50.9034 | 3.6861 | 1.43023 | 22.04 | 0.27200 | S-FPL55.OHARA | 12.094 |
| 19 | −13.4351 | 0.1078 | | | | | 12.758 |
| 20 | −64.5025 | 0.6000 | 1.78784 | 12.21 | 0.22290 | S-LAH59.OHARA | 12.900 |
| 21 | 44.7840 | 1.6521 | 1.64722 | 12.33 | 0.22400 | S-BAH10.OHARA | 13.105 |
| 22 | 456.4008 | 1.1517 | | | | | 13.331 |
| *23 | 23.1951 | 5.4738 | 1.48610 | 19.45 | 0.26330 | S-FPL51.OHARA | 13.938 |
| *24 | −13.8410 | 1.0000 | | | | | 14.256 |
| 25 | ∞ | 1.0000 | 1.50050 | 13.45 | 0.30920 | S-BSL7.OHARA | 13.289 |
| 26 | ∞ | 7.6525 | | | | | 13.068 |

TABLE 12

| | Example 4 | | | |
|---|---|---|---|---|
| Sn | 3 | 4 | 23 | 24 |
| KA | −2.8755174E+07 | 1.0306639E+00 | 3.0197251E+00 | −1.1166765E+00 |
| A3 | −2.9920101E−20 | −9.7592800E−20 | 8.3085133E−20 | −5.7374962E−20 |
| A4 | 2.6462549E−05 | −5.0784189E−05 | −1.4058022E−04 | −1.0230311E−04 |
| A5 | 6.2061489E−06 | 4.6408702E−05 | −3.3958468E−05 | 8.9814548E−06 |
| A6 | −1.3826440E−07 | 1.3451754E−06 | 3.5395370E−06 | −6.6372441E−06 |
| A7 | −6.9478976E−08 | −1.3583876E−06 | 2.0336671E−06 | 9.2162340E−07 |
| A8 | 2.2206319E−09 | 9.8050513E−09 | −3.7704356E−07 | 4.0493981E−07 |
| A9 | 4.0294719E−10 | 2.2110735E−08 | −7.8707941E−08 | −1.0570694E−07 |
| A10 | −3.2418313E−11 | −9.0578904E−11 | 2.1962331E−08 | −5.7077555E−09 |
| A11 | −1.3760986E−12 | −2.2768198E−10 | 1.5290126E−09 | 5.9219330E−09 |
| A12 | 1.9955842E−13 | −4.7637881E−12 | −8.7211132E−10 | −5.4667842E−10 |
| A13 | 3.0753963E−15 | 1.4844025E−12 | 1.4316973E−11 | −1.9675600E−10 |
| A14 | −6.4089771E−16 | 7.7351529E−14 | 2.2163726E−11 | 3.3270828E−11 |
| A15 | −4.3123611E−18 | −5.8771518E−15 | −1.3732941E−12 | 3.8795128E−12 |
| A16 | 1.1242304E−18 | −4.7842412E−16 | −3.2513687E−13 | −8.1702942E−13 |
| A17 | 3.4847990E−21 | 1.2811215E−17 | 2.5801999E−14 | −4.1716934E−14 |
| A18 | −1.0279103E−21 | 1.3584740E−18 | 2.3319342E−15 | 9.7185324E−15 |
| A19 | −1.2377150E−24 | −1.1733182E−20 | −1.6674058E−16 | 1.8760933E−16 |
| A20 | 3.8496634E−25 | −1.4770244E−21 | −4.9601329E−18 | −4.5932803E−17 |

EXAMPLE 5

Figure 11:
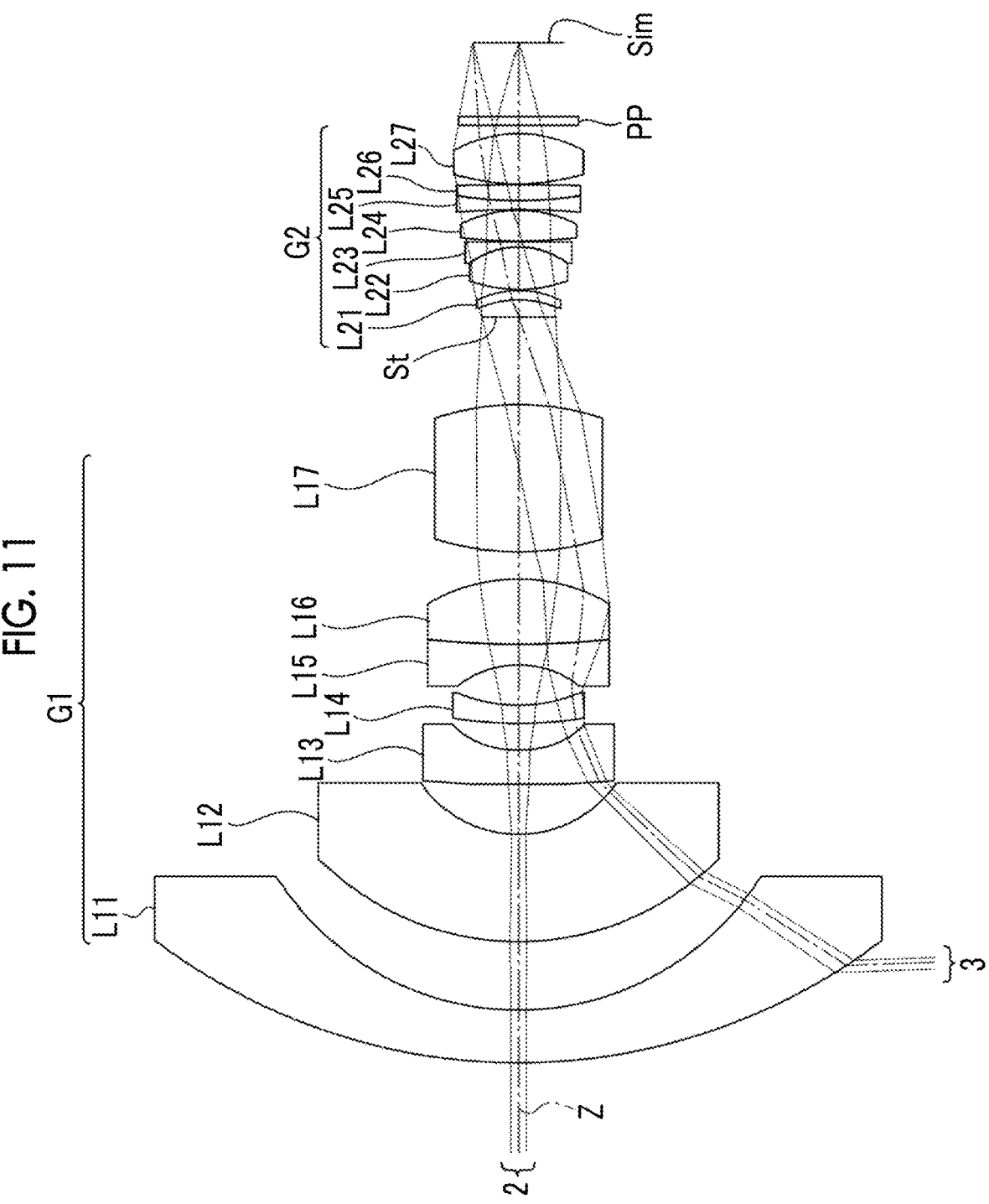
FIG. 11 is a cross-sectional view showing a configuration and a luminous flux of an imaging lens of Example 5.
Figure 12:
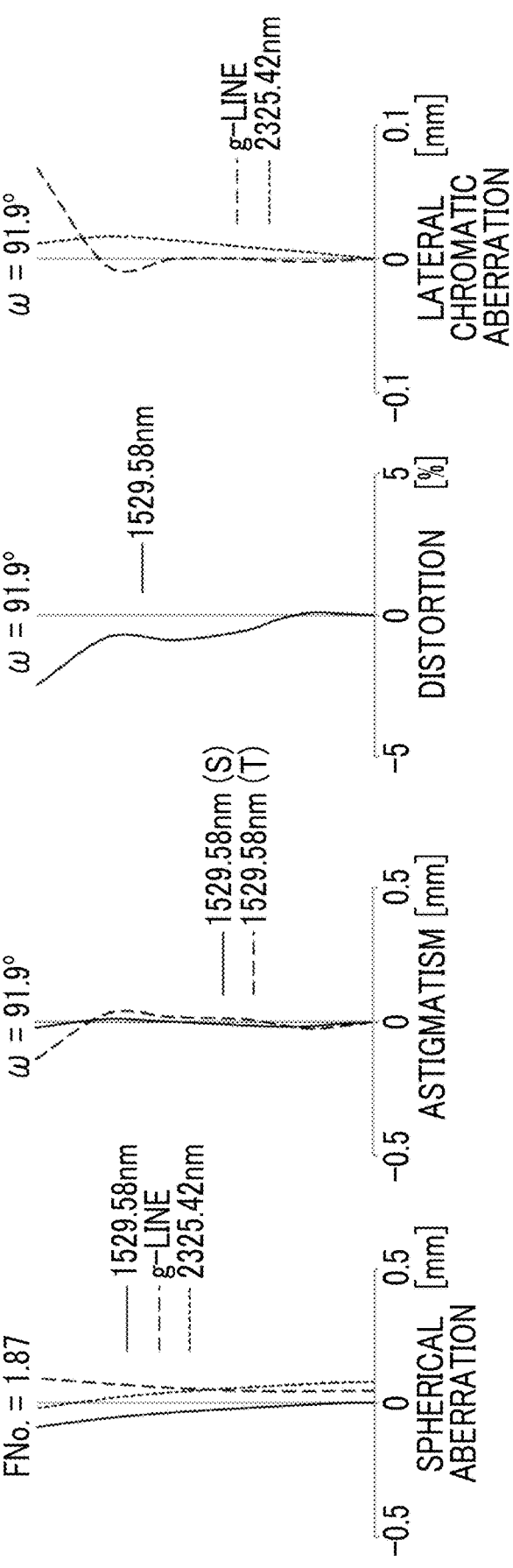
FIG. 12 is each aberration diagram of the imaging lens of Example 5.

FIG. 11 shows a cross-sectional view showing a configuration and a luminous flux of the imaging lens of Example 5. The imaging lens of Example 5 has the same configuration as the outline of the imaging lens of Example 1. Regarding the imaging lens of Example 5, the basic lens data is shown in Table 13, the specifications are shown in Table 14, the aspherical coefficient is shown in Table 15, and each aberration diagram is shown in FIG. 12.

TABLE 14

| Example 5 (✗ Based on a wavelength of 1529.58 nm) | |
|---|---|
| f | 3.38 |
| Bf | 10.33 |
| FNo. | 1.87 |
| 2ω (°) | 183.8 |

TABLE 13

| | Example 5 (✗ Based on a wavelength of 1529.58 nm) | | | | | | |
|---|---|---|---|---|---|---|---|
| Sn | R | D | na | ν | θ | Material name | φ |
| 1 | 72.0000 | 6.1759 | 1.89131 | 5.43 | 0.12590 | S-NPH3.OHARA | 84.054 |
| 2 | 34.2727 | 8.0282 | | | | | 56.741 |
| 3 | 33.8071 | 12.6482 | 2.44407 | 2.71 | 0.03120 | IRG27.SCHOTT | 46.662 |
| 4 | 14.0858 | 5.8839 | | | | | 23.086 |
| *5 | 3174.4319 | 4.0007 | 1.82677 | 10.51 | 0.18590 | L-LAH94.OHARA | 22.530 |
| *6 | 13.7413 | 3.1362 | | | | | 16.318 |
| 7 | 50.4422 | 2.1268 | 1.61653 | 11.72 | 0.22300 | S-BAM12.OHARA | 16.314 |
| 8 | 18.6338 | 4.7072 | | | | | 15.885 |
| 9 | −11.7586 | 2.4322 | 1.43023 | 22.04 | 0.27200 | S-FPL55.OHARA | 15.830 |
| 10 | 99.3615 | 7.6128 | 1.86146 | 5.84 | 0.13090 | S-NPH2.OHARA | 20.578 |
| 11 | −21.2759 | 3.2078 | | | | | 22.534 |
| 12 | 33.3639 | 17.2555 | 1.42625 | 24.99 | 0.22390 | CAF2 | 21.445 |
| 13 | −31.0888 | 10.3155 | | | | | 17.242 |
| 14 (St) | ∞ | 2.0296 | | | | | 8.689 |
| 15 | −11.5365 | 1.1082 | 1.43023 | 22.04 | 0.27200 | S-FPL55.OHARA | 9.302 |
| 16 | −10.7560 | 0.1245 | | | | | 9.895 |
| 17 | 16.9854 | 4.9632 | 1.42625 | 24.99 | 0.22390 | CAF2 | 11.077 |
| 18 | −9.5461 | 0.6000 | 1.80944 | 6.90 | 0.14470 | S-NPH5.OHARA | 11.359 |
| 19 | −1438.4792 | 0.1000 | | | | | 12.387 |
| 20 | 58.4033 | 3.6090 | 1.43023 | 22.04 | 0.27200 | S-FPL55.OHARA | 12.763 |
| 21 | −15.0289 | 0.1010 | | | | | 13.526 |
| 22 | −75.0399 | 1.0361 | 1.78784 | 12.21 | 0.22290 | S-LAH59.OHARA | 13.856 |
| 23 | 46.5276 | 1.8370 | 1.64722 | 12.33 | 0.22400 | S-BAH10.OHARA | 14.264 |
| 24 | −393.9904 | 0.1000 | | | | | 14.583 |
| *25 | 21.4951 | 5.9666 | 1.48610 | 19.45 | 0.26330 | S-FPL51.OHARA | 15.110 |
| *26 | −14.6467 | 1.0000 | | | | | 15.345 |
| 27 | ∞ | 1.0000 | 1.50050 | 13.45 | 0.30920 | S-BSL7.OHARA | 14.145 |
| 28 | ∞ | 8.6665 | | | | | 13.888 |

TABLE 15

| | | Example 5 | | |
|---|---|---|---|---|
| Sn | 5 | 6 | 25 | 26 |
| KA | −2.8755174E+07 | 1.0328870E+00 | 3.0255182E+00 | −1.1109298E+00 |
| A3 | 3.7868645E−19 | 0.0000000E+00 | −3.8643106E−20 | 1.0222521E−19 |
| A4 | 1.2212751E−05 | −1.0802362E−04 | −8.3870319E−05 | −7.7527137E−05 |
| A5 | 5.9334643E−06 | 7.1482298E−05 | −2.0840196E−05 | 4.8283892E−06 |
| A6 | 2.0648242E−07 | 1.6473437E−06 | −4.0509771E−07 | −4.8095886E−06 |
| A7 | −7.3371403E−08 | −2.3285822E−06 | 1.1053889E−06 | 6.0439390E−07 |
| A8 | −9.7694254E−10 | 7.7141402E−08 | 3.9401079E−08 | 3.3698001E−07 |
| A9 | 4.3244316E−10 | 4.2826306E−08 | −3.7660145E−08 | −5.5385456E−08 |
| A10 | −2.7472089E−11 | −1.6715653E−09 | −3.5458706E−09 | −1.2315133E−08 |
| A11 | −1.4000659E−12 | −4.9627865E−10 | 6.9227260E−10 | 2.5897411E−09 |
| A12 | 2.7144592E−13 | 8.1183843E−12 | 1.6735401E−10 | 2.3861969E−10 |
| A13 | 2.8865261E−15 | 3.6343112E−12 | 7.7007138E−13 | −7.2396466E−11 |
| A14 | −1.0998252E−15 | 5.8251575E−14 | −5.0889835E−12 | −1.5680716E−12 |
| A15 | −3.6014668E−18 | −1.6163387E−14 | −2.8880755E−13 | 1.2045682E−12 |
| A16 | 2.2824713E−18 | −7.7468784E−16 | 9.8957848E−14 | −2.2709157E−14 |
| A17 | 2.5573722E−21 | 3.9614590E−17 | 4.8968973E−15 | −1.0948226E−14 |
| A18 | −2.4080358E−21 | 2.9862874E−18 | −1.0844839E−15 | 4.6495388E−16 |
| A19 | −8.1103390E−25 | −4.0844961E−20 | −2.7128401E−17 | 4.1667827E−17 |
| A20 | 1.0282985E−24 | −3.9899037E−21 | 5.0286533E−18 | −2.3282723E−18 |

EXAMPLE 6

Figure 13:
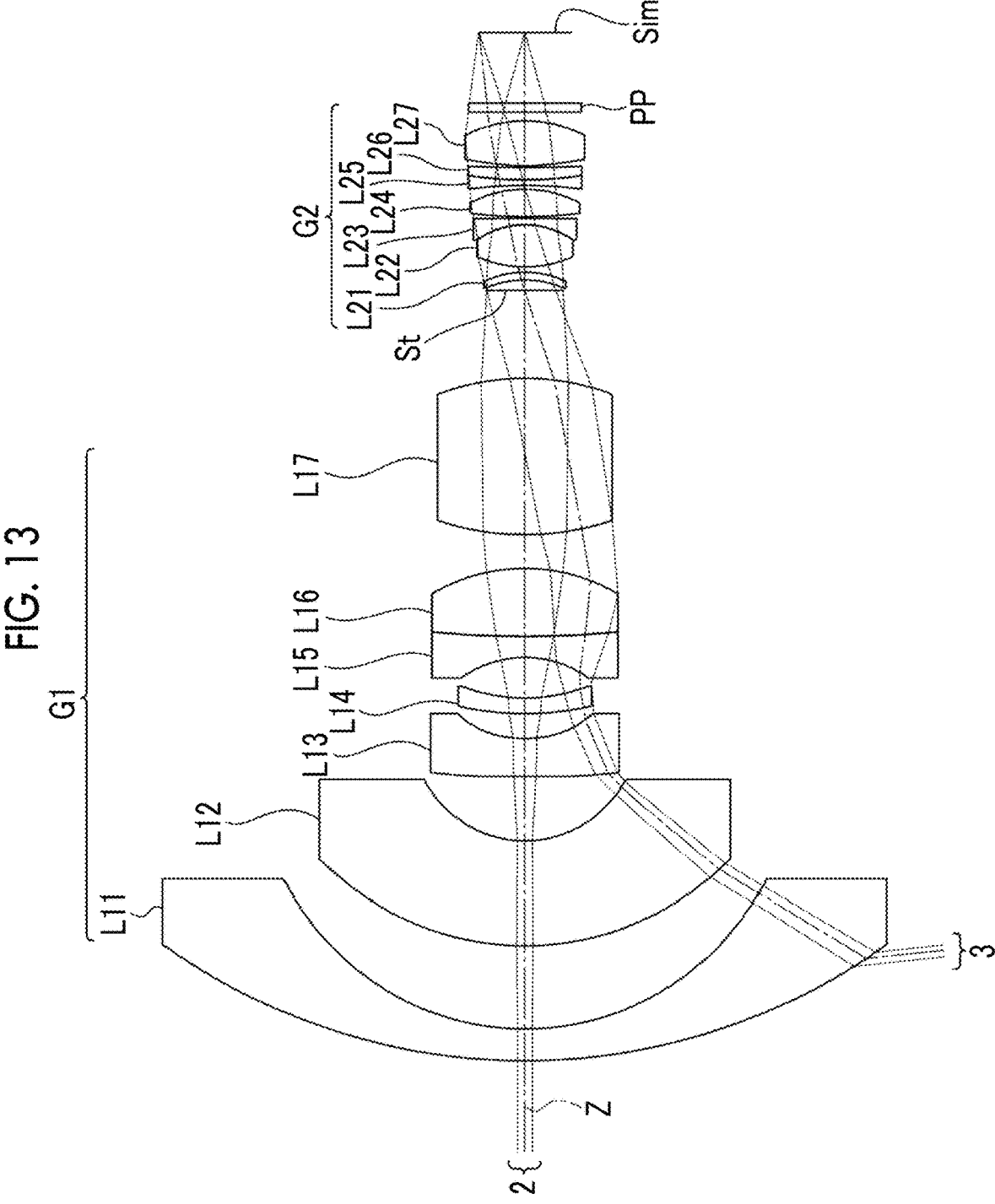
FIG. 13 is a cross-sectional view showing a configuration and a luminous flux of an imaging lens of Example 6.
Figure 14:
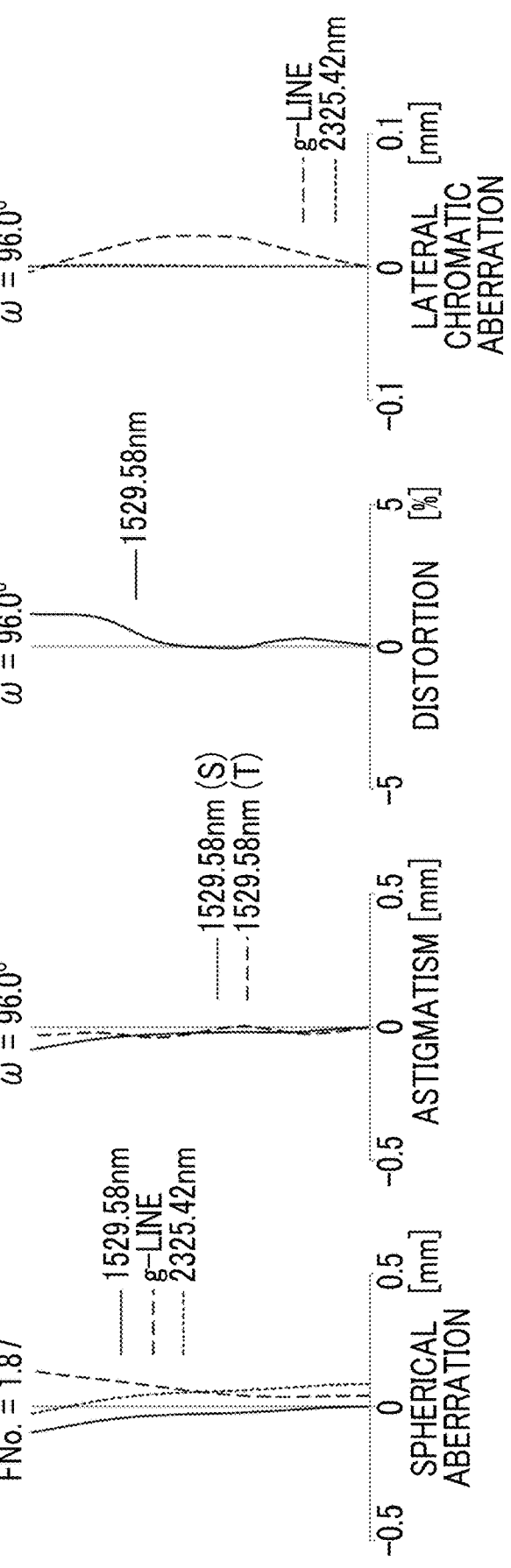
FIG. 14 is each aberration diagram of the imaging lens of Example 6.

FIG. 13 shows a cross-sectional view showing a configuration and a luminous flux of the imaging lens of Example 6. The imaging lens of Example 6 has the same configuration as the outline of the imaging lens of Example 1. Regarding the imaging lens of Example 6, the basic lens data is shown in Table 16, the specifications are shown in Table 17, the aspherical coefficient is shown in Table 18, and each aberration diagram is shown in FIG. 14.

TABLE 17

| Example 6 (⟨X⟩ Based on a wavelength of 1529.58 nm) | |
|---|---|
| f | 3.11 |
| Bf | 9.67 |
| FNo. | 1.87 |
| 2ω (°) | 192.0 |

TABLE 16

| | | | Example 6 (⟨X⟩ Based on a wavelength of 1529.58 nm) | | | | |
|---|---|---|---|---|---|---|---|
| Sn | R | D | na | ν | θ | Material name | φ |
| 1 | 71.9614 | 3.6203 | 1.94732 | 6.95 | 0.09910 | P-SF68.SCHOTT | 81.502 |
| 2 | 31.2091 | 9.4249 | | | | | 55.028 |
| 3 | 33.3722 | 11.8878 | 1.94732 | 6.95 | 0.09910 | P-SF68.SCHOTT | 46.681 |
| 4 | 13.1093 | 7.2690 | | | | | 23.095 |
| *5 | −6859.6928 | 4.3356 | 1.94732 | 6.95 | 0.09910 | P-SF68.SCHOTT | 21.583 |
| *6 | 14.2076 | 2.8223 | | | | | 15.873 |
| 7 | 34.6751 | 1.7756 | 1.94732 | 6.95 | 0.09910 | P-SF68.SCHOTT | 15.886 |
| 8 | 20.2340 | 4.6000 | | | | | 15.439 |
| 9 | −12.6338 | 2.3921 | 1.43023 | 22.04 | 0.27200 | S-FPL55.OHARA | 15.616 |
| 10 | 111.9264 | 7.7721 | 1.86146 | 5.84 | 0.13090 | S-NPH2.OHARA | 19.943 |
| 11 | −21.2531 | 3.8290 | | | | | 22.110 |
| 12 | 31.7877 | 17.7458 | 1.42625 | 24.99 | 0.22390 | CAF2 | 21.276 |
| 13 | −28.4044 | 9.9236 | | | | | 17.231 |
| 14 (St) | ∞ | 1.1995 | | | | | 8.788 |
| 15 | −11.5039 | 0.8873 | 1.43023 | 22.04 | 0.27200 | S-FPL55.OHARA | 8.947 |
| 16 | −10.9326 | 0.6088 | | | | | 9.407 |
| 17 | 13.8289 | 4.7659 | 1.42625 | 24.99 | 0.22390 | CAF2 | 10.783 |
| 18 | −9.7044 | 0.7271 | 1.80944 | 6.90 | 0.14470 | S-NPH5.OHARA | 10.909 |
| 19 | −474.3918 | 0.1996 | | | | | 11.725 |
| 20 | 52.8709 | 3.1065 | 1.43023 | 22.04 | 0.27200 | S-FPL55.OHARA | 12.098 |
| 21 | −13.4813 | 0.4381 | | | | | 12.529 |
| 22 | −52.0366 | 0.6334 | 1.78784 | 12.21 | 0.22290 | S-LAH59.OHARA | 12.631 |
| 23 | 42.8495 | 1.3974 | 1.64722 | 12.33 | 0.22400 | S-BAH10.OHARA | 12.849 |
| 24 | 143.9425 | 0.1878 | | | | | 13.046 |
| *25 | 23.5182 | 5.1652 | 1.48610 | 19.45 | 0.26330 | S-FPL51.OHARA | 13.321 |
| *26 | −14.3919 | 1.0000 | | | | | 13.713 |
| 27 | ∞ | 1.0000 | 1.50050 | 13.45 | 0.30920 | S-BSL7.OHARA | 12.976 |
| 28 | ∞ | 8.0078 | | | | | 12.796 |

TABLE 18

| | | Example 6 | | |
|---|---|---|---|---|
| Sn | 5 | 6 | 25 | 26 |
| KA | −2.8755174E+07 | 1.0330573E+00 | 2.9707910E+00 | −1.1101213E+00 |
| A3 | −6.7341105E−20 | 7.6067404E−20 | 5.0435782E−21 | −5.4889551E−20 |
| A4 | 2.9794016E−05 | −4.8527392E−05 | −5.9227930E−05 | −3.5334872E−05 |
| A5 | 7.0917261E−06 | 6.4104502E−05 | −2.7544032E−05 | 6.3812400E−06 |
| A6 | −1.5690152E−07 | −9.2196377E−08 | −1.7961613E−05 | −1.7833679E−05 |
| A7 | −8.6652753E−08 | −2.0660143E−06 | 1.4030529E−06 | 1.0894950E−06 |
| A8 | 2.7604820E−09 | 9.9597700E−08 | 2.7448376E−06 | 1.2696204E−06 |
| A9 | 5.4073625E−10 | 3.7282156E−08 | −3.9652167E−08 | −1.1300203E−07 |
| A10 | −4.5582102E−11 | −1.9441386E−09 | −2.2223849E−07 | −3.3769402E−08 |
| A11 | −1.9792882E−12 | −4.2496013E−10 | 5.3754110E−11 | 6.0241432E−09 |
| A12 | 3.0734086E−13 | 1.2597580E−11 | 1.0326318E−08 | −5.1735132E−10 |
| A13 | 4.7489977E−15 | 3.0655096E−12 | 4.4205872E−11 | −1.9194448E−10 |
| A14 | −1.0729898E−15 | 5.9629599E−15 | −2.8850403E−10 | 5.7672966E−11 |
| A15 | −7.1573152E−18 | −1.3434268E−14 | −1.5878860E−12 | 3.6401968E−12 |
| A16 | 2.0397509E−18 | −4.4196865E−16 | 4.8064593E−12 | −1.5367223E−12 |
| A17 | 6.2301857E−21 | 3.2435586E−17 | 2.3810366E−14 | −3.7745501E−14 |
| A18 | −2.0181105E−21 | 1.9266144E−18 | −4.4083592E−14 | 1.8561550E−14 |
| A19 | −2.3892802E−24 | −3.2926364E−20 | −1.3609756E−16 | 1.6413707E−16 |
| A20 | 8.1719283E−25 | −2.6586896E−21 | 1.7166742E−16 | −8.7608127E−17 |

EXAMPLE 7

Figure 15:
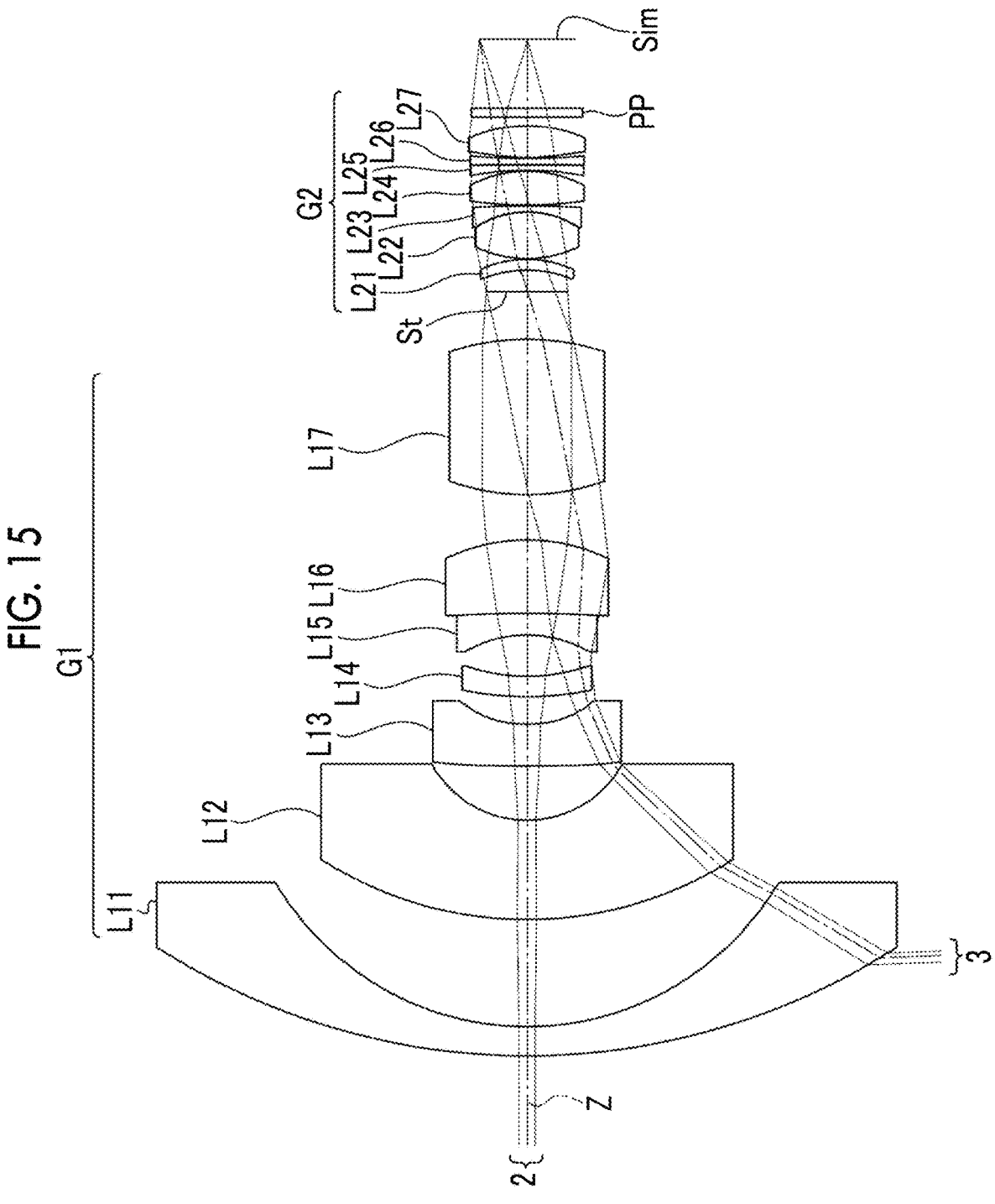
FIG. 15 is a cross-sectional view showing a configuration and a luminous flux of an imaging lens of Example 7.
Figure 16:
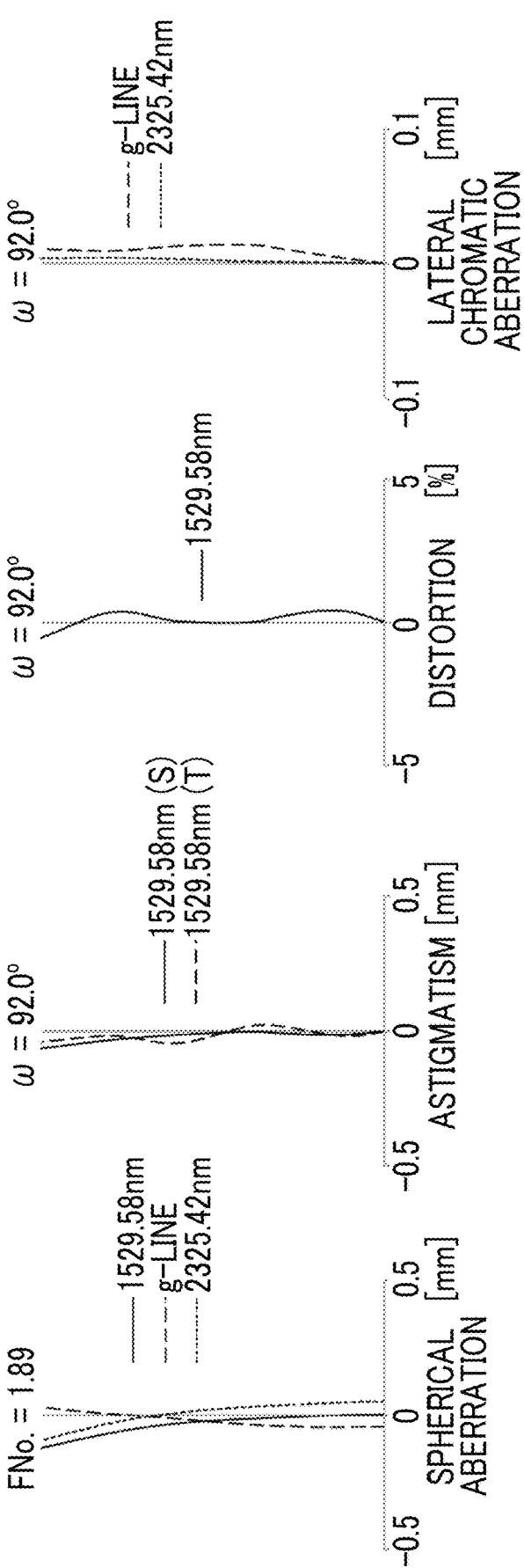
FIG. 16 is each aberration diagram of the imaging lens of Example 7.

FIG. 15 shows a cross-sectional view showing a configuration and a luminous flux of the imaging lens of Example 7. The imaging lens of Example 7 has the same configuration as the outline of the imaging lens of Example 1. Regarding the imaging lens of Example 7, the basic lens data is shown in Table 19, the specifications are shown in Table 20, the aspherical coefficient is shown in Table 21, and each aberration diagram is shown in FIG. 16.

| Example 7 (※: Based on a wavelength of 1529.58 nm) | |
|---|---|
| f | 3.31 |
| Bf | 9.34 |
| FNo. | 1.89 |
| 2ω (°) | 184.0 |

TABLE 19

| | | | Example 7 (※: Based on a wavelength of 1529.58 nm) | | | | |
|---|---|---|---|---|---|---|---|
| Sn | R | D | na | ν | θ | Material name | φ |
| 1 | 77.9289 | 3.2476 | 1.76444 | 8.13 | 0.12140 | SF6HT.SCHOTT | 82.076 |
| 2 | 33.0707 | 11.9100 | | | | | 56.262 |
| 3 | 43.5294 | 11.1133 | 1.76444 | 8.13 | 0.12140 | SF6HT.SCHOTT | 45.754 |
| 4 | 12.2889 | 6.0508 | | | | | 21.405 |
| *5 | −1607.4029 | 4.6247 | 1.76444 | 8.13 | 0.12140 | SF6HT.SCHOTT | 21.097 |
| *6 | 13.9362 | 3.0602 | | | | | 15.623 |
| 7 | 35.4200 | 2.2645 | 1.76444 | 8.13 | 0.12140 | SF6HT.SCHOTT | 15.582 |
| 8 | 20.7160 | 4.5901 | | | | | 14.961 |
| 9 | −13.7388 | 2.4519 | 1.43023 | 22.04 | 0.27200 | S-FPL55.OHARA | 15.163 |
| 10 | −114.9509 | 8.0927 | 1.86146 | 5.84 | 0.13090 | S-NPH2.OHARA | 17.518 |
| 11 | 20.9047 | 5.0384 | | | | | 20.074 |
| 12 | 25.7247 | 17.3225 | 1.42625 | 24.99 | 0.22390 | CAF2 | 18.727 |
| 13 | −28.1158 | 5.3257 | | | | | 13.853 |
| 14 (St) | ∞ | 2.3757 | | | | | 9.126 |
| 15 | −13.2606 | 1.2004 | 1.42625 | 24.99 | 0.22390 | CAF2 | 9.802 |
| 16 | −12.4814 | 0.1000 | | | | | 10.374 |
| 17 | 13.4003 | 5.1628 | 1.42625 | 24.99 | 0.22390 | CAF2 | 11.437 |
| 18 | −10.4369 | 0.6852 | 1.80944 | 6.90 | 0.14470 | S-NPH5.OHARA | 11.414 |
| 19 | −107.3628 | 0.1003 | | | | | 12.033 |
| 20 | 45.5750 | 3.7658 | 1.42625 | 24.99 | 0.22390 | CAF2 | 12.327 |
| 21 | −13.4812 | 0.1000 | | | | | 12.691 |
| 22 | −33.1363 | 0.6000 | 1.78784 | 12.21 | 0.22290 | S-LAH59.OHARA | 12.513 |
| 23 | −454.7200 | 0.7197 | 1.64722 | 12.33 | 0.22400 | S-BAH10.OHARA | 12.609 |
| 24 | 80.0708 | 0.1000 | | | | | 12.699 |
| *25 | 23.4135 | 3.5353 | 1.42625 | 24.99 | 0.22390 | CAF2 | 12.824 |
| *26 | −15.7624 | 1.0000 | | | | | 12.969 |
| 27 | ∞ | 1.0000 | 1.50050 | 13.45 | 0.30920 | S-BSL7.OHARA | 12.445 |
| 28 | ∞ | 7.6767 | | | | | 12.298 |

Example 7

| Sn | 5 | 6 | 25 | 26 |
|---|---|---|---|---|
| KA | −2.8755174E+07 | 1.0649799E+00 | 2.8632233E+00 | −1.1224558E+00 |
| A3 | 8.2556902E−20 | 2.2051274E−19 | −1.9168218E−20 | 1.1999134E−19 |
| A4 | 7.1829689E−06 | −4.5150880E−05 | −1.0080429E−04 | 2.4285866E−05 |
| A5 | 6.6340322E−06 | 6.1100021E−05 | −4.5898823E−05 | 2.5415291E−05 |
| A6 | 3.5745568E−07 | −1.6030392E−06 | −2.8524188E−06 | −3.7099640E−05 |
| A7 | −8.0361860E−08 | −1.9128817E−06 | 4.2032001E−06 | −6.6735664E−07 |
| A8 | −3.3130177E−09 | 1.6574188E−07 | 7.3576099E−07 | 4.2567612E−06 |
| A9 | 4.9052748E−10 | 3.3639903E−08 | −2.9621283E−07 | 7.0018974E−09 |
| A10 | −4.7387461E−12 | −3.4232275E−09 | −7.4685178E−08 | −2.8908729E−07 |
| A11 | −1.7522007E−12 | −3.7385068E−10 | 1.3667328E−08 | 6.1103995E−10 |
| A12 | 1.4034350E−13 | 3.2260429E−11 | 3.9108526E−09 | 1.2566679E−08 |
| A13 | 4.1638768E−15 | 2.6310364E−12 | −3.8578848E−10 | −3.8224421E−11 |
| A14 | −6.4986744E−16 | −1.5391658E−13 | −1.2058370E−10 | −3.5554199E−10 |
| A15 | −6.3143667E−18 | −1.1255138E−14 | 6.3696547E−12 | 1.0494880E−12 |
| A16 | 1.3889721E−18 | 3.3306704E−16 | 2.2331839E−12 | 6.3456777E−12 |
| A17 | 5.6237231E−21 | 2.6535965E−17 | −5.5792152E−14 | −1.4628355E−14 |
| A18 | −1.4604815E−21 | −1.1896138E−19 | −2.3113447E−14 | −6.4666507E−14 |
| A19 | −2.2342732E−24 | −2.6310467E−20 | 1.9660604E−16 | 8.2725541E−17 |
| A20 | 6.1271589E−25 | −4.0595269E−22 | 1.0300907E−16 | 2.8536881E−16 |

EXAMPLE 8

Figure 17:
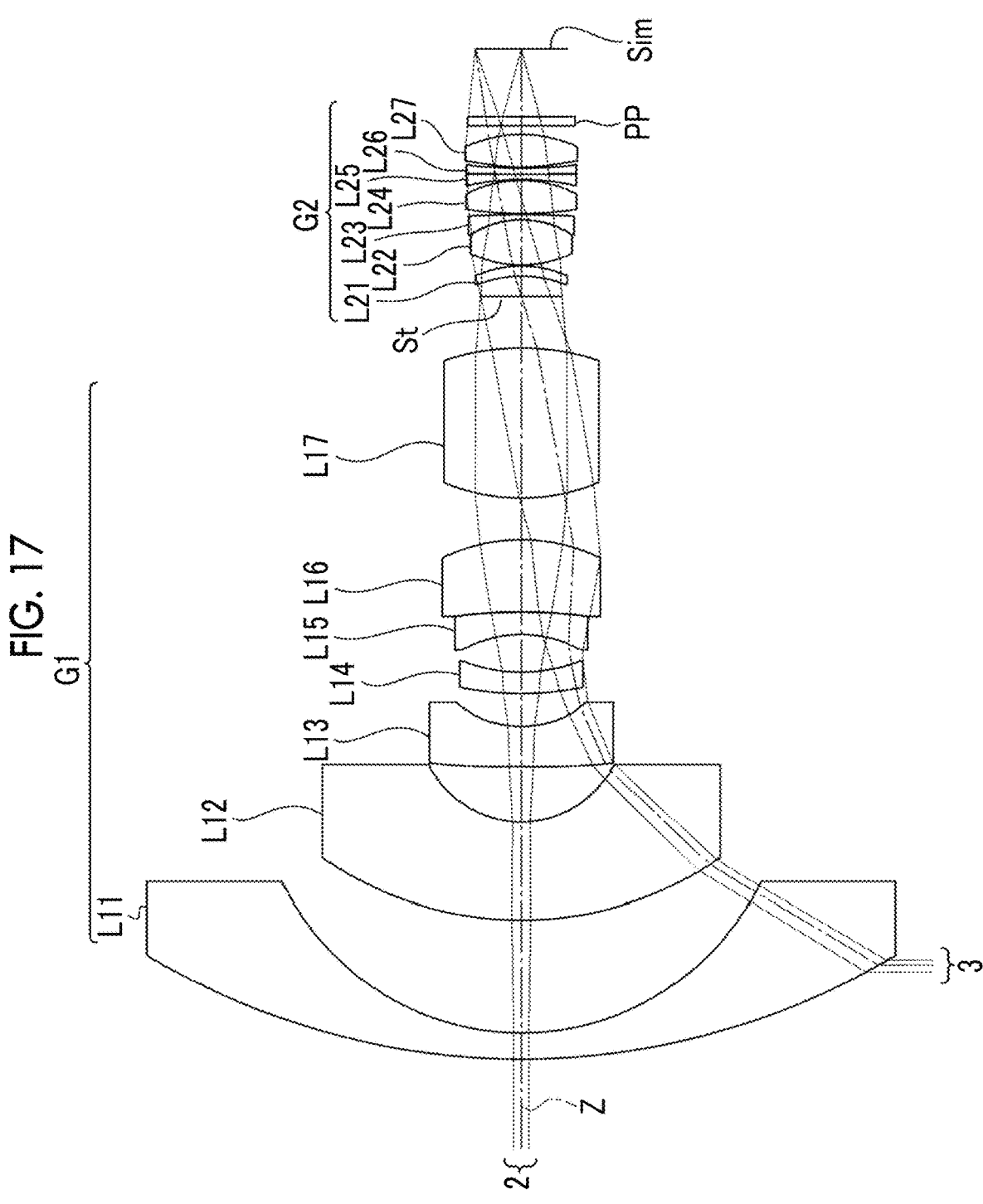
FIG. 17 is a cross-sectional view showing a configuration and a luminous flux of an imaging lens of Example 8.
Figure 18:
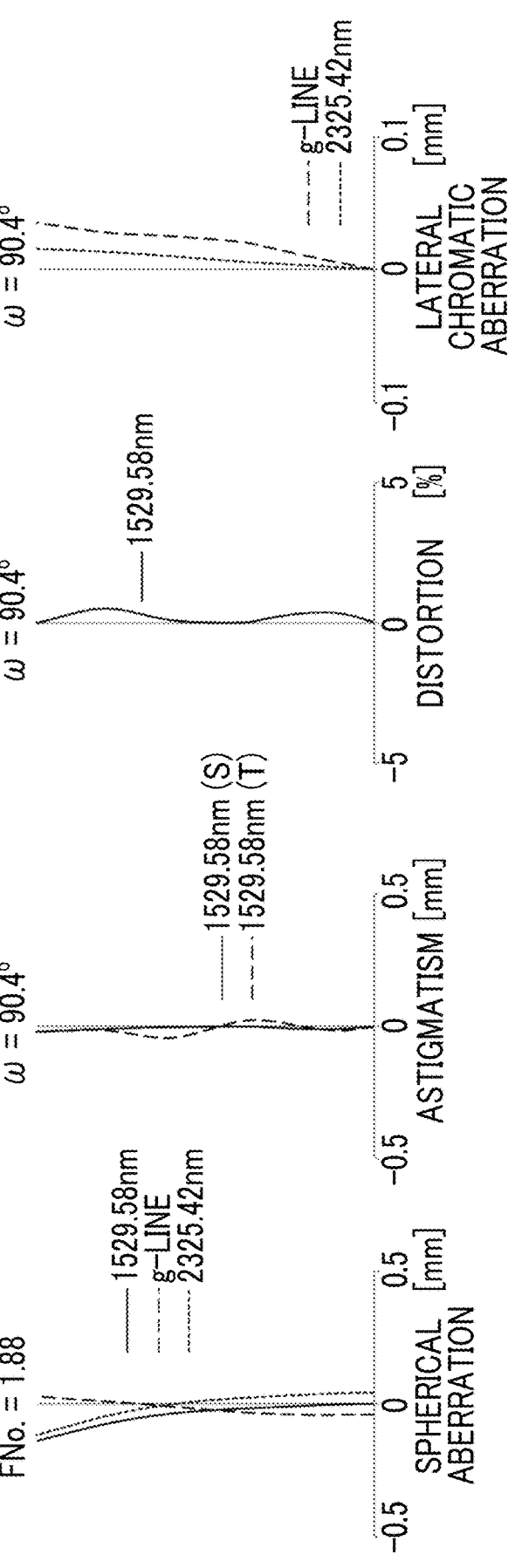
FIG. 18 is each aberration diagram of the imaging lens of Example 8.

FIG. 17 shows a cross-sectional view showing a configuration and a luminous flux of the imaging lens of Example 8. The imaging lens of Example 8 has the same configuration as the outline of the imaging lens of Example 1. Regarding the imaging lens of Example 8, the basic lens data is shown in Table 22, the specifications are shown in Table 23, the aspherical coefficient is shown in Table 24, and each aberration diagram is shown in FIG. 18.

TABLE 23

| Example 8 (X· Based on a wavelength of 1529.58 nm) | |
|---|---|
| f | 3.35 |
| Bf | 9.36 |
| FNo. | 1.88 |
| 2ω (°) | 180.8 |

TABLE 22

Example 8 (X· Based on a wavelength of 1529.58 nm)

| Sn | R | D | na | ν | θ | Material name | φ |
|---|---|---|---|---|---|---|---|
| 1 | 83.7903 | 2.9710 | 1.68449 | 9.05 | 0.14500 | SF1.SCHOTT | 84.472 |
| 2 | 30.6171 | 12.8164 | | | | | 54.663 |
| 3 | 40.7641 | 11.0717 | 1.68449 | 9.05 | 0.14500 | SF1.SCHOTT | 45.230 |
| 4 | 11.9755 | 6.2710 | | | | | 21.320 |
| *5 | −1579.5888 | 4.6191 | 1.68449 | 9.05 | 0.14500 | SF1.SCHOTT | 21.097 |
| *6 | 13.0260 | 3.7281 | | | | | 15.459 |
| 7 | 35.0988 | 2.4106 | 1.68449 | 9.05 | 0.14500 | SF1.SCHOTT | 15.346 |
| 8 | 18.6447 | 4.2742 | | | | | 14.649 |
| 9 | −13.9483 | 2.5532 | 1.43023 | 22.04 | 0.27200 | S-FPL55.OHARA | 14.792 |
| 10 | −58.1760 | 8.1937 | 1.86146 | 5.84 | 0.13090 | S-NPH2.OHARA | 16.883 |
| 11 | −20.8600 | 4.7830 | | | | | 19.779 |
| 12 | 23.2115 | 17.0022 | 1.42625 | 24.99 | 0.22390 | CAF2 | 19.020 |
| 13 | −28.2160 | 5.7524 | | | | | 14.511 |
| 14 (St) | ∞ | 2.3132 | | | | | 9.412 |
| 15 | −13.5893 | 1.1356 | 1.42625 | 24.99 | 0.22390 | CAF2 | 10.006 |
| 16 | −13.0279 | 0.1184 | | | | | 10.535 |
| 17 | 13.3119 | 5.1825 | 1.42625 | 24.99 | 0.22390 | CAF2 | 11.556 |
| 18 | −10.7780 | 0.6000 | 1.80944 | 6.90 | 0.14470 | S-NPH5.OHARA | 11.489 |
| 19 | −91.4517 | 0.1000 | | | | | 12.015 |
| 20 | 40.0848 | 3.7673 | 1.42625 | 24.99 | 0.22390 | CAF2 | 12.296 |
| 21 | −13.6577 | 0.1000 | | | | | 12.566 |
| 22 | −28.0649 | 0.6014 | 1.78784 | 12.21 | 0.22290 | S-LAH59.OHARA | 12.345 |
| 23 | 881.0486 | 0.6727 | 1.64722 | 12.33 | 0.22400 | S-BAH10.OHARA | 12.444 |
| 24 | 51.2705 | 0.1226 | | | | | 12.530 |
| *25 | 21.6948 | 3.7098 | 1.42625 | 24.99 | 0.22390 | CAF2 | 12.670 |
| *26 | −14.8221 | 1.0000 | | | | | 12.846 |
| 27 | ∞ | 1.0000 | 1.50050 | 13.45 | 0.30920 | S-BSL7.OHARA | 12.335 |
| 28 | ∞ | 7.6969 | | | | | 12.195 |

TABLE 24

| | | Example 8 | | |
|---|---|---|---|---|
| Sn | 5 | 6 | 25 | 26 |
| KA | −2.8755174E+07 | 1.0649799E+00 | 2.8632233E+00 | −1.1224558E+00 |
| A3 | 8.2556902E−20 | 2.2051274E−19 | −1.9168218E−20 | 1.1999134E−19 |
| A4 | 7.1829689E−06 | −4.5150880E−05 | −1.0080429E−04 | 2.4285866E−05 |
| A5 | 6.6340322E−06 | 6.1100021E−05 | −4.5898823E−05 | 2.5415291E−05 |
| A6 | 3.5745568E−07 | −1.6030392E−06 | −2.8524188E−06 | −3.7099640E−05 |
| A7 | −8.0361860E−08 | −1.9128817E−06 | 4.2032001E−06 | −6.6735664E−07 |
| A8 | −3.3130177E−09 | 1.6574188E−07 | 7.3576099E−07 | 4.2567612E−06 |
| A9 | 4.9052748E−10 | 3.3639903E−08 | −2.9621283E−07 | 7.0018974E−09 |
| A10 | −4.7387461E−12 | −3.4232275E−09 | −7.4685178E−08 | −2.8908729E−07 |
| A11 | −1.7522007E−12 | −3.7385068E−10 | 1.3667328E−08 | 6.1103995E−10 |
| A12 | 1.4034350E−13 | 3.2260429E−11 | 3.9108526E−09 | 1.2566679E−08 |
| A13 | 4.1638768E−15 | 2.6310364E−12 | −3.8578848E−10 | −3.8224421E−11 |
| A14 | −6.4986744E−16 | −1.5391658E−13 | −1.2058370E−10 | −3.5554199E−10 |
| A15 | −6.3143667E−18 | −1.1255138E−14 | 6.3696547E−12 | 1.0494880E−12 |
| A16 | 1.3889721E−18 | 3.3306704E−16 | 2.2331839E−12 | 6.3456777E−12 |
| A17 | 5.6237231E−21 | 2.6535965E−17 | −5.5792152E−14 | −1.4628355E−14 |
| A18 | −1.4604815E−21 | −1.1896138E−19 | −2.3113447E−14 | −6.4666507E−14 |
| A19 | −2.2342732E−24 | −2.6310467E−20 | 1.9660604E−16 | 8.2725541E−17 |
| A20 | 6.1271589E−25 | −4.0595269E−22 | 1.0300907E−16 | 2.8536881E−16 |

EXAMPLE 9

Figure 19:
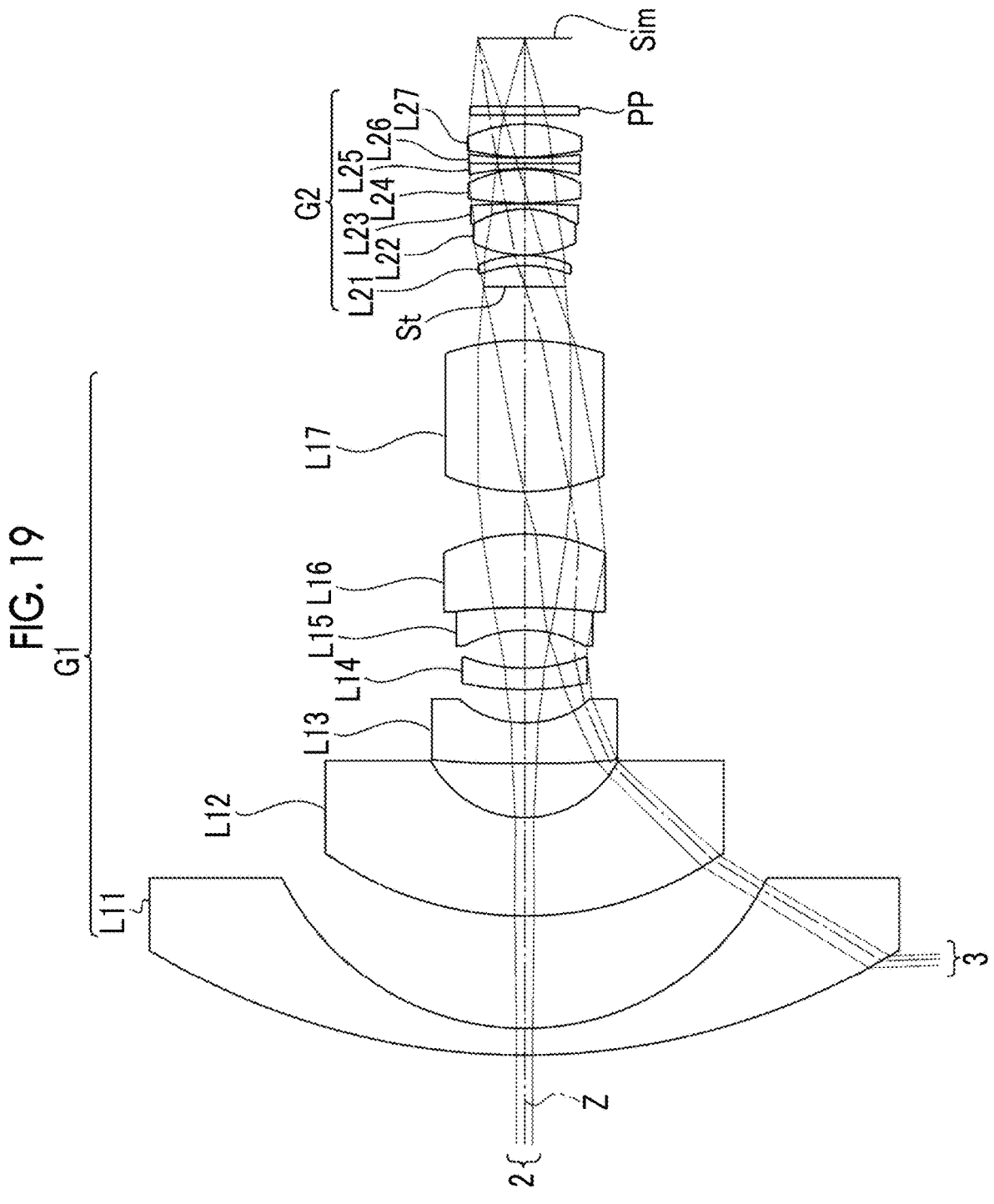
FIG. 19 is a cross-sectional view showing a configuration and a luminous flux of an imaging lens of Example 9.
Figure 20:
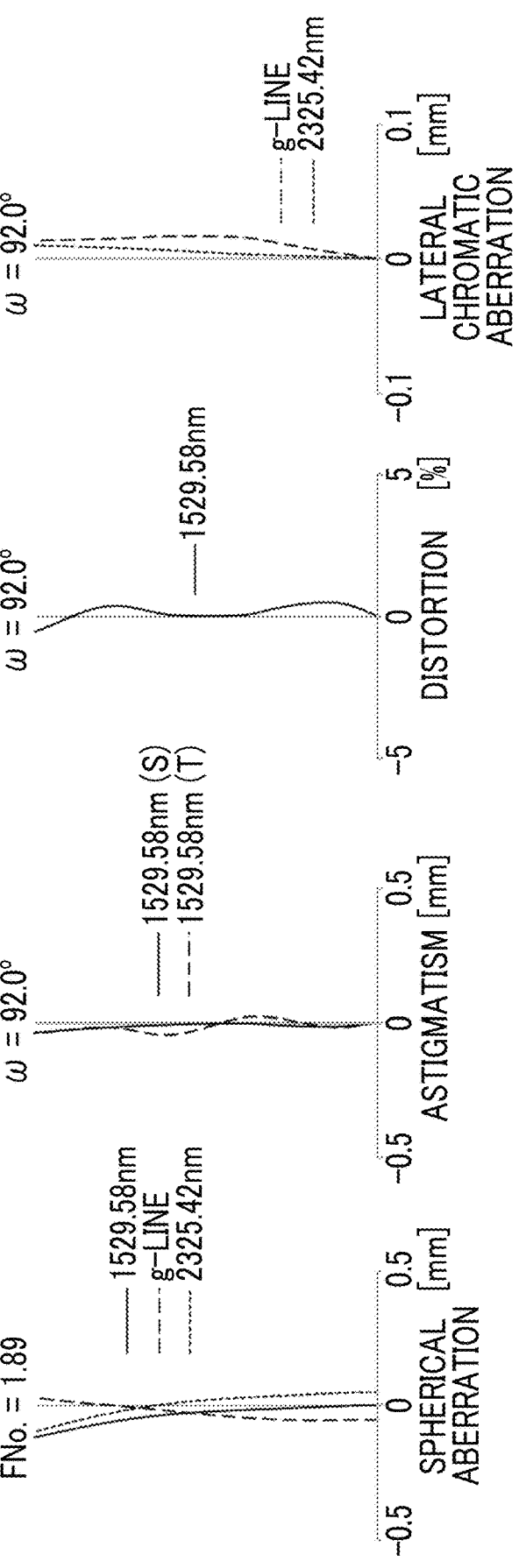
FIG. 20 is each aberration diagram of the imaging lens of Example 9.

FIG. 19 shows a cross-sectional view showing a configuration and a luminous flux of the imaging lens of Example 9. The imaging lens of Example 9 has the same configuration as the outline of the imaging lens of Example 1. Regarding the imaging lens of Example 9, the basic lens data is shown in Table 25, the specifications are shown in Table 26, the aspherical coefficient is shown in Table 27, and each aberration diagram is shown in FIG. 20.

TABLE 26

| Example 9 (※: Based on a wavelength of 1529.58 nm) | |
|---|---|
| f | 3.31 |
| Bf | 9.35 |
| FNo. | 1.89 |
| 2ω (°) | 184.0 |

TABLE 25

| | | | Example 9 (※: Based on a wavelength of 1529.58 nm) | | | | |
|---|---|---|---|---|---|---|---|
| Sn | R | D | na | ν | θ | Material name | φ |
| 1 | 83.2111 | 3.0094 | 1.71904 | 8.63 | 0.13380 | SF4.SCHOTT | 84.419 |
| 2 | 31.1250 | 12.7760 | | | | | 55.164 |
| 3 | 40.0928 | 11.1102 | 1.71904 | 8.63 | 0.13380 | SF4.SCHOTT | 45.037 |
| 4 | 12.0256 | 6.1411 | | | | | 21.277 |
| *5 | −1329.3820 | 4.6364 | 1.71904 | 8.63 | 0.13380 | SF4.SCHOTT | 21.097 |
| *6 | 13.3943 | 3.7410 | | | | | 15.530 |
| 7 | 34.8502 | 2.4183 | 1.71904 | 8.63 | 0.13380 | SF4.SCHOTT | 15.449 |
| 8 | 19.1676 | 4.3001 | | | | | 14.775 |
| 9 | −13.9134 | 2.5559 | 1.43023 | 22.04 | 0.27200 | S-FPL55.OHARA | 14.930 |
| 10 | −65.0843 | 8.2048 | 1.86146 | 5.84 | 0.13090 | S-NPH2.OHARA | 17.156 |
| 11 | −20.8640 | 4.8565 | | | | | 20.048 |
| 12 | 23.5832 | 17.0832 | 1.42625 | 24.99 | 0.22390 | CAF2 | 19.261 |
| 13 | −28.2170 | 6.0735 | | | | | 14.742 |
| 14 (St) | ∞ | 2.3789 | | | | | 9.333 |
| 15 | −13.5986 | 1.1678 | 1.42625 | 24.99 | 0.22390 | CAF2 | 9.967 |
| 16 | −13.0395 | 0.1000 | | | | | 10.515 |
| 17 | 13.3148 | 5.1674 | 1.42625 | 24.99 | 0.22390 | CAF2 | 11.538 |
| 18 | −10.6633 | 0.6000 | 1.80944 | 6.90 | 0.14470 | S-NPH5.OHARA | 11.479 |
| 19 | −94.8264 | 0.1000 | | | | | 12.025 |
| 20 | 40.2259 | 3.7805 | 1.42625 | 24.99 | 0.22390 | CAF2. | 12.315 |
| 21 | −13.6786 | 0.1000 | | | | | 12.605 |
| 22 | −28.9179 | 0.6000 | 1.78784 | 12.21 | 0.22290 | S-LAH59.OHARA | 12.395 |
| 23 | −2369.8992 | 0.6000 | 1.64722 | 12.33 | 0.22400 | S-BAH10.OHARA | 12.494 |
| 24 | 52.3800 | 0.1000 | | | | | 12.578 |
| *25 | 21.8011 | 3.7275 | 1.42625 | 24.99 | 0.22390 | CAF2 | 12.712 |
| *26 | −14.7586 | 1.0000 | | | | | 12.890 |
| 27 | ∞ | 1.0000 | 1.50050 | 13.45 | 0.30920 | S-BSL7.OHARA | 12.374 |
| 28 | ∞ | 7.6795 | | | | | 12.234 |

TABLE 27

| | | Example 9 | | |
|---|---|---|---|---|
| Sn | 5 | 6 | 25 | 26 |
| KA | −2.8755174E+07 | 1.0649799E+00 | 2.8632233E+00 | −1.1224558E+00 |
| A3 | 8.2556902E−20 | 2.2051274E−19 | −1.9168218E−20 | 1.1999134E−19 |
| A4 | 7.1829689E−06 | −4.5150880E−05 | −1.0080429E−04 | 2.4285866E−05 |
| A5 | 6.6340322E−06 | 6.1100021E−05 | −4.5898823E−05 | 2.5415291E−05 |
| A6 | 3.5745568E−07 | −1.6030392E−06 | −2.8524188E−06 | −3.7099640E−05 |
| A7 | −8.0361860E−08 | −1.9128817E−06 | 4.2032001E−06 | −6.6735664E−07 |
| A8 | −3.3130177E−09 | 1.6574188E−07 | 7.3576099E−07 | 4.2567612E−06 |
| A9 | 4.9052748E−10 | 3.3639903E−08 | −2.9621283E−07 | 7.0018974E−09 |
| A10 | −4.7387461E−12 | −3.4232275E−09 | −7.4685178E−08 | −2.8908729E−07 |
| A11 | −1.7522007E−12 | −3.7385068E−10 | 1.3667328E−08 | 6.1103995E−10 |
| A12 | 1.4034350E−13 | 3.2260429E−11 | 3.9108526E−09 | 1.2566679E−08 |
| A13 | 4.1638768E−15 | 2.6310364E−12 | −3.8578448E−10 | −3.8224421E−11 |
| A14 | −6.4986744E−16 | −1.5391658E−13 | −1.2058370E−10 | −3.5554199E−10 |
| A15 | −6.3143667E−18 | −1.1255138E−14 | 6.3696547E−12 | 1.0494880E−12 |
| A16 | 1.3889721E−18 | 3.3306704E−16 | 2.2331839E−12 | 6.3456777E−12 |
| A17 | 5.6237231E−21 | 2.6535965E−17 | −5.5792152E−14 | −1.4628355E−14 |
| A18 | −1.4604815E−21 | −1.1896138E−19 | −2.3113447E−14 | −6.4666507E−14 |
| A19 | −2.2342732E−24 | −2.6310467E−20 | 1.9660604E−16 | 8.2725541E−17 |
| A20 | 6.1271589E−25 | −4.0595269E−22 | 1.0300907E−16 | 2.8536881E−16 |

EXAMPLE 10

Figure 21:
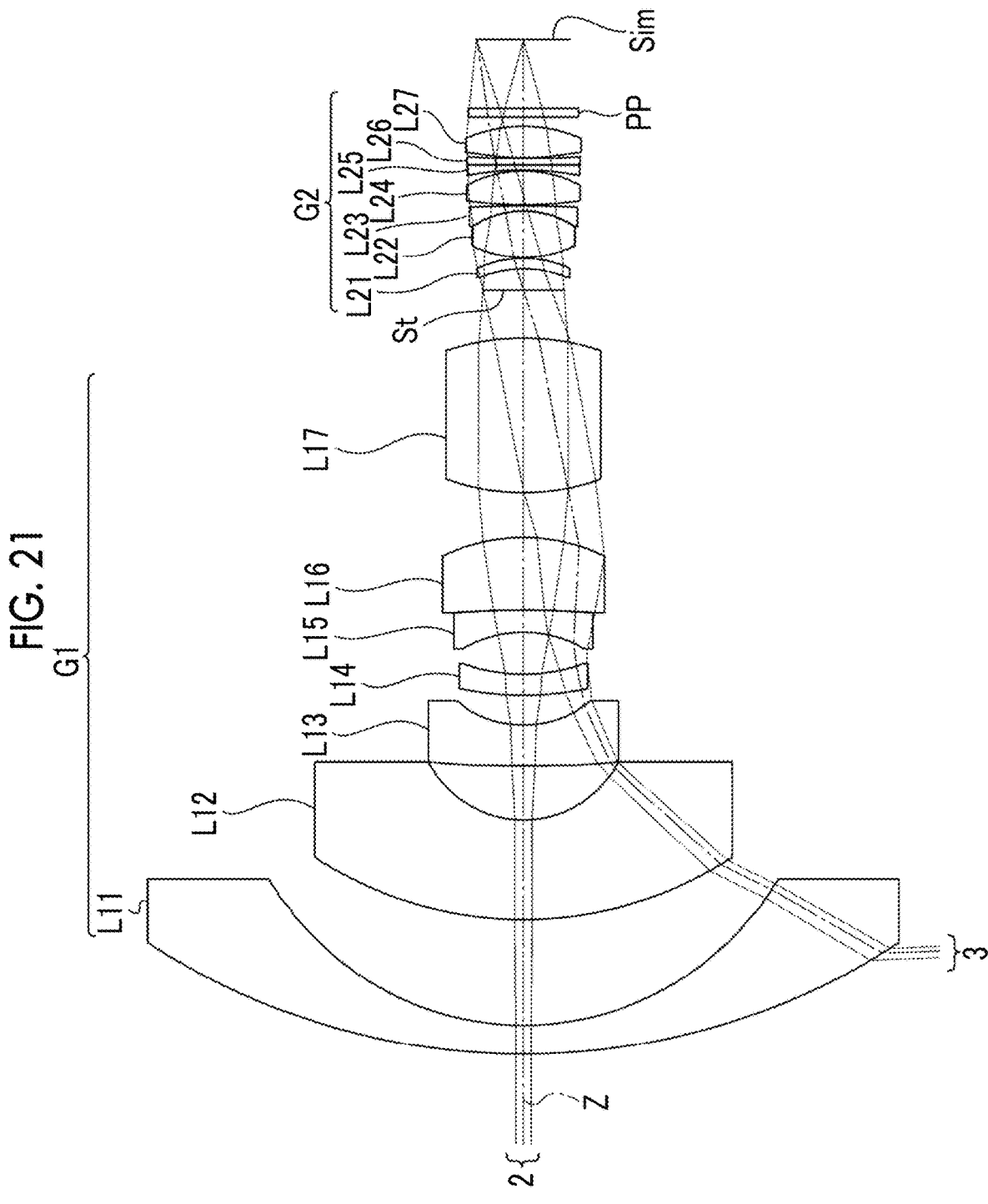
FIG. 21 is a cross-sectional view showing a configuration and a luminous flux of an imaging lens of Example 10.
Figure 22:
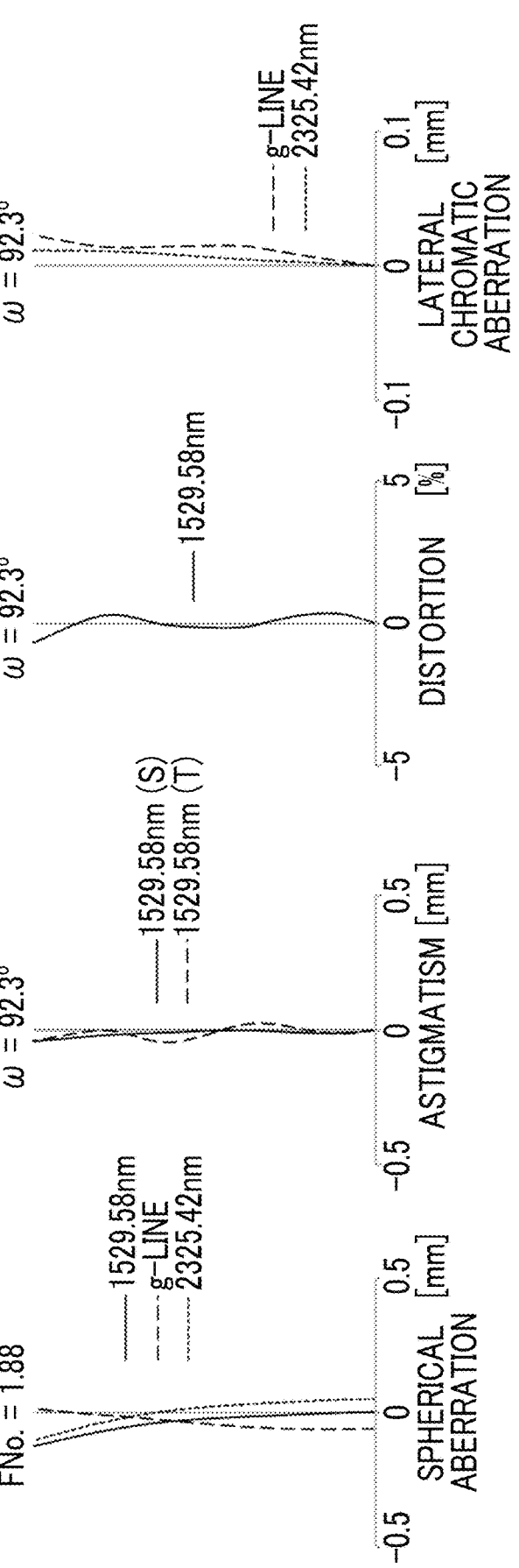
FIG. 22 is each aberration diagram of the imaging lens of Example 10.

FIG. 21 shows a cross-sectional view showing a configuration and a luminous flux of the imaging lens of Example 10. The imaging lens of Example 10 has the same of Example 10, the basic lens data is shown in Table 28, the specifications are shown in Table 29, the aspherical coefficient is shown in Table 30, and each aberration diagram is shown in FIG. 22.

TABLE 29

| Example 10 (※ Based on a wavelength of 1529.58 nm) | |
|---|---|
| F | 3.30 |
| Bf | 9.35 |
| FNo. | 1.88 |
| 2ω (°) | 184.6 |

TABLE 28

| | | | Example 10 (※ Based on a wavelength of 1529.58 nm) | | | | |
|---|---|---|---|---|---|---|---|
| Sn | R | D | na | ν | θ | Material name | φ |
| 1 | 77.7520 | 3.2476 | 1.74506 | 8.08 | 0.13140 | SF11.SCHOTT | 83.392 |
| 2 | 33.3090 | 11.8610 | | | | | 56.964 |
| 3 | 43.5790 | 11.1066 | 1.74506 | 8.08 | 0.13140 | SF11.SCHOTT | 46.573 |
| 4 | 12.1037 | 6.0693 | | | | | 21.411 |
| *5 | −1664.9423 | 4.6869 | 1.74506 | 8.08 | 0.13140 | SF11.SCHOTT | 21.391 |
| *6 | 13.5869 | 3.2986 | | | | | 15.659 |
| 7 | 35.4505 | 2.3495 | 1.74506 | 8.08 | 0.13140 | SF11.SCHOTT | 15.597 |
| 8 | 20.1893 | 4.6704 | | | | | 14.937 |
| 9 | −13.7154 | 2.4683 | 1.43023 | 22.04 | 0.27200 | S-FPL55.OHARA | 15.148 |
| 10 | −106.3006 | 8.1085 | 1.86146 | 5.84 | 0.13090 | S-NPH2.OHARA | 17.492 |
| 11 | −20.9078 | 5.0452 | | | | | 20.080 |
| 12 | 25.6434 | 17.3254 | 1.42625 | 24.99 | 0.22390 | CAF2 | 18.776 |
| 13 | −28.0967 | 5.3421 | | | | | 13.938 |
| 14 (St) | ∞ | 2.3882 | | | | | 9.196 |
| 15 | −13.2757 | 1.1982 | 1.42625 | 24.99 | 0.22390 | CAF2 | 9.864 |
| 16 | −12.5187 | 0.1000 | | | | | 10.433 |
| 17 | 13.3870 | 5.1946 | 1.42625 | 24.99 | 0.22390 | CAF2 | 11.494 |
| 18 | −10.4502 | 0.6000 | 1.80944 | 6.90 | 0.14470 | S-NPH5.OHARA | 11.459 |
| 19 | −106.1927 | 0.1000 | | | | | 12.052 |
| 20 | 45.3045 | 3.7780 | 1.42625 | 24.99 | 0.22390 | CAF2 | 12.343 |
| 21 | −13.4614 | 0.1000 | | | | | 12.700 |
| 22 | −32.7199 | 0.6000 | 1.78784 | 12.21 | 0.22290 | S-LAH59.OHARA | 12.512 |
| 23 | −759.2092 | 0.7255 | 1.64722 | 12.33 | 0.22400 | S-BAH10.OHARA | 12.607 |
| 24 | 76.2575 | 0.1000 | | | | | 12.695 |
| *25 | 23.3328 | 3.5502 | 1.42625 | 24.99 | 0.22390 | CAF2 | 12.820 |
| *26 | −15.9291 | 1.0000 | | | | | 12.965 |
| 27 | ∞ | 1.0000 | 1.50050 | 13.45 | 0.30920 | S-BSL7.OHARA | 12.445 |
| 28 | ∞ | 7.6814 | | | | | 12.298 |

TABLE 30

| | Example 10 | | | |
|---|---|---|---|---|
| Sn | 5 | 6 | 25 | 26 |
| KA | −2.8755174E+07 | 1.0646096E+00 | 2.8673982E+00 | −1.1202416E+00 |
| A3 | −2.9013590E−19 | 1.1025392E−19 | 3.3512156E−20 | −6.5241083E−20 |
| A4 | 4.7950748E−06 | −4.0638829E−05 | −8.7823779E−05 | 3.6159758E−05 |
| A5 | 6.5471107E−06 | 6.1064377E−05 | −4.4180758E−05 | 2.3442954E−05 |
| A6 | 4.1321485E−07 | −1.8893086E−06 | −7.3837113E−06 | −4.2354157E−05 |
| A7 | −7.9188414E−08 | −1.9116502E−06 | 4.0022402E−06 | −4.7248942E−07 |
| A8 | −4.0196730E−09 | 1.7469753E−07 | 1.4217530E−06 | 5.0883677E−06 |
| A9 | 4.8159465E−10 | 3.3620484E−08 | −2.8143723E−07 | −6.4573687E−09 |
| A10 | 6.4221522E−13 | −3.5816472E−09 | −1.3049554E−07 | −3.5624658E−07 |
| A11 | −1.7130054E−12 | −3.7366530E−10 | 1.2993826E−08 | 1.2002420E−09 |
| A12 | 1.1503972E−13 | 3.3957525E−11 | 6.6059982E−09 | 1.5728148E−08 |
| A13 | 4.0538312E−15 | 2.6299328E−12 | −3.6669294E−10 | −5.4240183E−11 |
| A14 | −5.7599041E−16 | −1.6516207E−13 | −2.0054458E−10 | −4.4566539E−10 |
| A15 | −6.1228594E−18 | −1.1251112E−14 | 6.0429066E−12 | 1.3071321E−12 |
| A16 | 1.2594773E−18 | 3.7816052E−16 | 3.6663562E−12 | 7.8728669E−12 |
| A17 | 5.4334303E−21 | 2.6527704E−17 | −5.2711910E−14 | −1.6819688E−14 |
| A18 | −1.3359905E−21 | −2.1928280E−19 | −3.7353315E−14 | −7.8756515E−14 |
| A19 | −2.1518253E−24 | −2.6303157E−20 | 1.8435377E−16 | 9.0008296E−17 |
| A20 | 5.6231122E−25 | −3.1088517E−22 | 1.6316895E−16 | 3.3955488E−16 |

EXAMPLE 11

Figure 23:
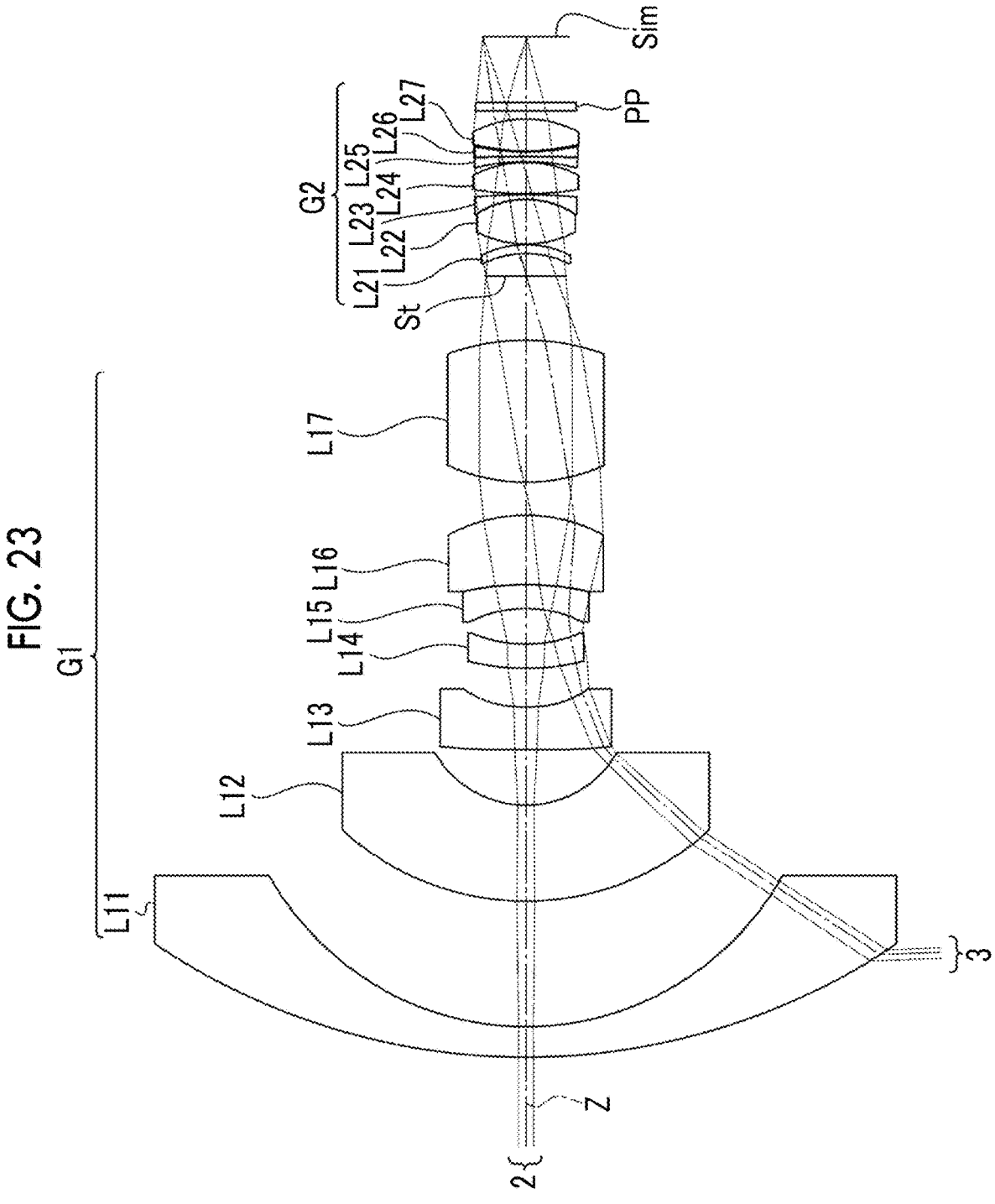
FIG. 23 is a cross-sectional view showing a configuration and a luminous flux of an imaging lens of Example 11.
Figure 24:
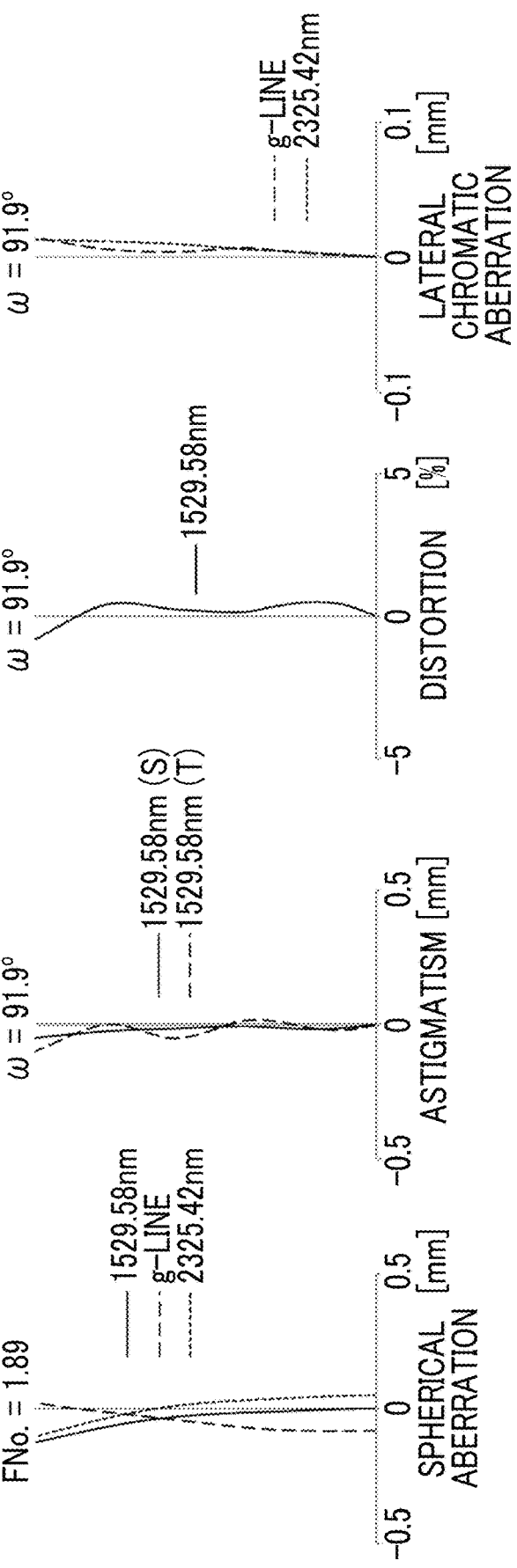
FIG. 24 is each aberration diagram of the imaging lens of Example 11.

FIG. 23 shows a cross-sectional view showing a configuration and a luminous flux of the imaging lens of Example 11. The imaging lens of Example 11 has the same of Example 11, the basic lens data is shown in Table 31, the specifications are shown in Table 32, the aspherical coefficient is shown in Table 33, and each aberration diagram is shown in FIG. 24.

TABLE 31

| | Example 11 (※ Based on a wavelength of 1529.58 nm) | | | | | | |
|---|---|---|---|---|---|---|---|
| Sn | R | D | na | ν | θ | Material name | Φ |
| 1 | 83.0184 | 3.7313 | 1.95518 | 8.63 | 0.14580 | S-LAH79.OHARA | 90.433 |
| 2 | 36.6243 | 15.3422 | | | | | 63.118 |
| 3 | 33.8947 | 11.7930 | 1.95518 | 8.63 | 0.14580 | S-LAH79.OHARA | 44.919 |
| 4 | 13.0098 | 6.7737 | | | | | 22.384 |
| *5 | −1751.0460 | 5.2020 | 1.95518 | 8.63 | 0.14580 | S-LAH79.OHARA | 21.097 |
| *6 | 17.2342 | 4.7215 | | | | | 15.792 |
| 7 | 28.3764 | 2.9861 | 1.95518 | 8.63 | 0.14580 | S-LAH79.OHARA | 15.666 |
| 8 | 17.2162 | 4.3942 | | | | | 14.604 |
| 9 | −14.7569 | 2.8323 | 1.43023 | 22.04 | 0.27200 | S-FPL55.OHARA | 14.859 |
| 10 | −35.1696 | 8.4719 | 1.86146 | 5.84 | 0.13090 | S-NPH2.OHARA | 17.032 |
| 11 | −20.0174 | 4.0508 | | | | | 20.709 |
| 12 | 23.6118 | 17.3994 | 1.42625 | 24.99 | 0.22390 | CAF2 | 20.690 |
| 13 | −28.5146 | 7.8625 | | | | | 16.711 |
| 14 (St) | ∞ | 2.7271 | | | | | 9.827 |
| 15 | −11.8015 | 1.0835 | 1.42625 | 24.99 | 0.22390 | CAF2 | 10.427 |
| 16 | −11.9947 | 0.1000 | | | | | 10.976 |
| 17 | 13.2020 | 5.4205 | 1.42625 | 24.99 | 0.22390 | CAF2 | 12.072 |
| 18 | −11.1831 | 0.6000 | 1.80944 | 6.90 | 0.14470 | S-NPH5.OHARA | 11.931 |
| 19 | −68.4215 | 0.1000 | | | | | 12.406 |
| 20 | 38.7410 | 3.8252 | 1.42625 | 24.99 | 0.22390 | CAF2 | 12.655 |
| 21 | −14.1001 | 0.1004 | | | | | 12.811 |
| 22 | −26.3229 | 0.6000 | 1.78784 | 12.21 | 0.22290 | S-LAH59.OHARA | 12.518 |
| 23 | −310.5129 | 0.6000 | 1.64722 | 12.33 | 0.22400 | S-BAH10.OHARA | 12.573 |
| 24 | 30.3119 | 0.1000 | | | | | 12.630 |
| *25 | 21.0124 | 3.9909 | 1.42625 | 24.99 | 0.22390 | CAF2 | 12.699 |
| *26 | −13.0618 | 1.0000 | | | | | 12.932 |
| 27 | ∞ | 1.0000 | 1.50050 | 13.45 | 0.30920 | S-BSL7.OHARA | 12.397 |
| 28 | ∞ | 8.0375 | | | | | 12.260 |

TABLE 32

| Example 11 (※ Based on a wavelength of 1529.58 nm) | |
| --- | --- |
| f | 3.32 |
| Bf | 9.70 |
| FNo. | 1.89 |
| 2ω (°) | 183.8 |

TABLE 33

| | Example 11 | | | |
| --- | --- | --- | --- | --- |
| Sn | 5 | 6 | 25 | 26 |
| KA | −2.8755174E+07 | 1.0649799E+00 | 2.8632233E+00 | −1.1224558E+00 |
| A3 | 8.2556902E−20 | 2.2051274E−19 | −1.9168218E−20 | 1.1999134E−19 |
| A4 | 7.1829689E−06 | −4.5150880E−05 | −1.0080429E−04 | 2.4285866E−05 |
| A5 | 6.6340322E−06 | 6.1100021E−05 | −4.5898823E−05 | 2.5415291E−05 |
| A6 | 3.5745568E−07 | −1.6030392E−06 | −2.8524188E−06 | −3.7099640E−05 |
| A7 | −8.0361860E−08 | −1.9128817E−06 | 4.2032001E−06 | −6.6735664E−07 |
| A8 | −3.3130177E−09 | 1.6574188E−07 | 7.3576099E−07 | 4.2567612E−06 |
| A9 | 4.9052748E−10 | 3.3639903E−08 | −2.9621283E−07 | 7.0018974E−09 |
| A10 | −4.7387461E−12 | −3.4232275E−09 | −7.4685178E−08 | −2.8908729E−07 |
| A11 | −1.7522007E−12 | −3.7385068E−10 | 1.3667328E−08 | 6.1103995E−10 |
| A12 | 1.4034350E−13 | 3.2260429E−11 | 3.9108526E−09 | 1.2566679E−08 |
| A13 | 4.1638768E−15 | 2.6310364E−12 | −3.8578848E−10 | −3.8224421E−11 |
| A14 | −6.4986744E−16 | −1.5391658E−13 | −1.2058370E−10 | −3.5554199E−10 |
| A15 | −6.3143667E−18 | −1.1255138E−14 | 6.3696547E−12 | 1.0494880E−12 |
| A16 | 1.3889721E−18 | 3.3306704E−16 | 2.2331839E−12 | 6.3456777E−12 |
| A17 | 5.6237231E−21 | 2.6535965E−17 | −5.5792152E−14 | −1.4628355E−14 |
| A18 | −1.4604815E−21 | −1.1896138E−19 | −2.3113447E−14 | −6.4666507E−14 |
| A19 | −2.2342732E−24 | −2.6310467E−20 | 1.9660604E−16 | 8.2725541E−17 |
| A20 | 6.1271589E−25 | −4.0595269E−22 | 1.0300907E−16 | 2.8536881E−16 |

EXAMPLE 12

Figure 25:
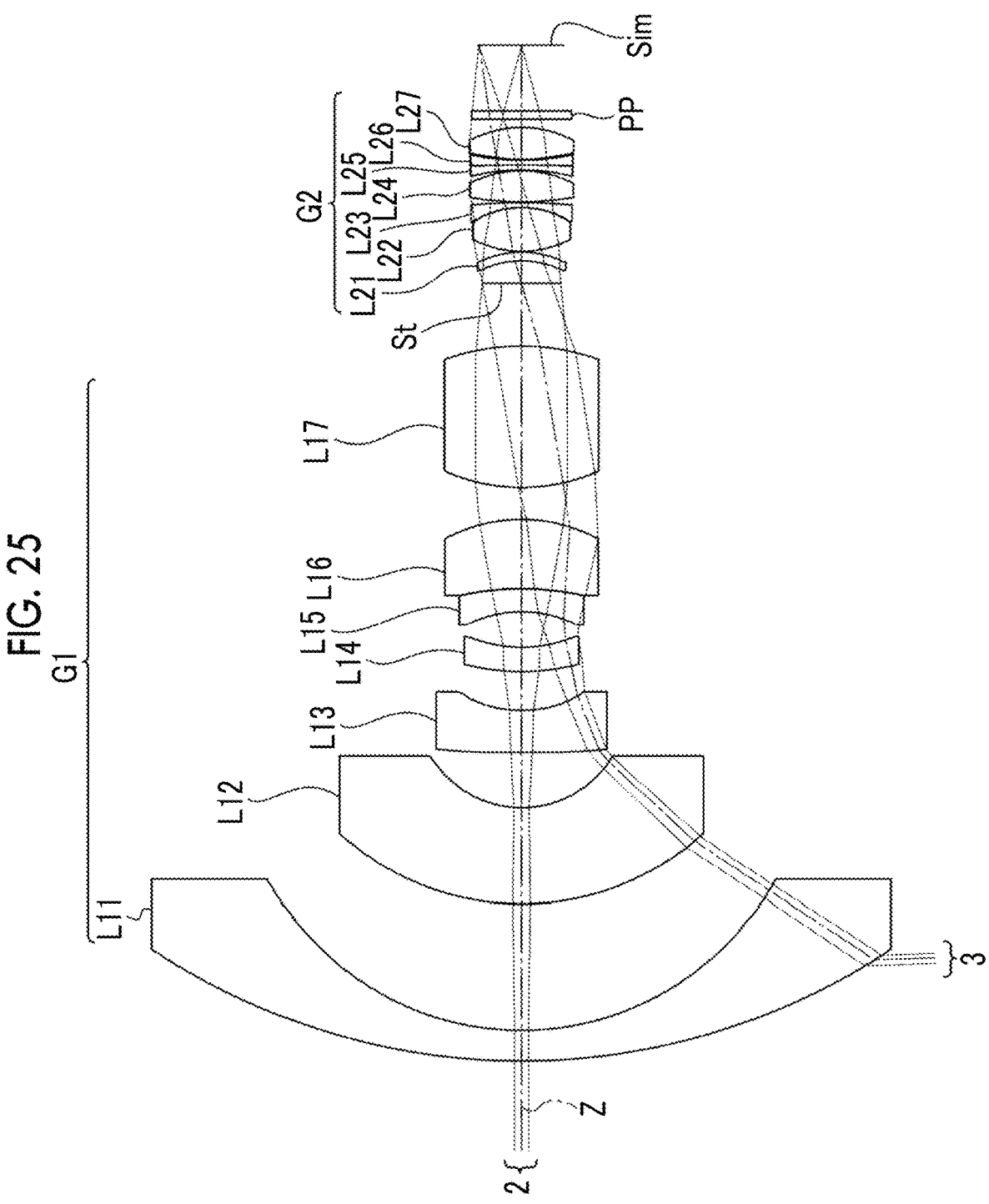
FIG. 25 is a cross-sectional view showing a configuration and a luminous flux of an imaging lens of Example 12.
Figure 26:
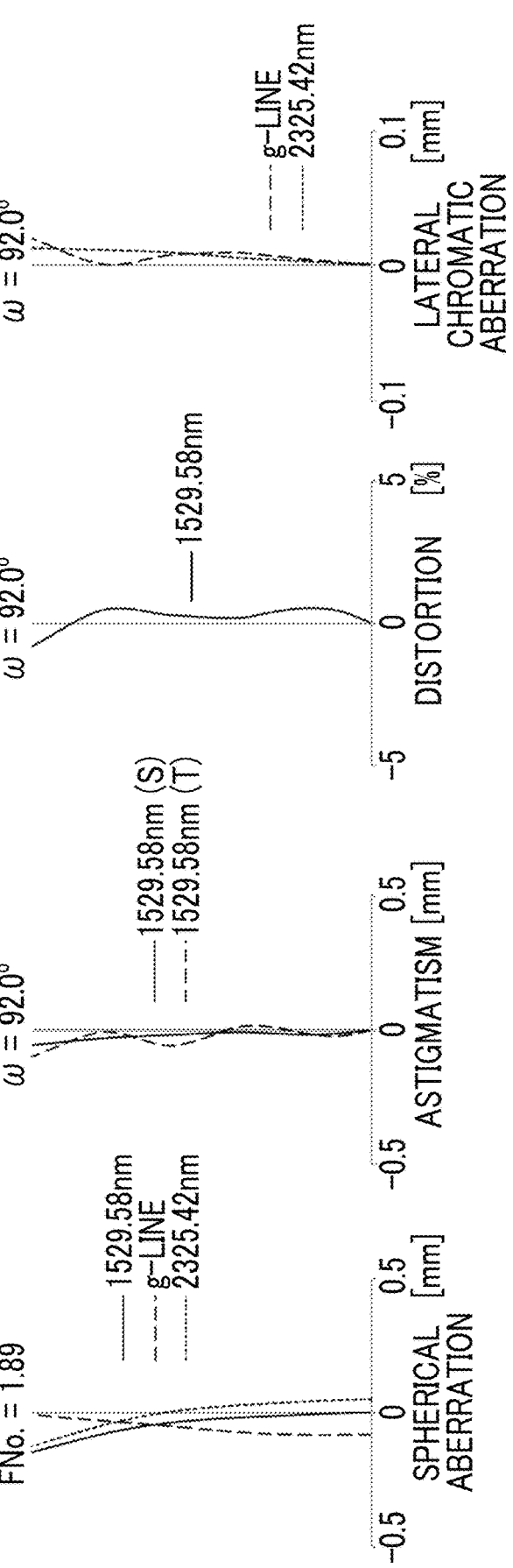
FIG. 26 is each aberration diagram of the imaging lens of Example 12.

FIG. 25 shows a cross-sectional view showing a configuration and a luminous flux of the imaging lens of Example 12. The imaging lens of Example 12 has the same of Example 12, the basic lens data is shown in Table 34, the specifications are shown in Table 35, the aspherical coefficient is shown in Table 36, and each aberration diagram is shown in FIG. 26.

TABLE 34

| | Example 12 (※ Based on a wavelength of 1529.58 nm) | | | | | | |
| --- | --- | --- | --- | --- | --- | --- | --- |
| Sn | R | D | na | ν | θ | Material name | φ |
| 1 | 83.3362 | 3.7351 | 1.95440 | 8.89 | 0.14690 | S-LAH99.OHARA | 89.998 |
| 2 | 36.0415 | 15.4133 | | | | | 62.391 |
| 3 | 33.8443 | 11.7946 | 1.95440 | 8.89 | 0.14690 | S-LAH99.OHARA | 44.673 |
| 4 | 13.2354 | 6.7682 | | | | | 22.529 |
| *5 | −1679.9945 | 5.1538 | 1.95440 | 8.89 | 0.14690 | S-LAH99.OHARA | 21.097 |
| *6 | 17.2441 | 4.7325 | | | | | 15.801 |
| 7 | 28.6456 | 2.9728 | 1.95440 | 8.89 | 0.14690 | S-LAH99.OHARA | 15.649 |
| 8 | 17.2570 | 4.3974 | | | | | 14.587 |
| 9 | −15.0281 | 2.8324 | 1.43023 | 22.04 | 0.27200 | S-FPL55.OHARA | 14.855 |
| 10 | −34.6339 | 8.4700 | 1.86146 | 5.84 | 0.13090 | S-NPH2.OHARA | 16.953 |
| 11 | −20.0173 | 3.8999 | | | | | 20.598 |
| 12 | 23.5382 | 17.3647 | 1.42625 | 24.99 | 0.22390 | CAF2 | 20.502 |
| 13 | −28.5015 | 7.6074 | | | | | 16.460 |
| 14 (St) | ∞ | 2.7133 | | | | | 9.795 |
| 15 | −11.8244 | 1.0725 | 1.42625 | 24.99 | 0.22390 | CAF2 | 10.394 |
| 16 | −11.9591 | 0.1000 | | | | | 10.933 |
| 17 | 13.2548 | 5.3566 | 1.42625 | 24.99 | 0.22390 | CAF2 | 12.015 |
| 18 | −11.2282 | 0.6000 | 1.80944 | 6.90 | 0.14470 | S-NPH5.OHARA | 11.881 |
| 19 | −68.0263 | 0.1000 | | | | | 12.348 |
| 20 | 39.1266 | 3.7832 | 1.42625 | 24.99 | 0.22390 | CAF2 | 12.592 |
| 21 | −14.1444 | 0.1000 | | | | | 12.748 |
| 22 | −26.3227 | 0.6000 | 1.78784 | 12.21 | 0.22290 | S-LAH59.OHARA | 12.464 |
| 23 | −261.8865 | 0.6000 | 1.64722 | 12.33 | 0.22400 | S-BAH10.OHARA | 12.520 |
| 24 | 30.2276 | 0.1000 | | | | | 12.580 |

TABLE 34-continued

| Sn | R | D | na | ν | θ | Material name | φ |
|---|---|---|---|---|---|---|---|
| *25 | 21.1170 | 3.9757 | 1.42625 | 24.99 | 0.22390 | CAF2 | 12.646 |
| *26 | −13.0160 | 1.0000 | | | | | 12.884 |
| 27 | ∞ | 1.0000 | 1.50050 | 13.45 | 0.30920 | S-BSL7.OHARA | 12.362 |
| 28 | ∞ | 8.0478 | | | | | 12.228 |

Example 12 (X̶ Based on a wavelength of 1529.58 nm)

TABLE 35

Example 12 (X̶ Based on a
wavelength of 1529.58 nm)

| f | 3.32 |
|---|---|
| Bf | 9.71 |
| FNo. | 1.89 |
| 2ω (°) | 184.0 |

TABLE 36

Example 12

| Sn | 5 | 6 | 25 | 26 |
|---|---|---|---|---|
| KA | −2.8755174E+07 | 1.0649799E+00 | 2.8632233E+00 | −1.1224558E+00 |
| A3 | 8.2556902E−20 | 2.2051274E−19 | −1.9168218E−20 | 1.1999134E−19 |
| A4 | 7.1829689E−06 | −4.5150880E−05 | −1.0080429E−04 | 2.4285866E−05 |
| A5 | 6.6340322E−06 | 6.1100021E−05 | −4.5898823E−05 | 2.5415291E−05 |
| A6 | 3.5745568E−07 | −1.6030392E−06 | −2.8524188E−06 | −3.7099640E−05 |
| A7 | −8.0361860E−08 | −1.9128817E−06 | 4.2032001E−06 | −6.6735664E−07 |
| A8 | −3.3130177E−09 | 1.6574188E−07 | 7.3576099E−07 | 4.2567612E−06 |
| A9 | 4.9052748E−10 | 3.3399903E−08 | −2.9621283E−07 | 7.0018974E−09 |
| A10 | −4.7387461E−12 | −3.4232275E−09 | −7.4685178E−08 | −2.8908729E−07 |
| A11 | −1.7522007E−12 | −3.7385068E−10 | 1.3667328E−08 | 6.1103995E−10 |
| A12 | 1.4034350E−13 | 3.2260429E−11 | 3.9108526E−09 | 1.2566679E−08 |
| A13 | 4.1638768E−15 | 2.6310364E−12 | −3.8578848E−10 | −3.8224421E−11 |
| A14 | −6.4986744E−16 | −1.5391658E−13 | −1.2058370E−10 | −3.5554199E−10 |
| A15 | −6.3143667E−18 | −1.1255138E−14 | 6.3696547E−12 | 1.0494880E−12 |
| A16 | 1.3889721E−18 | 3.3306704E−16 | 2.2331839E−12 | 6.3456777E−12 |
| A17 | 5.6237231E−21 | 2.6535965E−17 | −5.5792152E−14 | −1.4628355E−14 |
| A18 | −1.4604815E−21 | −1.1896138E−19 | −2.3113447E−14 | −6.4666507E−14 |
| A19 | −2.2342732E−24 | −2.6310467E−20 | 1.9660604E−16 | 8.2725541E−17 |
| A20 | 6.1271589E−25 | −4.0595269E−22 | 1.0300907E−16 | 2.8536881E−16 |

EXAMPLE 13

Figure 27:
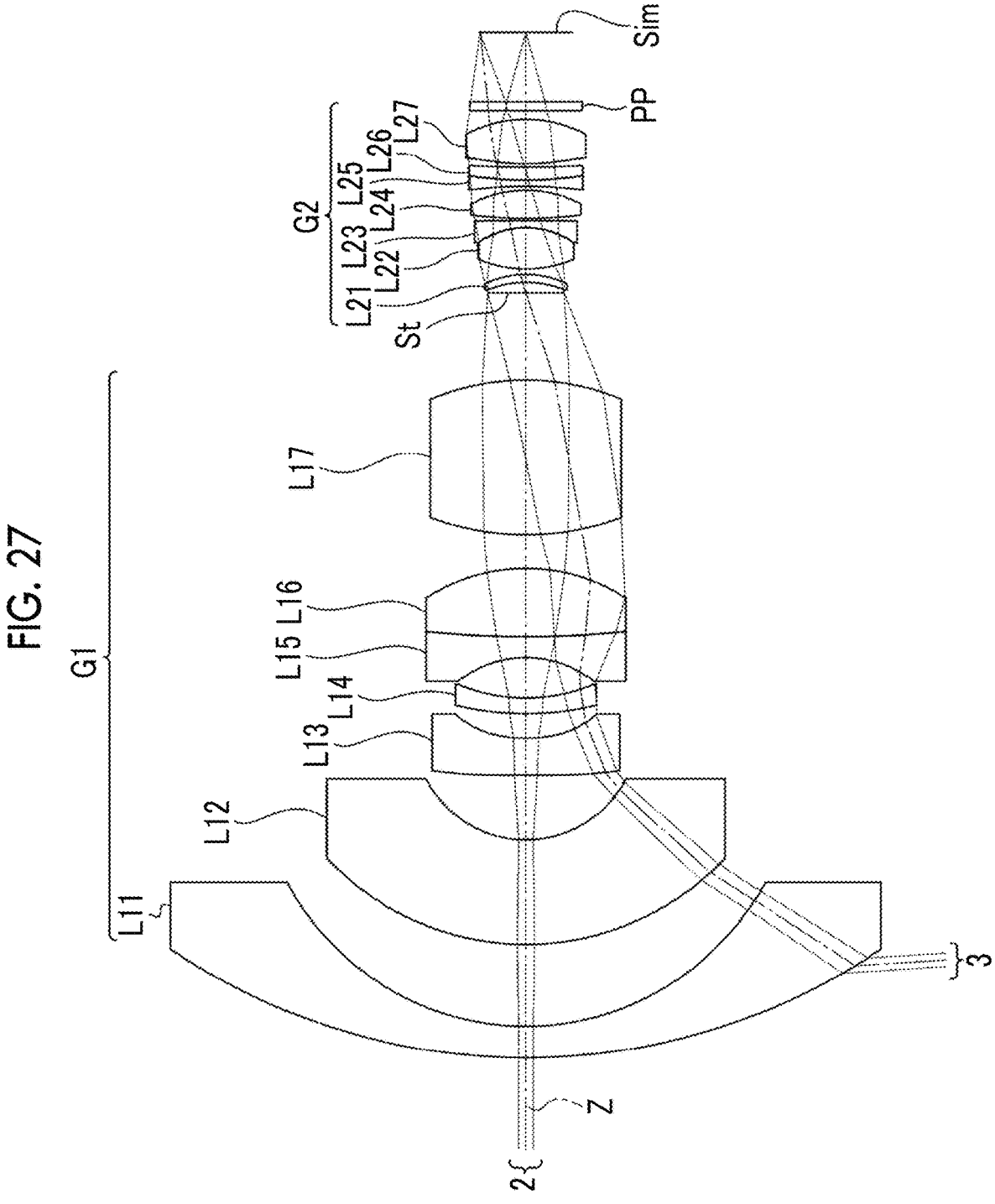
FIG. 27 is a cross-sectional view showing a configuration and a luminous flux of an imaging lens of Example 13.
Figure 28:
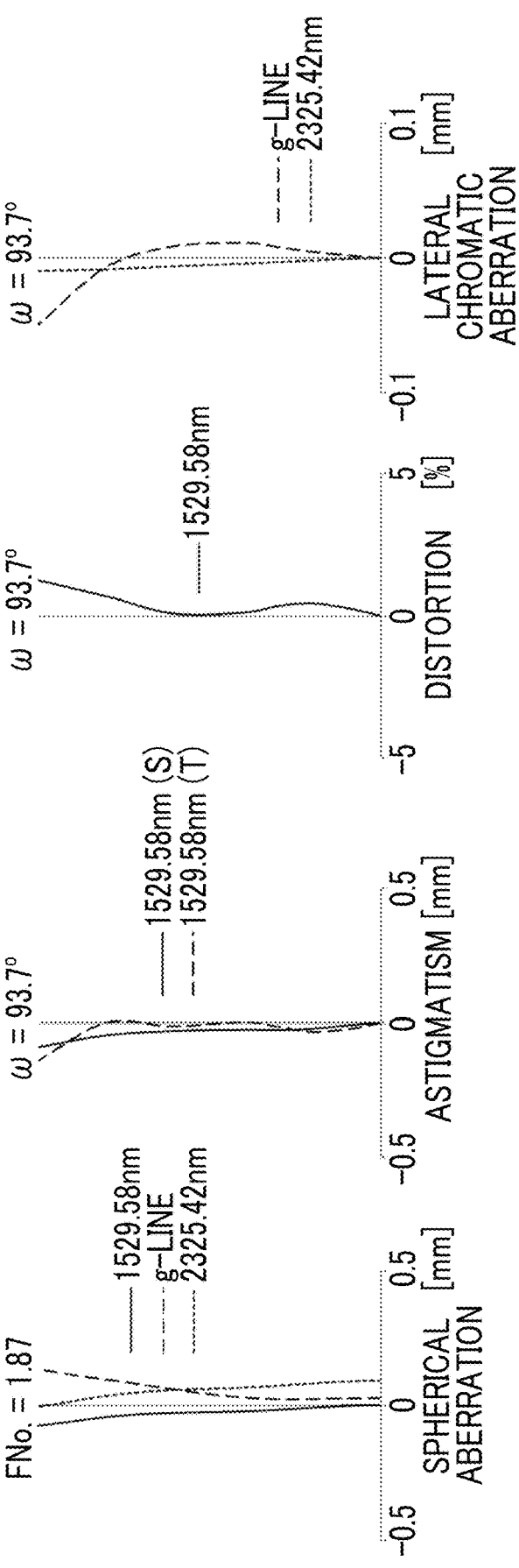
FIG. 28 is each aberration diagram of the imaging lens of Example 13.

FIG. 27 shows a cross-sectional view showing a configuration and a luminous flux of the imaging lens of Example 13. The imaging lens of Example 13 has the same of Example 13, the basic lens data is shown in Table 37, the specifications are shown in Table 38, the aspherical coefficient is shown in Table 39, and each aberration diagram is shown in FIG. 28.

TABLE 37

Example 13 (X̶ Based on a wavelength of 1529.58 nm)

| Sn | R | D | na | ν | θ | Material name | φ |
|---|---|---|---|---|---|---|---|
| 1 | 73.1601 | 3.6237 | 1.94732 | 6.95 | 0.09910 | P-SF68.SCHOTT | 79.956 |
| 2 | 31.3101 | 9.3877 | | | | | 54.502 |
| 3 | 31.8121 | 11.9137 | 2.27234 | 5.63 | 0.04160 | ZNS_MS | 45.235 |
| 4 | 13.0376 | 7.3560 | | | | | 22.849 |
| *5 | −3007.5741 | 4.3374 | 1.94732 | 6.95 | 0.09910 | P-SF68.SCHOTT | 21.329 |
| *6 | 16.3596 | 2.8213 | | | | | 16.468 |
| 7 | 34.6420 | 1.7754 | 1.94732 | 6.95 | 0.09910 | P-SF68.SCHOTT | 16.562 |
| 8 | 20.2174 | 4.5996 | | | | | 16.081 |
| 9 | −12.6405 | 2.3914 | 1.43023 | 22.04 | 0.27200 | S-FPL55.OHARA | 16.100 |
| 10 | 111.9482 | 7.7694 | 1.86146 | 5.84 | 0.13090 | S-NPH2.OHARA | 20.833 |
| 11 | −21.2531 | 3.8278 | | | | | 22.936 |

TABLE 37-continued

| Sn | R | D | na | ν | θ | Material name | φ |
|---|---|---|---|---|---|---|---|
| | | | | Example 13 (X· Based on a wavelength of 1529.58 nm) | | | |
| 12 | 31.7882 | 17.7600 | 1.42625 | 24.99 | 0.22390 | CAF2 | 21.988 |
| 13 | −28.4769 | 9.9287 | | | | | 17.803 |
| 14 (St) | ∞ | 1.2028 | | | | | 8.834 |
| 15 | −11.5002 | 0.8897 | 1.43023 | 22.04 | 0.27200 | S-FPL55.OHARA | 8.987 |
| 16 | −10.9353 | 0.6096 | | | | | 9.443 |
| 17 | 13.8387 | 4.7663 | 1.42625 | 24.99 | 0.22390 | CAF2 | 10.792 |
| 18 | −9.7038 | 0.8066 | 1.80944 | 6.90 | 0.14470 | S-NPH5.OHARA | 10.905 |
| 19 | −481.6093 | 0.2629 | | | | | 11.736 |
| 20 | 52.9812 | 3.1979 | 1.43023 | 22.04 | 0.27200 | S-FPL55.OHARA | 12.143 |
| 21 | −13.4856 | 0.4395 | | | | | 12.592 |
| 22 | −51.9591 | 0.7148 | 1.78784 | 12.21 | 0.22290 | S-LAH59.OHARA | 12.676 |
| 23 | 42.8393 | 1.4955 | 1.64722 | 12.33 | 0.22400 | S-BAH10.OHARA | 12.897 |
| 24 | 143.4306 | 0.3581 | | | | | 13.104 |
| *25 | 23.5249 | 5.1654 | 1.48610 | 19.45 | 0.26330 | S-FPL51.OHARA | 13.435 |
| *26 | −14.3922 | 1.0000 | | | | | 13.804 |
| 27 | ∞ | 1.0000 | 1.50050 | 13.45 | 0.30920 | S-BSL7.OHARA | 13.020 |
| 28 | ∞ | 7.8688 | | | | | 12.830 |

TABLE 38

| Example 13 (X· Based on a wavelength of 1529.58 nm) | |
|---|---|
| f | 3.19 |
| Bf | 9.54 |
| FNo. | 1.87 |
| 2ω (°) | 187.4 |

TABLE 39

| Sn | 5 | 6 | 25 | 26 |
|---|---|---|---|---|
| | | | Example 13 | |
| KA | −2.8755174E+07 | 1.0330633E+00 | 2.9707887E+00 | −1.1101276E+00 |
| A3 | −1.3174583E−19 | −3.7546441E−20 | −8.0951286E−20 | 0.0000000E+00 |
| A4 | 3.0521992E−05 | −4.8895745E−05 | −5.9480611E−05 | −3.5315165E−05 |
| A5 | 7.2636088E−06 | 6.2706647E−05 | −2.7709189E−05 | 6.3787462E−06 |
| A6 | −1.6414799E−07 | −9.9064180E−08 | −1.8074862E−05 | −1.7818839E−05 |
| A7 | −8.9611934E−08 | −2.0035481E−06 | 1.4136715E−06 | 1.0884153E−06 |
| A8 | 2.8927067E−09 | 9.7755213E−08 | 2.7679401E−06 | 1.2682153E−06 |
| A9 | 5.6459406E−10 | 3.5847470E−08 | −4.0029155E−08 | −1.1286130E−07 |
| A10 | −4.7947570E−11 | −1.8995008E−09 | −2.2457908E−07 | −3.3722703E−08 |
| A11 | −2.0865694E−12 | −4.0513867E−10 | 5.4403279E−11 | 6.0149791E−09 |
| A12 | 3.2593679E−13 | 1.2411651E−11 | 1.0456962E−08 | −5.1649292E−10 |
| A13 | 5.0546941E−15 | 2.8977143E−12 | 4.4811664E−11 | −1.9159948E−10 |
| A14 | −1.1482059E−15 | 2.5211691E−15 | −2.9276687E−10 | 5.7561342E−11 |
| A15 | −7.6914506E−18 | −1.2590975E−14 | −1.6130323E−12 | 3.6326485E−12 |
| A16 | 2.2030977E−18 | −4.0006426E−16 | 4.8877089E−12 | −1.5333236E−12 |
| A17 | 6.7595581E−21 | 3.0140742E−17 | 2.4238208E−14 | −3.7656809E−14 |
| A18 | −2.2003089E−21 | 1.7554217E−18 | −4.4922824E−14 | 1.8515373E−14 |
| A19 | −2.6172046E−24 | −3.0335960E−20 | −1.3883374E−16 | 1.6370608E−16 |
| A20 | 8.9943387E−25 | −2.4136520E−21 | 1.7530244E−16 | −8.7365996E−17 |

EXAMPLE 14

Figure 29:
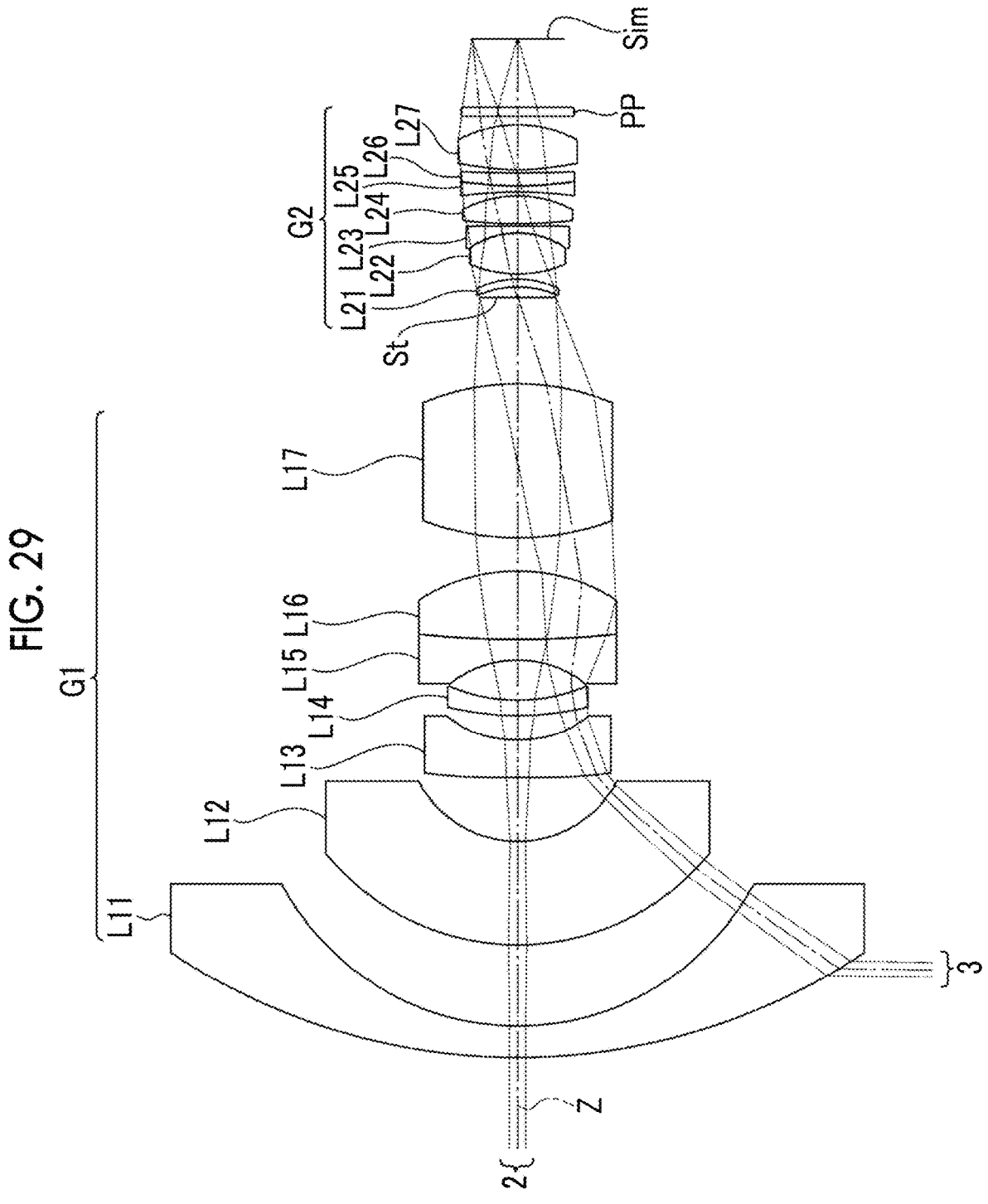
FIG. 29 is a cross-sectional view showing a configuration and a luminous flux of an imaging lens of Example 14.
Figure 30:
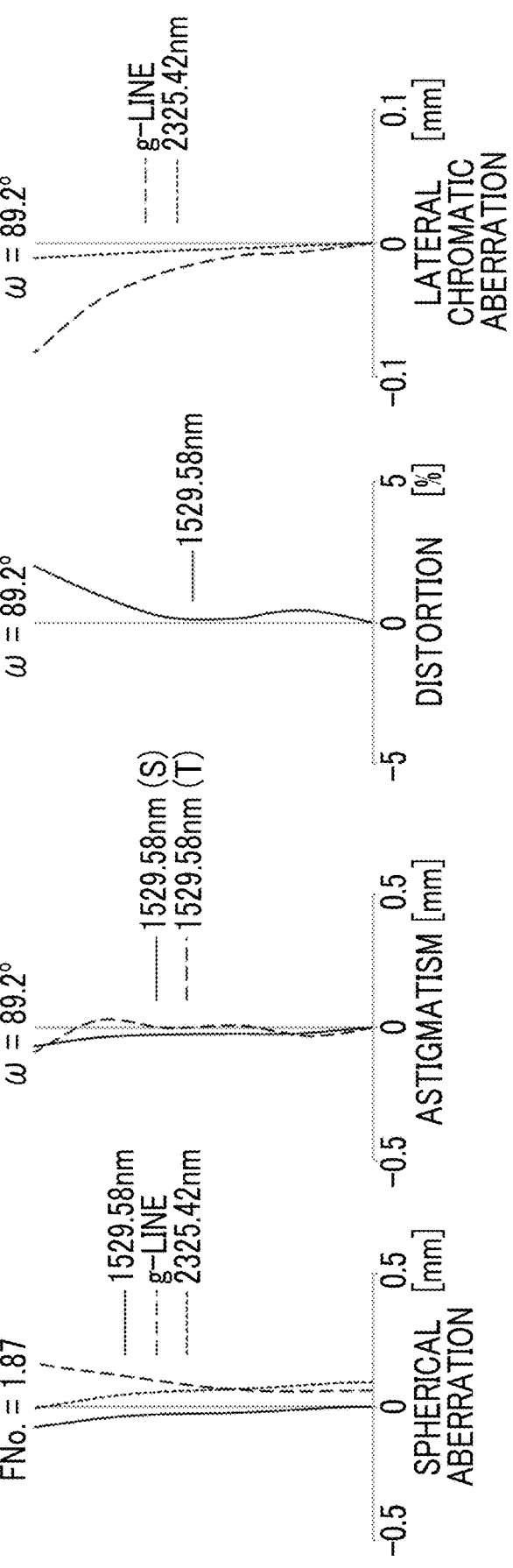
FIG. 30 is each aberration diagram of the imaging lens of Example 14.

FIG. 29 shows a cross-sectional view showing a configuration and a luminous flux of the imaging lens of Example 14. The imaging lens of Example 14 has the same of Example 14, the basic lens data is shown in Table 40, the specifications are shown in Table 41, the aspherical coefficient is shown in Table 42, and each aberration diagram is shown in FIG. 30.

TABLE 40

| Sn | R | D | na | ν | θ | Material name | φ |
|---|---|---|---|---|---|---|---|
| | | | | Example 14 (X· Based on a wavelength of 1529.58 nm) | | | |
| 1 | 73.5274 | 3.6212 | 1.94732 | 6.95 | 0.09910 | P-SF68.SCHOTT | 79.123 |
| 2 | 31.2893 | 9.3837 | | | | | 54.401 |

TABLE 40-continued

| | | | Example 14 (X: Based on a wavelength of 1529.58 nm) | | | | |
|---|---|---|---|---|---|---|---|
| Sn | R | D | na | ν | θ | Material name | φ |
| 3 | 29.0108 | 11.9107 | 2.45627 | 3.72 | 0.03540 | ZNSE | 44.059 |
| 4 | 13.0364 | 7.3557 | | | | | 22.810 |
| *5 | −3190.0339 | 4.3374 | 1.94732 | 6.95 | 0.09910 | P-SF68.SCHOTT | 21.256 |
| *6 | 16.3596 | 2.8213 | | | | | 16.421 |
| 7 | 34.6421 | 1.7754 | 1.94732 | 6.95 | 0.09910 | P-SF68.SCHOTT | 16.517 |
| 8 | 20.2173 | 4.5996 | | | | | 16.038 |
| 9 | −12.6405 | 2.3914 | 1.43023 | 22.04 | 0.27200 | S-FPL55.OHARA | 16.068 |
| 10 | 111.9484 | 7.7694 | 1.86146 | 5.84 | 0.13090 | S-NPH2.OHARA | 20.775 |
| 11 | −21.2531 | 3.8278 | | | | | 22.883 |
| 12 | 31.7882 | 17.7601 | 1.42625 | 24.99 | 0.22390 | CAF2 | 21.945 |
| 13 | −28.4769 | 9.9287 | | | | | 17.771 |
| 14 (St) | ∞ | 1.2028 | | | | | 8.838 |
| 15 | −11.5002 | 0.8897 | 1.43023 | 22.04 | 0.27200 | S-FPL55.OHARA | 8.991 |
| 16 | −10.9353 | 0.6096 | | | | | 9.449 |
| 17 | 13.8387 | 4.7663 | 1.42625 | 24.99 | 0.22390 | CAF2 | 10.805 |
| 18 | −9.7038 | 0.8063 | 1.80944 | 6.90 | 0.14470 | S-NPH5.OHARA | 10.919 |
| 19 | −481.5757 | 0.2627 | | | | | 11.754 |
| 20 | 52.9806 | 3.1975 | 1.43023 | 22.04 | 0.27200 | S-FPL55.OHARA | 12.164 |
| 21 | −13.4856 | 0.4395 | | | | | 12.611 |
| 22 | −51.9592 | 0.7146 | 1.78784 | 12.21 | 0.22290 | S-LAH59.OHARA | 12.698 |
| 23 | 42.8394 | 1.4951 | 1.64722 | 12.33 | 0.22400 | S-BAH10.OHARA | 12.920 |
| 24 | 143.4324 | 0.3573 | | | | | 13.127 |
| *25 | 23.5249 | 5.1655 | 1.48610 | 19.45 | 0.26330 | S-FPL51.OHARA | 13.460 |
| *26 | −14.3922 | 1.0000 | | | | | 13.830 |
| 27 | ∞ | 1.0000 | 1.50050 | 13.45 | 0.30920 | S-BSL7.OHARA | 13.046 |
| 28 | ∞ | 7.8735 | | | | | 12.857 |

TABLE 41

Example 14 (X: Based on a wavelength of 1529.58 nm)

| | |
|---|---|
| f | 3.33 |
| Bf | 9.54 |
| FNo. | 1.87 |
| 2ω (°) | 178.4 |

TABLE 42

Example 14

| Sn | 5 | 6 | 25 | 26 |
|---|---|---|---|---|
| KA | −2.8755174E+07 | 1.0330634E+00 | 2.9707887E+00 | −1.1101276E+00 |
| A3 | −5.8554269E−20 | 3.7548157E−20 | 3.0355591E−20 | −7.8383144E−20 |
| A4 | 3.0520879E−05 | −4.8854513E−05 | −5.9477468E−05 | −3.5316489E−05 |
| A5 | 7.2636638E−06 | 6.2712275E−05 | −2.7707203E−05 | 6.3789879E−06 |
| A6 | −1.6412073E−07 | −1.0140173E−07 | −1.8073505E−05 | −1.7819768E−05 |
| A7 | −8.9613245E−08 | −2.0037866E−06 | 1.4135437E−06 | 1.0884821E−06 |
| A8 | 2.8924375E−09 | 9.7832447E−08 | 2.7676626E−06 | 1.2683036E−06 |
| A9 | 5.6460538E−10 | 3.5852832E−08 | −4.0024615E−08 | −1.1287015E−07 |
| A10 | −4.7946793E−11 | −1.9008654E−09 | −2.2455093E−07 | −3.3725638E−08 |
| A11 | −2.0866212E−12 | −4.0521147E−10 | 5.4395342E−11 | 6.0155549E−09 |
| A12 | 3.2593959E−13 | 1.2424879E−11 | 1.0455390E−08 | −5.1654686E−10 |
| A13 | 5.0548453E−15 | 2.8983218E−12 | 4.4804369E−11 | −1.9162116E−10 |
| A14 | −1.1482316E−15 | 2.4516021E−15 | −2.9271550E−10 | 5.7568354E−11 |
| A15 | −7.6917211E−18 | −1.2593993E−14 | −1.6127291E−12 | 3.6331227E−12 |
| A16 | 2.2031689E−18 | −3.9988762E−16 | 4.8867287E−12 | −1.5335371E−12 |
| A17 | 6.7598339E−21 | 3.0148875E−17 | 2.4233044E−14 | −3.7662380E−14 |
| A18 | −2.2003981E−21 | 1.7553037E−18 | −4.4912689E−14 | 1.8518273E−14 |
| A19 | −2.6173272E−24 | −3.0345064E−20 | −1.3880068E−16 | 1.6373315E−16 |
| A20 | 8.9947693E−25 | −2.4138260E−21 | 1.7525850E−16 | −8.7381202E−17 |

Table 43 shows the corresponding values of Conditional Expressions (1) to (8) of the imaging lenses of Examples 1 to 14.

ratio, the effective diameter, and the like of each lens are not limited to the values shown in each of the above Examples and may take other values.

TABLE 43

| Expression No. | Conditional Expression | Example 1 | Example 2 | Example 3 | Example 4 | Example 5 |
|---|---|---|---|---|---|---|
| (1) | νPave-νNave | 7.30 | 7.63 | 7.03 | 7.31 | 8.59 |
| (2) | θPave-θNave | 0.0310 | 0.0494 | 0.0301 | 0.0483 | 0.0578 |
| (3) | |CRA| | 3.71 | 3.77 | 3.75 | 3.91 | 3.73 |
| (4) | TL/f | 35.33 | 30.49 | 33.21 | 29.97 | 35.36 |
| (5) | fG2/fG1 | 0.58 | 0.57 | 0.60 | 0.66 | 0.61 |
| (6) | fLp/fG1 | 1.44 | 1.43 | 1.51 | 1.63 | 1.54 |
| (7) | φt/φe | 5.20 | 3.09 | 5.10 | 3.63 | 5.64 |
| (8) | νe | 19.45 | 19.45 | 19.45 | 19.45 | 19.45 |

| Expression No. | Conditional Expression | Example 6 | Example 7 | Example 8 | Example 9 | Example 10 |
|---|---|---|---|---|---|---|
| (1) | νPave-νNave | 8.96 | 11.05 | 10.58 | 10.79 | 11.07 |
| (2) | θPave-θNave | 0.0820 | 0.0397 | 0.0279 | 0.0335 | 0.0348 |
| (3) | |CRA| | 6.29 | 8.00 | 8.46 | 8.35 | 8.10 |
| (4) | TL/f | 37.38 | 34.13 | 34.11 | 34.68 | 34.33 |
| (5) | fG2/fG1 | 0.93 | 1.39 | 1.62 | 1.61 | 1.45 |
| (6) | fLp/fG1 | 2.08 | 2.58 | 2.69 | 2.74 | 2.65 |
| (7) | φt/φe | 6.07 | 6.42 | 6.67 | 6.64 | 6.52 |
| (8) | νe | 19.45 | 24.99 | 24.99 | 24.99 | 24.99 |

| Expression No. | Conditional Expression | Example 11 | Example 12 | Example 13 | Example 14 |
|---|---|---|---|---|---|
| (1) | νPave-νNave | 8.60 | 8.49 | 9.15 | 9.42 |
| (2) | θPave-θNave | 0.0197 | 0.0192 | 0.0902 | 0.0911 |
| (3) | |CRA| | 8.23 | 8.30 | 5.84 | 5.84 |
| (4) | TL/f | 37.53 | 37.38 | 36.65 | 35.17 |
| (5) | fG2/fG1 | 1.82 | 1.82 | 0.95 | 0.91 |
| (6) | fLp/fG1 | 2.91 | 2.91 | 2.12 | 2.03 |
| (7) | φt/φe | 7.09 | 7.08 | 5.94 | 5.86 |
| (8) | νe | 24.99 | 24.99 | 19.45 | 19.45 |

It can be seen from the above data that in the imaging lenses of Examples 1 to 14, an increase in size of the lens system is suppressed and various aberrations are favorably corrected over a wide wavelength range from the visible range to the SWIR range so that high optical performance is realized.

Since SWIR light can transmit through fog and smoke more than light having a wavelength of 700 nm to 1000 nm, a large amount of information can be obtained by imaging with the SWIR light. In a case of an optical system having a small F number and covering SWIR light, it is possible to perform imaging using night airglow having a peak in the vicinity of a wavelength of 1600 nm. Further, since the SWIR light has the property of transmitting through silicon, the SWIR light can also be used for inspection of a silicon wafer, a solar cell, or the like. In addition, in a case in which a spectrum of an object from the visible range to the SWIR range can be obtained, advanced analysis can be performed in an infrastructure deterioration survey of concrete or the like and an inspection of agricultural products, soil, or the like. From the above, the imaging lens of the present disclosure capable of covering the wavelength range of the SWIR range has high usefulness.

Although the technology of the present disclosure has been described above with reference to exemplary embodiments and examples, the technology of the present disclosure is not limited to the above exemplary embodiments and examples, and various modifications can be made. For example, the curvature radius, the surface spacing, the refractive index, the Abbe number, the partial dispersion In addition, although the aberration diagrams of the above Examples show a range from a wavelength of 435.83 nm (g-line) to a wavelength of 2325.42 nm, the technology of the present disclosure is not limited to this wavelength range and can also be applied to an imaging lens that expands or reduces the wavelength range.

Figure 31:
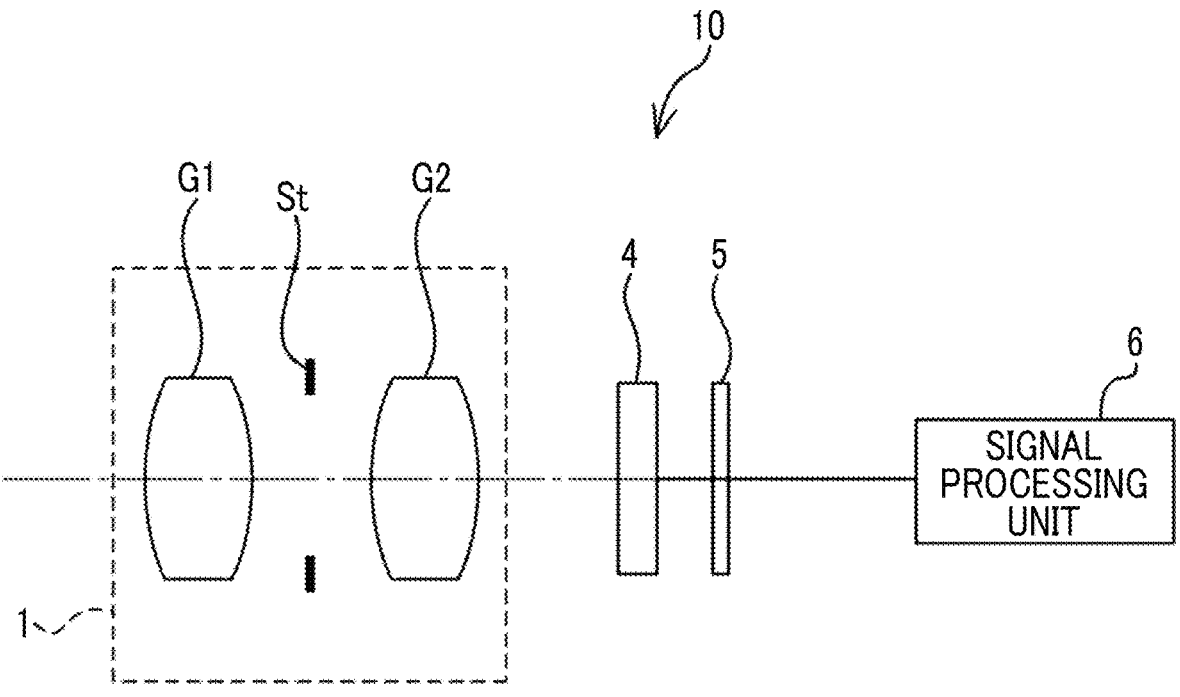
FIG. 31 is a schematic configuration diagram of an imaging device according to an exemplary embodiment.

Next, an imaging device according to an exemplary embodiment of the present disclosure will be described. FIG. 31 shows a schematic configuration diagram of an imaging device 10 using an imaging lens 1 according to an exemplary embodiment of the present disclosure as an imaging device according to an exemplary embodiment of the present disclosure. Examples of the imaging device 10 include an FA camera, an MV camera, a digital camera, a surveillance camera, an in-vehicle camera, and a cinema camera. The imaging device 10 is a camera capable of covering the visible range and the SWIR range.

The imaging device 10 comprises the imaging lens 1, a filter 4 disposed on the image side of the imaging lens 1, an imaging element 5, and a signal processing unit 6 that performs arithmetic processing of an output signal from the imaging element 5. In FIG. 31, the first lens group G1, the aperture stop St, and the second lens group G2 provided in the imaging lens 1 are conceptually shown. The imaging element 5 captures an image of a subject formed by the imaging lens 1 and converts the image into an electrical signal, and for example, a complementary metal-oxide semiconductor (CMOS) sensor, a charge coupled device (CCD) sensor, or the like can be used. The imaging element 5 is disposed such that the imaging surface thereof coincides with the image plane Sim of the imaging lens 1.

Although only one imaging element 5 is shown in FIG. 31, the imaging device 10 may include a plurality of imaging elements. The imaging device 10 may be configured such that a spectroscopic prism and/or a dichroic mirror is inserted at any location on the optical axis of the optical system to branch light for each wavelength and to perform imaging with separate imaging elements.

In addition, the imaging device according to the exemplary embodiment of the present disclosure is not limited to the camera that covers the visible range and the SWIR range. The technology of the present disclosure can also be applied to a visible range camera, a SWIR range camera, a multispectral camera, a hyperspectral camera, a thermography camera, and the like.

The disclosure of Japanese patent application 2020-195483 filed on Nov. 25, 2020 is incorporated herein by reference in its entirety. All documents, patent applications, and technical standards described in the present specification are incorporated in the present specification by reference to the same extent as in a case in which the individual documents, patent applications, and technical standards were specifically and individually stated to be incorporated by reference.

What is claimed is:

1. An imaging lens consisting of, in order from an object side to an image side:

a first lens group;

a stop; and a second lens group having a positive refractive power, wherein:

the first lens group includes three or more Ln lenses that are consecutively disposed, the Ln lens is a negative lens in which a surface on the image side is a concave surface, and in a case in which, for each lens of the first lens group and the second lens group, a refractive index at a wavelength of 435.83 nm is denoted by ng, a refractive index at a wavelength of 1529.58 nm is denoted by na, and a refractive index at a wavelength of 2325.42 nm is denoted by nb, an Abbe number ν and a partial dispersion ratio θ are defined as $$\nu=(na-1)/(ng-nb) \text{ and}$$

$$\theta=(na-nb)/(ng-nb), \text{ respectively, and,}$$

among the three or more Ln lenses that are consecutively disposed and included in the first lens group, for two Ln lenses selected in descending order of refractive power, an average of the Abbe numbers ν is denoted by νave, and an average of the partial dispersion ratios θ is denoted by θave, in a Cartesian coordinate system with a horizontal axis representing the Abbe number ν and a vertical axis representing the partial dispersion ratio θ, νave and θave are included in a common region of four regions, a fifth region represented by $\theta>0.0250\times\nu-0.1000$, a sixth region represented by $\theta<0.0250\times\nu-0.0375$, a seventh region represented by $\theta>0.0500$, and an eighth region represented by $\theta<0.1500$, and in a case in which a sum of a distance on an optical axis from a lens surface closest to the object side of the imaging lens to a lens surface closest to the image side of the imaging lens and a back focus in terms of an air conversion distance of the imaging lens at a wavelength of 1529.58 nm is denoted by TL, and a focal length of the imaging lens at a wavelength of 1529.58 nm is denoted by f, Conditional Expression (4) is satisfied:

$$29<TL/f<38 \tag{4}$$

2. The imaging lens according to claim 1, wherein in a case in which an average of the Abbe numbers ν of all positive lenses of the imaging lens is denoted by νPave, an average of the Abbe numbers ν of all negative lenses of the imaging lens is denoted by νNave, an average of the partial dispersion ratios θ of all the positive lenses of the imaging lens is denoted by θPave, and an average of the partial dispersion ratios θ of all the negative lenses of the imaging lens is denoted by θNave, Conditional Expressions (1) and (2) are satisfied:

$$6<\nu\text{Pave}-\nu\text{Nave}<12 \tag{1 and}$$

$$0.01<\theta\text{Pave}-\theta\text{Nave}<0.1 \tag{2}$$

3. The imaging lens according to claim 1, wherein in a case in which an angle formed between a chief ray incident on a maximum image height on an image plane and an axis parallel to an optical axis is denoted by CRA, and a unit of CRA is degrees, Conditional Expression (3) is satisfied:

$$0\leq|CRA|<10 \tag{3}$$

4. The imaging lens according to claim 1, wherein the first lens group has a positive refractive power.

5. The imaging lens according to claim 1, wherein in a case in which a focal length of the first lens group at a wavelength of 1529.58 nm is denoted by fG1, and a focal length of the second lens group at a wavelength of 1529.58 nm is denoted by fG2, Conditional Expression (5) is satisfied:

$$0.4<fG2/fG1<2 \tag{5}$$

6. The imaging lens according to claim 1, wherein in a case in which a focal length of the first lens group at a wavelength of 1529.58 nm is denoted by fG1, and a focal length of a lens disposed closest to the image side in the first lens group at a wavelength of 1529.58 nm is denoted by fLp, Conditional Expression (6) is satisfied:

$$1.3<fLp/fG1<3.1 \tag{6}$$

7. The imaging lens according to claim 1, wherein in a case in which an effective diameter of a lens surface closest to the object side of the imaging lens is denoted by φt, and an effective diameter of a lens surface closest to the image side of the imaging lens is denoted by φe, Conditional Expression (7) is satisfied:

$$2.5<\varphi t/\varphi e<8 \tag{7}$$

8. The imaging lens according to claim 1, wherein the first lens group includes four or fewer Ln lenses that are consecutively disposed.

9. The imaging lens according to claim 1, wherein in a case in which the Abbe number v of a lens closest to the image side of the imaging lens is denoted by vE, Conditional Expression (8) is satisfied:

$$17 < vE \qquad (8).$$

10. The imaging lens according to claim 1, wherein at least one of the three or more Ln lenses that are consecutively disposed and included in the first lens group is an aspherical lens.

11. The imaging lens according to claim 1, wherein a lens closest to the image side of the imaging lens is an aspherical lens having a positive refractive power.

12. The imaging lens according to claim 1, wherein the number of lenses included in the first lens group is seven or fewer.

13. The imaging lens according to claim 1, wherein the number of lenses included in the second lens group is seven or fewer.

14. The imaging lens according to claim 2, wherein Conditional Expressions (1-1) and (2-1) are satisfied:

$$6.5 < vPave - vNave < 11.5 \qquad (1\text{-}1) \text{ and}$$

$$0.015 < \theta Pave - \theta Nave < 0.095 \qquad (2\text{-}1).$$

15. The imaging lens according to claim 3, wherein Conditional Expression (3-1) is satisfied:

$$0 \le |CRA| < 9 \qquad (3\text{-}1).$$

16. The imaging lens according to claim 4, wherein Conditional Expression (4-1) is satisfied:

$$29.5 < TL/f < 37.6 \qquad (4\text{-}1).$$

17. The imaging lens according to claim 6, wherein Conditional Expression (5-1) is satisfied:

$$0.5 < fG2/fG1 < 1.9 \qquad (5\text{-}1).$$

18. An imaging device comprising the imaging lens according to claim 1.

* * * * *